United States Patent
Cirik et al.

(10) Patent No.: US 11,664,873 B2
(45) Date of Patent: *May 30, 2023

(54) ABORTING A BEAM FAILURE RECOVERY PROCEDURE BASED ON AN EXPIRY OF A TIME ALIGNMENT TIMER

(71) Applicant: ResMed Inc., San Diego, CA (US)

(72) Inventors: Ali Cagatay Cirik, Herndon, VA (US); Esmael Dinan, McLean, VA (US); Alireza Babaei, Fairfax, VA (US); Hyoungsuk Jeon, Centreville, VA (US); Kyungmin Park, Herndon, VA (US); Hua Zhou, Herndon, VA (US)

(73) Assignee: ResMed Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,415

(22) Filed: Sep. 16, 2020

(65) Prior Publication Data

US 2020/0412437 A1  Dec. 31, 2020

Related U.S. Application Data

(63) Continuation of application No. 16/227,562, filed on Dec. 20, 2018, now Pat. No. 10,784,944.

(Continued)

(51) Int. Cl.
*H04L 12/28* (2006.01)
*H04B 7/06* (2006.01)
(Continued)

(52) U.S. Cl.
CPC ......... *H04B 7/0695* (2013.01); *H04B 7/0408* (2013.01); *H04B 7/0626* (2013.01);
(Continued)

(58) Field of Classification Search
CPC . H04B 7/088; H04B 7/0695; H04W 56/0045; H04W 74/0833; H04W 72/046
(Continued)

(56) References Cited

U.S. PATENT DOCUMENTS

2013/0188618 A1* 7/2013 Dinan .................. H04L 5/0094
370/336
2018/0192371 A1  7/2018 Jung et al.
(Continued)

FOREIGN PATENT DOCUMENTS

EP  3337055  6/2018
EP  3355485  8/2018
(Continued)

OTHER PUBLICATIONS

R1-1712998_NEC; 3GPP TSG RAN WG1 Meeting #90; Prague, Czech Republic, Aug. 21-25, 2017; ; Agenda item:6.1.2.2.7; Source:NEC; Title:Discussion on beam failure recovery.
(Continued)

*Primary Examiner* — John Pezzlo
(74) *Attorney, Agent, or Firm* — Patterson + Sheridan, LLP

(57) ABSTRACT

A wireless device receives configuration parameters indicating a time alignment timer of a timing advance group comprising a cell. The time alignment timer is started in response to receiving a timing advance command for the timing advance group. The wireless device transmits an uplink signal for a beam failure recovery procedure for the cell based on a beam failure of the cell. The beam failure recovery procedure is aborted based on an expiry of the time alignment timer during the beam failure recovery procedure.

18 Claims, 35 Drawing Sheets

Related U.S. Application Data

(60) Provisional application No. 62/615,275, filed on Jan. 9, 2018.

(51) Int. Cl.
| | | |
|---|---|---|
| *H04W 74/08* | (2009.01) | |
| *H04L 5/00* | (2006.01) | |
| *H04B 7/0408* | (2017.01) | |
| *H04W 72/04* | (2023.01) | |
| *H04W 72/044* | (2023.01) | |
| *H04W 76/27* | (2018.01) | |
| *H04W 76/28* | (2018.01) | |
| *H04W 24/04* | (2009.01) | |
| *H04W 24/08* | (2009.01) | |
| *H04B 7/08* | (2006.01) | |
| *H04J 1/16* | (2006.01) | |

(52) U.S. Cl.
CPC ........... *H04B 7/088* (2013.01); *H04L 5/0048* (2013.01); *H04W 24/04* (2013.01); *H04W 24/08* (2013.01); *H04W 72/042* (2013.01); *H04W 72/046* (2013.01); *H04W 74/0833* (2013.01); *H04W 76/27* (2018.02); *H04W 76/28* (2018.02); *H04L 5/0007* (2013.01)

(58) Field of Classification Search
USPC .......................... 370/216, 252, 329, 386, 442
See application file for complete search history.

(56) References Cited

U.S. PATENT DOCUMENTS

| | | | |
|---|---|---|---|
| 2018/0199226 A1 | 7/2018 | Tsai et al. | |
| 2018/0368205 A1* | 12/2018 | Park | ............ H04W 76/34 |
| 2019/0053184 A1* | 2/2019 | Park | ............ H04L 5/0092 |
| 2019/0053288 A1 | 2/2019 | Zhou | |
| 2019/0182800 A1 | 6/2019 | Park | |
| 2019/0207667 A1* | 7/2019 | Zhou | ............ H04B 17/309 |
| 2019/0207737 A1 | 7/2019 | Babaei | |
| 2019/0208436 A1 | 7/2019 | Zhou | |
| 2019/0335513 A1 | 10/2019 | Dinan | |

FOREIGN PATENT DOCUMENTS

| | | |
|---|---|---|
| WO | 2018118409 | 6/2018 |
| WO | 2018128442 | 7/2018 |
| WO | 2018129300 | 7/2018 |

OTHER PUBLICATIONS

R1-1715441_ZTE; 3GPP TSG RAN WG1 Meeting NR#3; Nagoya, Japan, Sep. 18-21, 2017; ; Source: ZTE, Sanechips; Title: Discussion on beam recovery; Agenda Item:6.2.2.4.

R1-1715531_Lenova; 3GPP TSG RAN WG1 Meeting NR#3; Nagoya, Japan, Sep. 18-21, 2017; ; Agenda item:6.2.2.4; Source:Lenovo, Motorola Mobility; Title:Discussion of beam failure recovery.

R1-1716214_MediaTek; 3GPP TSG RAN WG1 Meeting NR#3; Nagoya, Japan, Sep. 18-21, 2017; Agenda item: 6.2.2.4; Source: MediaTek Inc.; Title:Discussion on Beam Recovery Mechanism; Document for: Discussion.

R1-1716297_Intel; 3GPP TSG RAN WG1 Meeting NR#3; Nagoya, Japan, Sep. 18-21, 2017; ; Source: Intel Corporation; Title:On Timing Advance for Multi-beam operation ; Agenda item:6.2.2.6.

R1-1716351_Ericsson; 3GPP TSG-RAN WG1 NR Ad Hoc #3; Nagoya, Japan, Sep. 18-21, 2017; ; Source: Ericsson; Title:Basic beam recovery ; Agenda Item:6.2.2.4.

R1-1717425_ZTE; 3GPP TSG RAN WG1 Meeting #90-bis; Prague, Czechia, Oct. 9-13, 2017; Source: ZTE, Sanechips; Title: Discussion on beam recovery; Agenda Item:7.2.2.4; Document for:Discussion and Decision.

R1-1717867_Lenova; 3GPP TSG RAN WG1 Meeting#90bis; Prague, P.R. Czech Oct. 9-13, 2017; ; Agenda Item:7.2.2.4; Source:Lenovo, Motorola Mobility; Title:Discussion of beam failure recovery.

R1-1718542_Qualcomm; 3GPP TSG-RAN WG1 Meeting RAN1 #90bis; Prague, Czech Republic, Oct. 9-13, 2017; ; Agenda item:7.2.2.4; Source: Qualcomm Incorporated; Title: Beam recovery procedure.

R1-1719810; 3GPP TSG RAN WG1 Meeting #91; Reno, USA, Nov. 27-Dec. 1, 2017; ; Agenda Item:7.2.2.6; Source:Huawei, HiSilicon; Title:Considerations on timing advance design in NR.

R1-1720567 Remaining Issues for Beam Failure Recovery Procedure; 3GPP TSG RAN WG1 Meeting 91; Reno, USA, Nov. 27-Dec. 1, 2017; ; Agenda Item:7.2.2.4; Source:ASUSTeK; Title: Remaining Issues for Beam Failure Recovery Procedure.

* cited by examiner

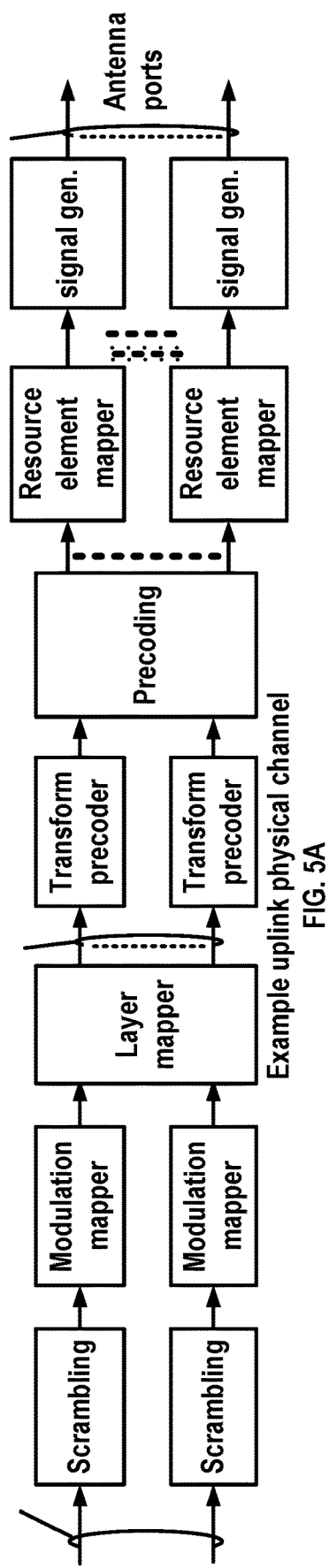
Example uplink physical channel
FIG. 5A
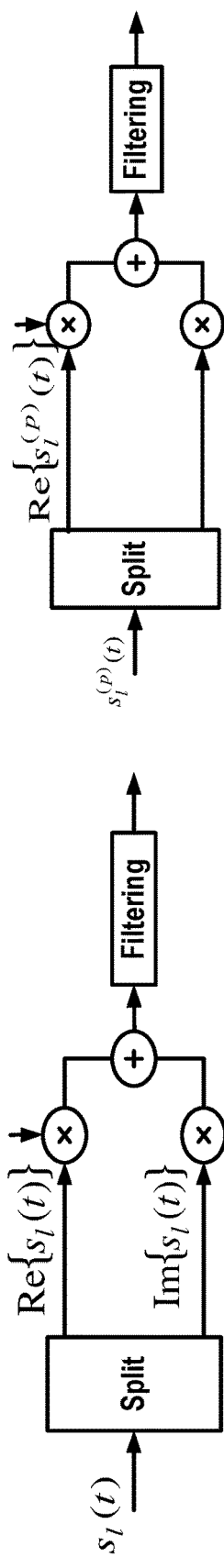
Example uplink modulation
FIG. 5B
Example downlink modulation
FIG. 5D
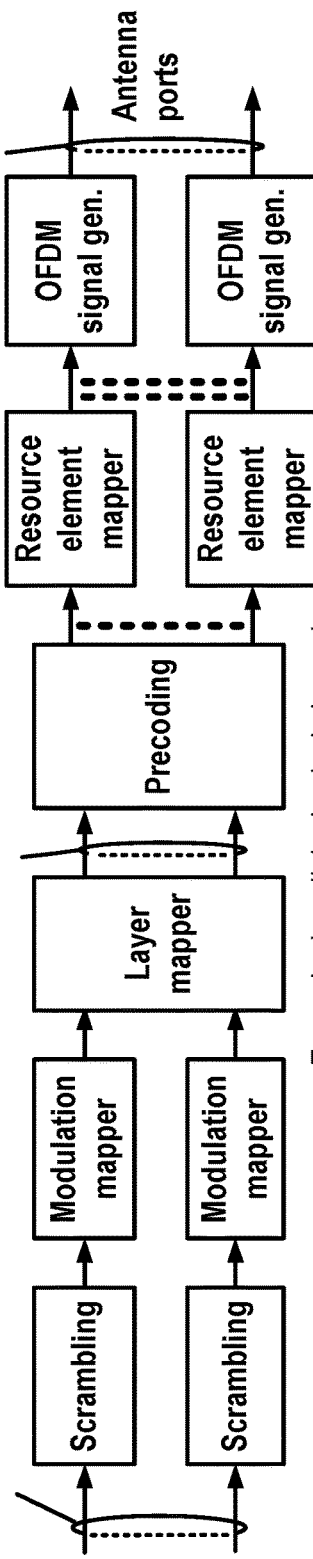
Example downlink physical channel
FIG. 5C Dual-Connectivity- two MAC entities at UE side

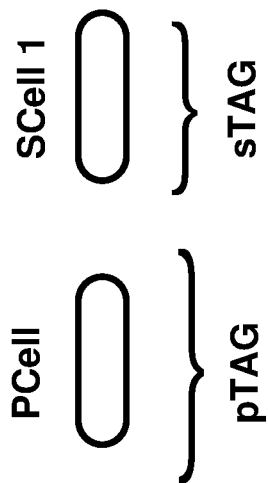
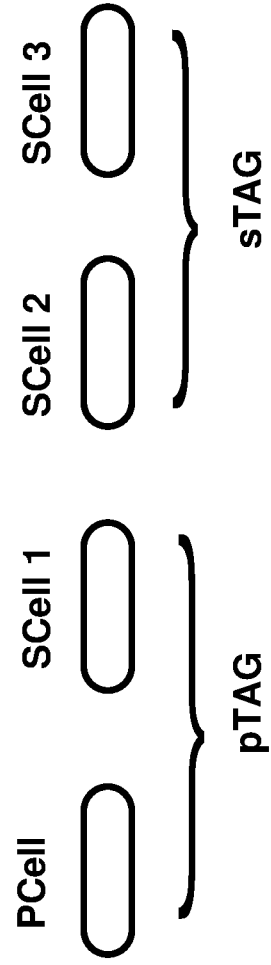
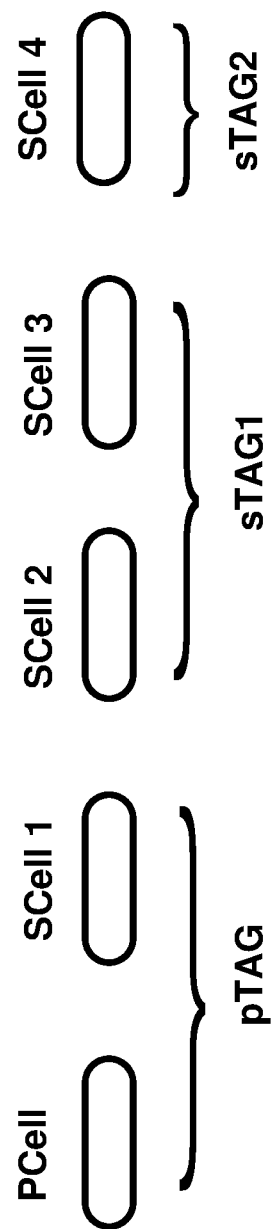
FIG. 8 gNB connected to NGC eLTE eNB connected to NGC

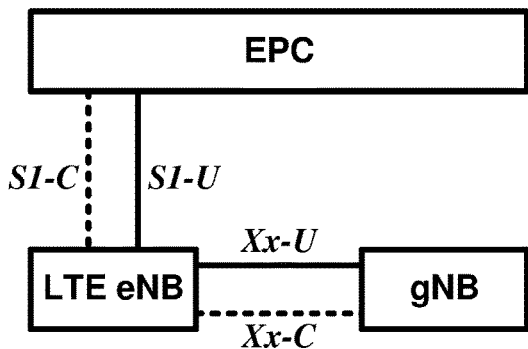

LTE eNB connected to EPC with non-standalone gNB. gNB user plane connected to EPC via LTE eNB.
FIG. 11A

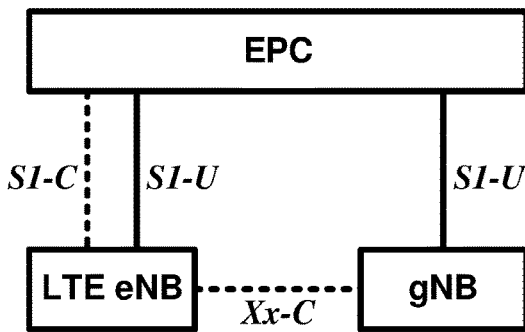

LTE eNB connected to EPC with non-standalone gNB. gNB user plane connected to EPC directly.
FIG. 11B

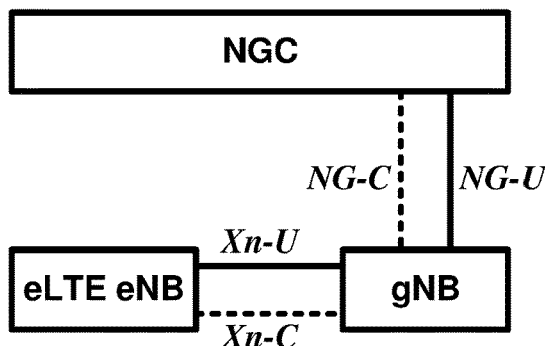

gNB connected to NGC with non-standalone eLTE eNB. eLTE eNB user plane connected to NGC via gNB.
FIG. 11C

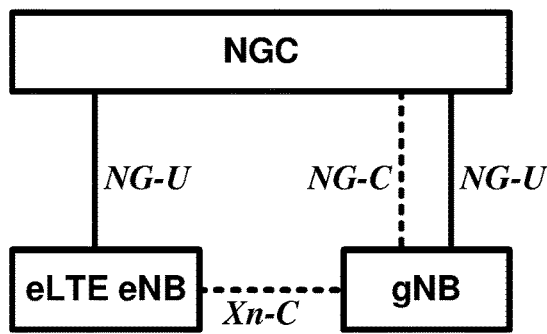

gNB connected to NGC with non-standalone eLTE eNB. eLTE eNB user plane connected to NGC directly.
FIG. 11D

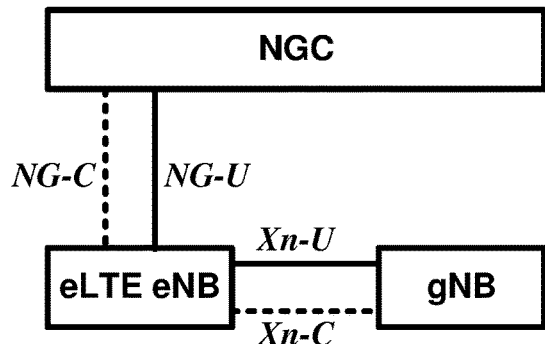

eLTE eNB connected to NGC with non-standalone gNB. gNB user plane connected to NGC via eLTE eNB.
FIG. 11E

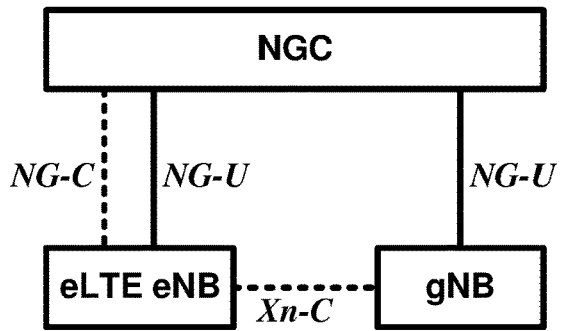

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

MAC RAR

MAC RAR for PRACH enhanced coverage level 2 or 3

MAC RAR for NB-IoT UEs

Beam failure in one TRP

Beam failure in multiple TRPs

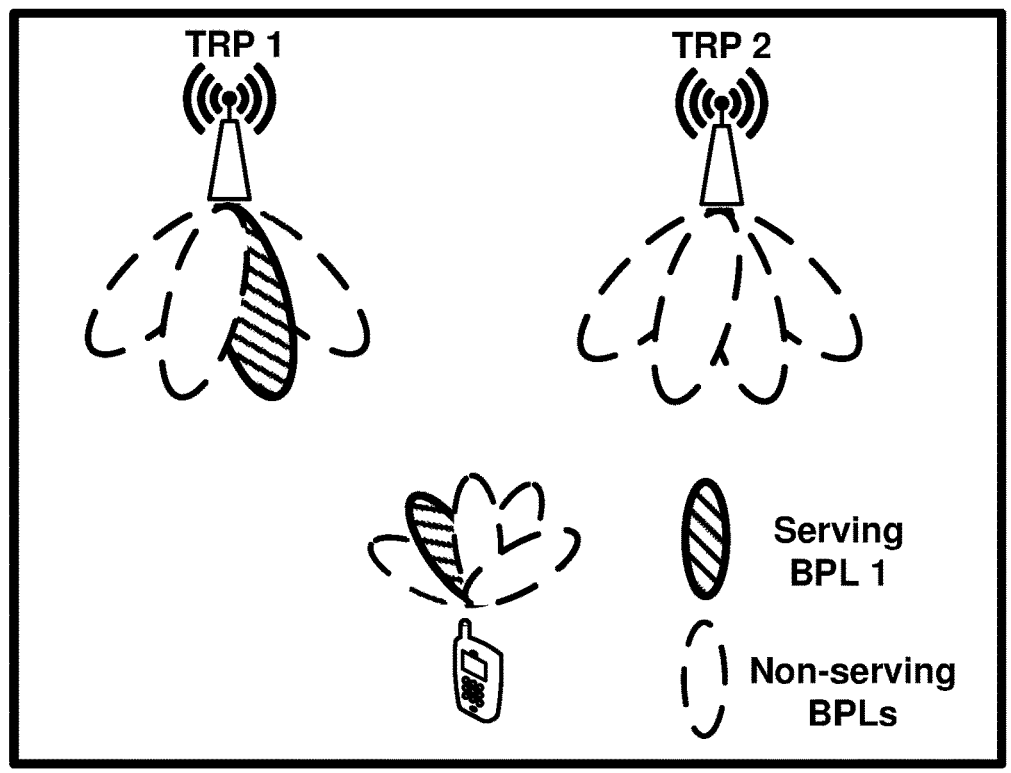
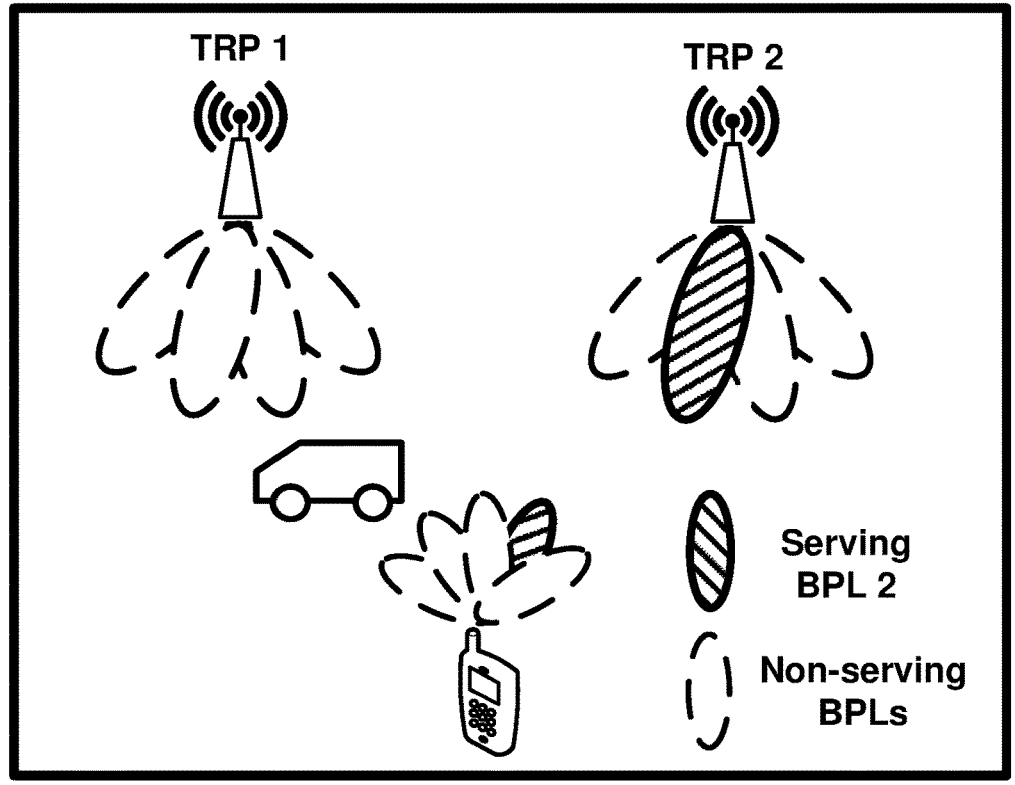
FIG. 29

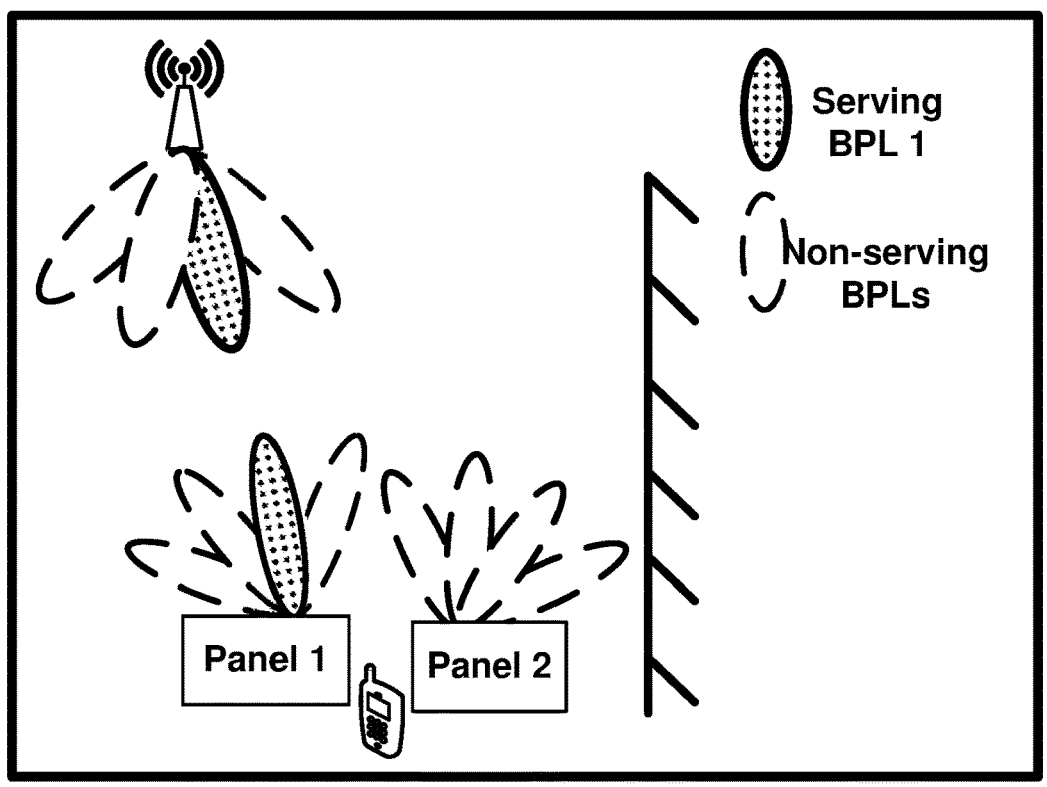
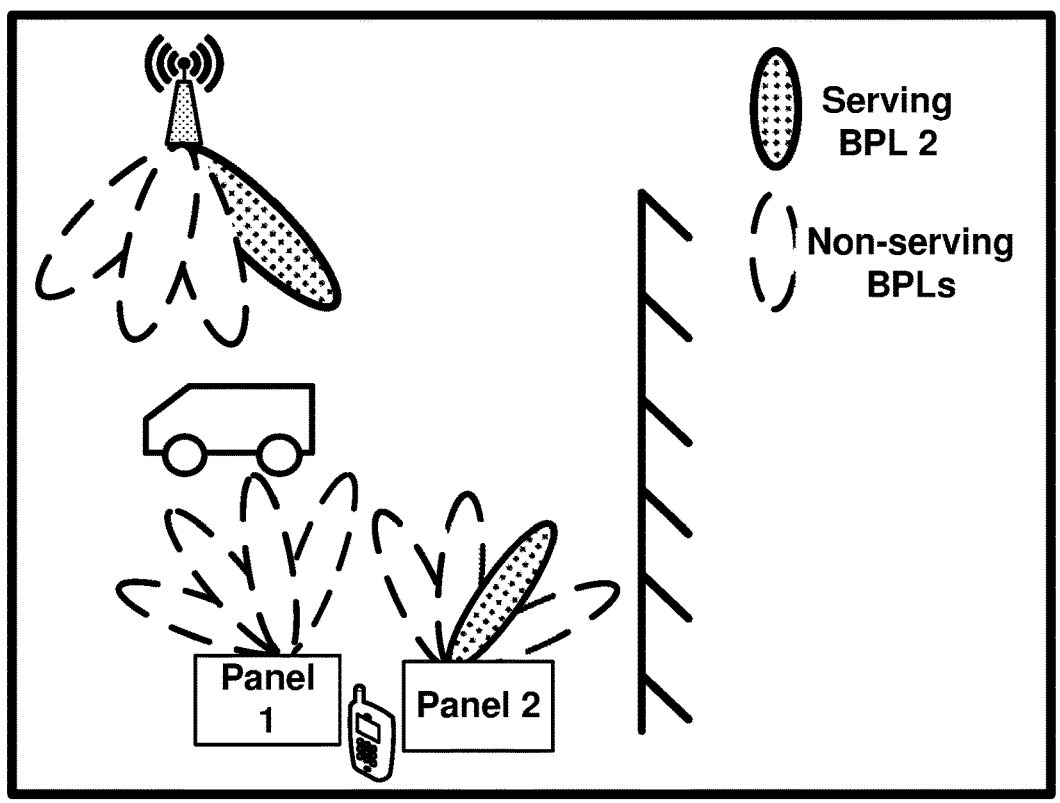
FIG. 30

ABORTING A BEAM FAILURE RECOVERY PROCEDURE BASED ON AN EXPIRY OF A TIME ALIGNMENT TIMER

CROSS-REFERENCE TO RELATED APPLICATIONS

This application is a continuation of U.S. application Ser. No. 16/227,562, filed Dec. 20, 2018, which claims the benefit of U.S. Provisional Application No. 62/615,275 filed Jan. 9, 2018, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per aspect of embodiments of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e) LTE eNB) as per an aspect of embodiments of the present disclosure.

FIG. 29 is an example of beam failure recovery when a UE is configured with multiple TRPs as per an aspect of an embodiment of the present disclosure.

FIG. 30 is an example of beam failure recovery when a UE is configured with multiple antenna panels as per an aspect of an embodiment of the present disclosure.

DETAILED DESCRIPTION OF EMBODIMENTS

Figure 1:
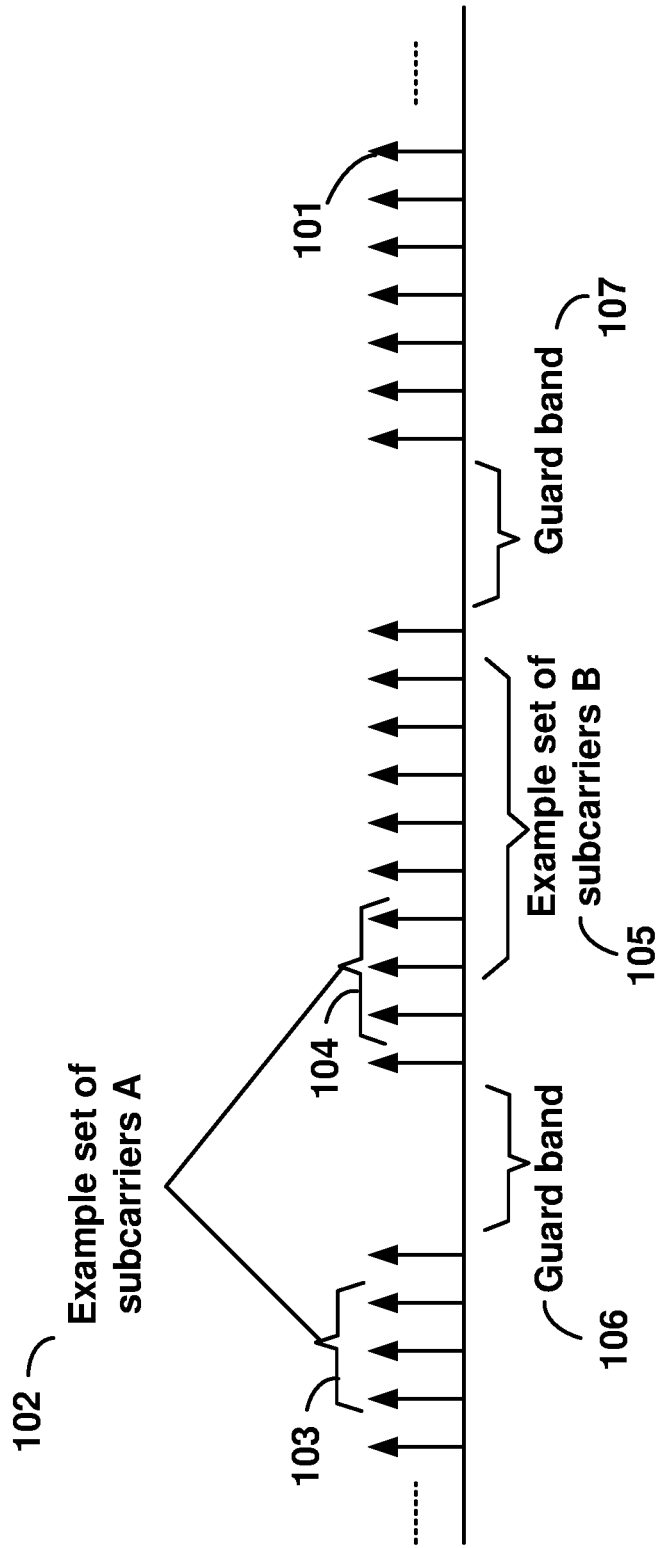
FIG. 1 is a diagram depicting example sets of OFDM subcarriers as per an aspect of an embodiment of the present disclosure.

Example embodiments of the present disclosure enable operation of beam management. Embodiments of the technology disclosed herein may be employed in the technical field of multicarrier communication systems. More particularly, the embodiments of the technology disclosed herein may relate to beam management in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
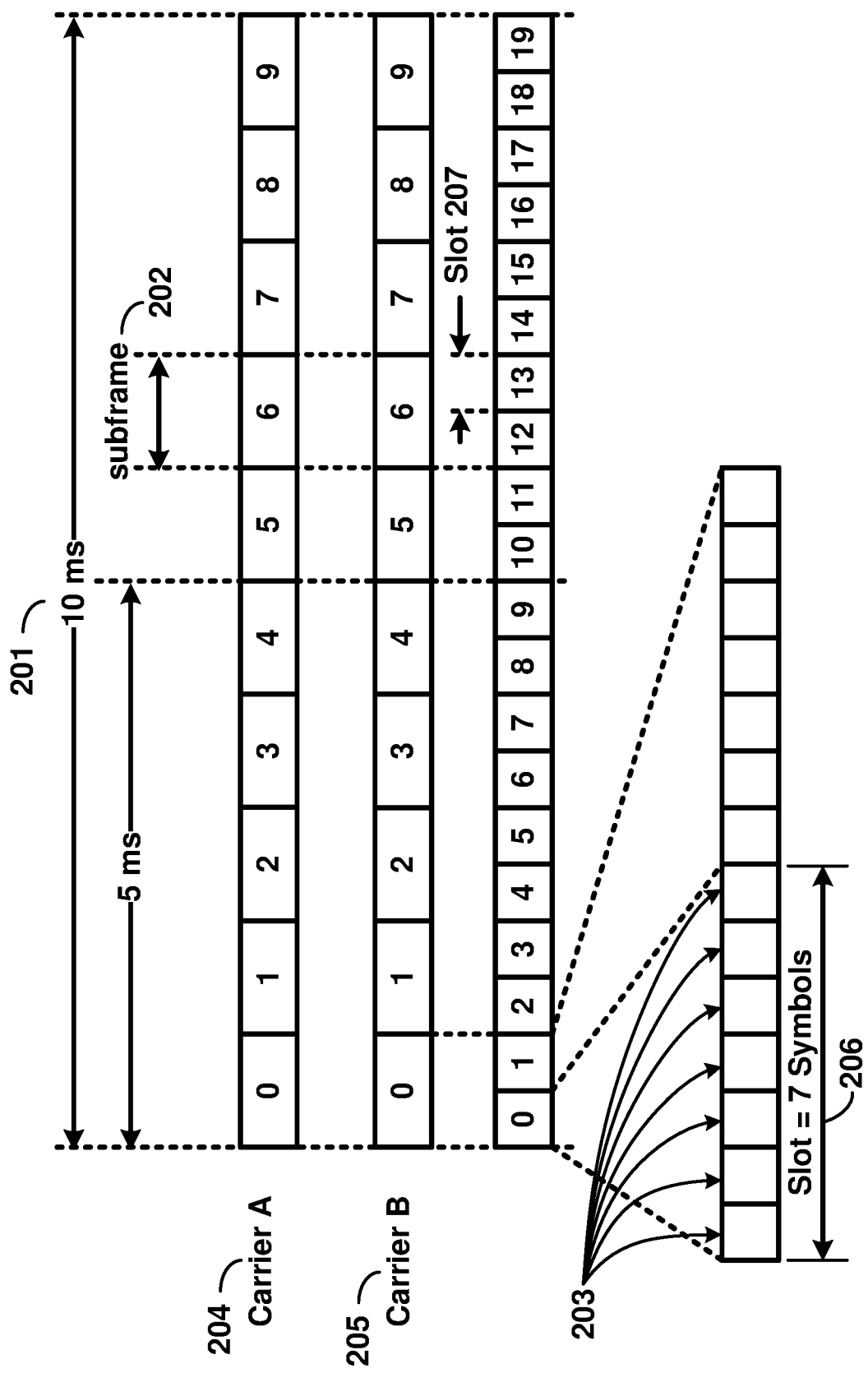
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
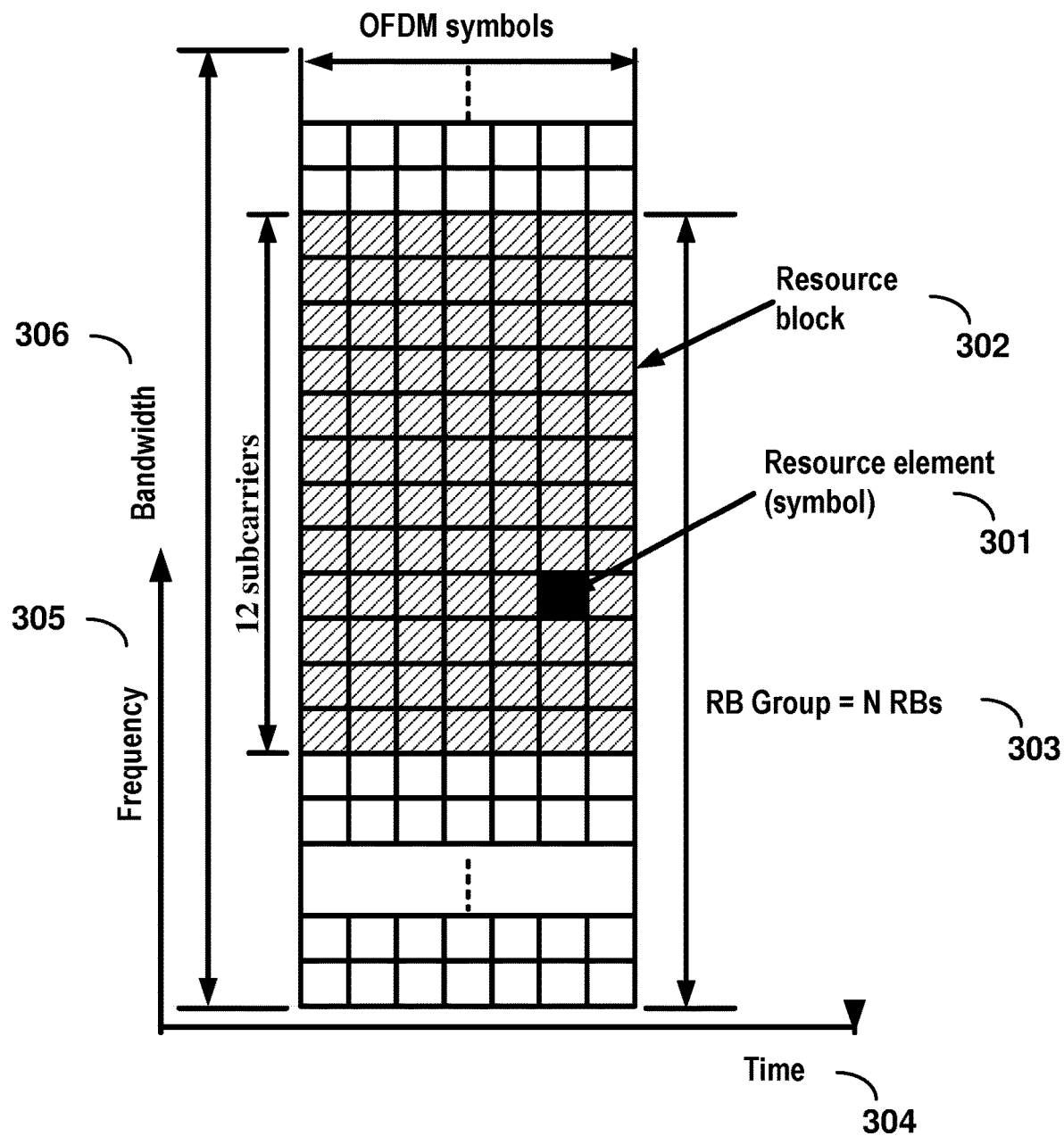
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
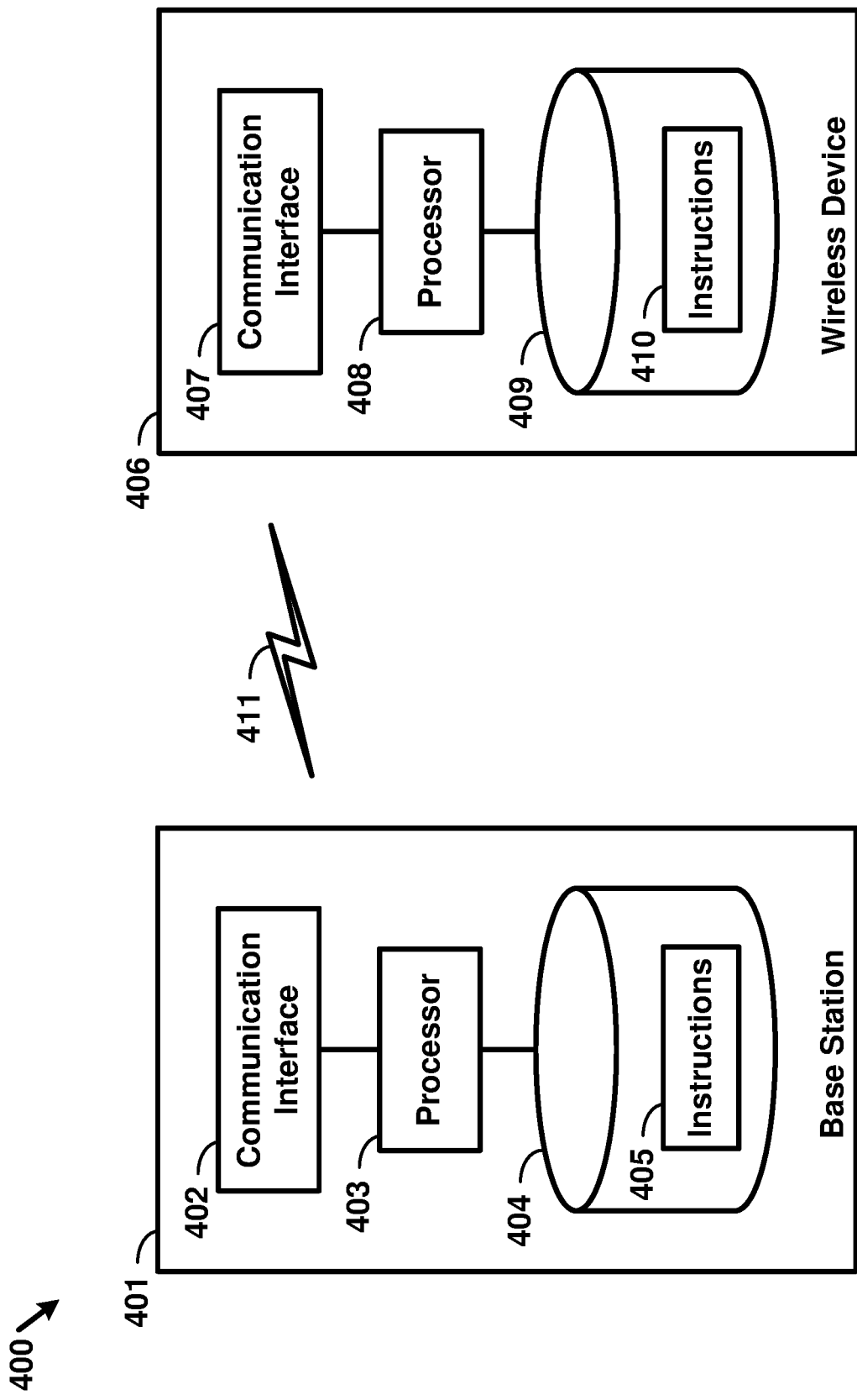
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
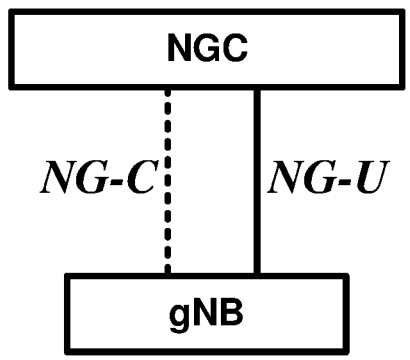
FIG. 10A and FIG. 10B are example diagrams for interfaces between a 5G core network (e.g. NGC) and base stations (e.g. gNB and eLTE eNB) as per an aspect of embodiments of the present disclosure.
Figure 10B:
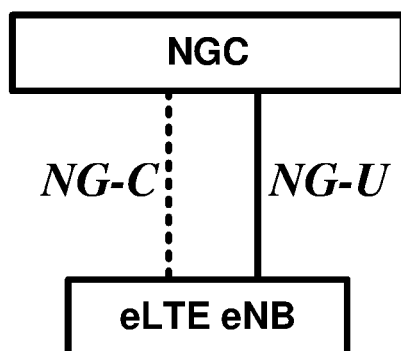

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

CA and Multi-Connectivity

Figure 6:
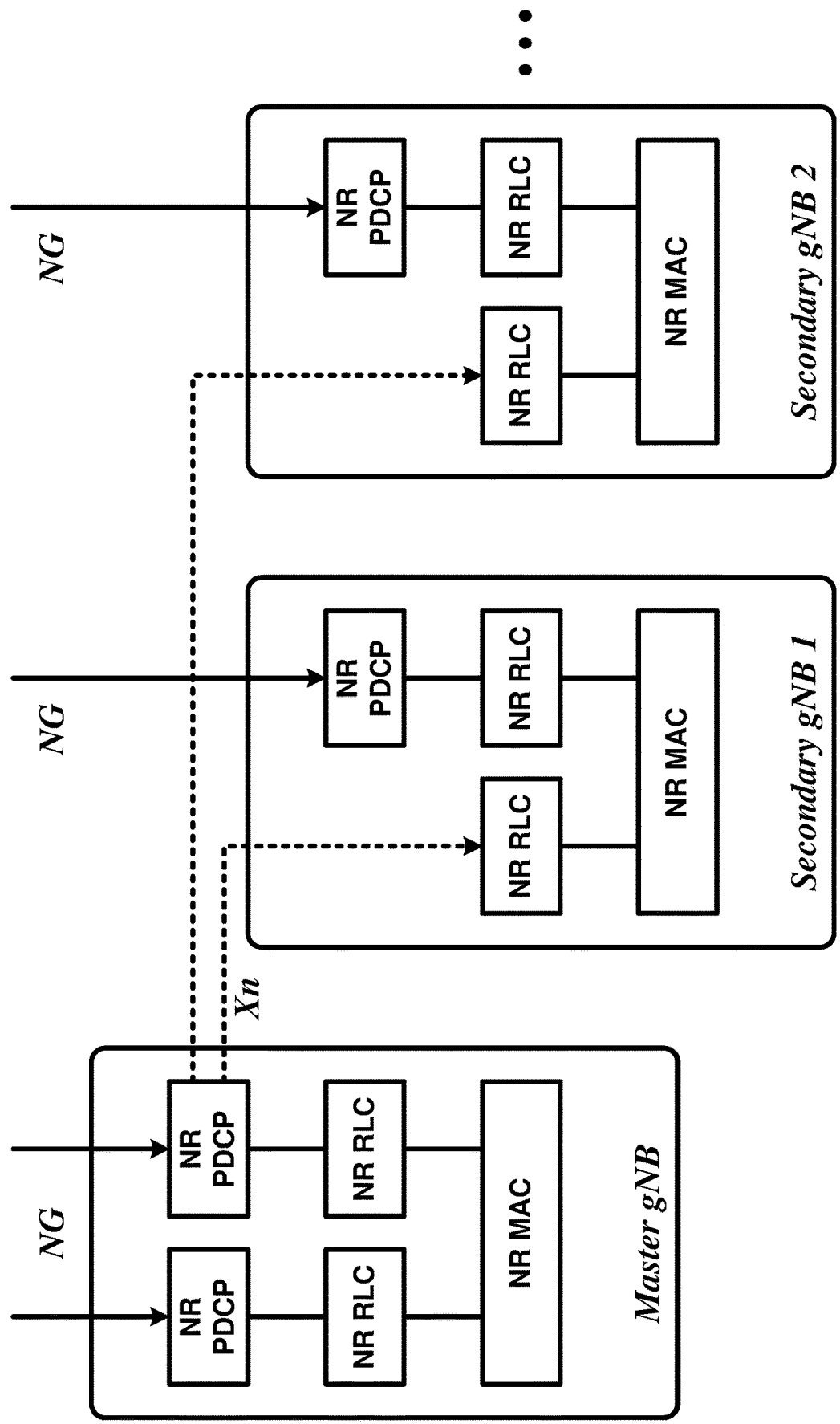
FIG. 6 is an example diagram for a protocol structure with multi-connectivity as per an aspect of an embodiment of the present disclosure.
Figure 7:
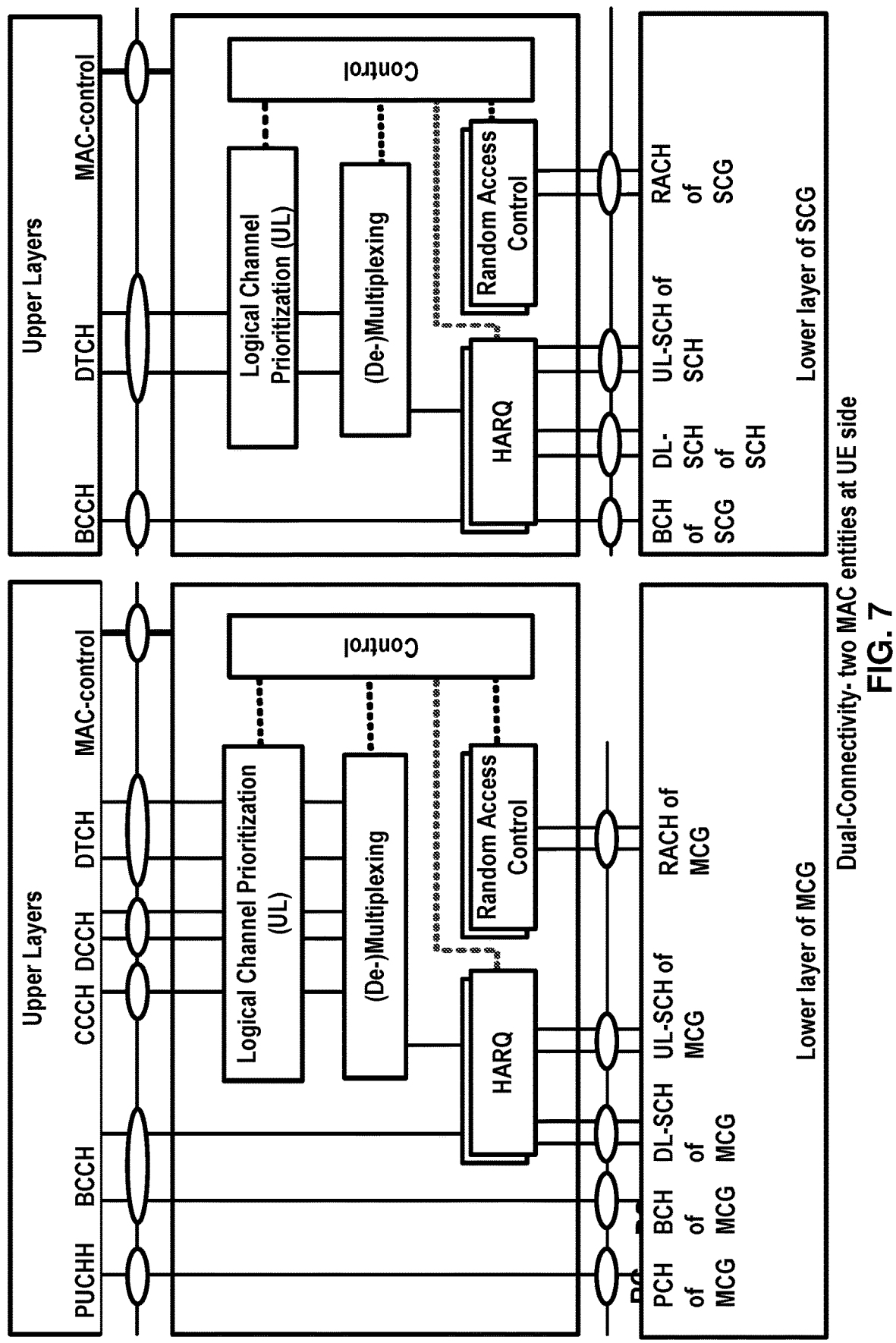
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
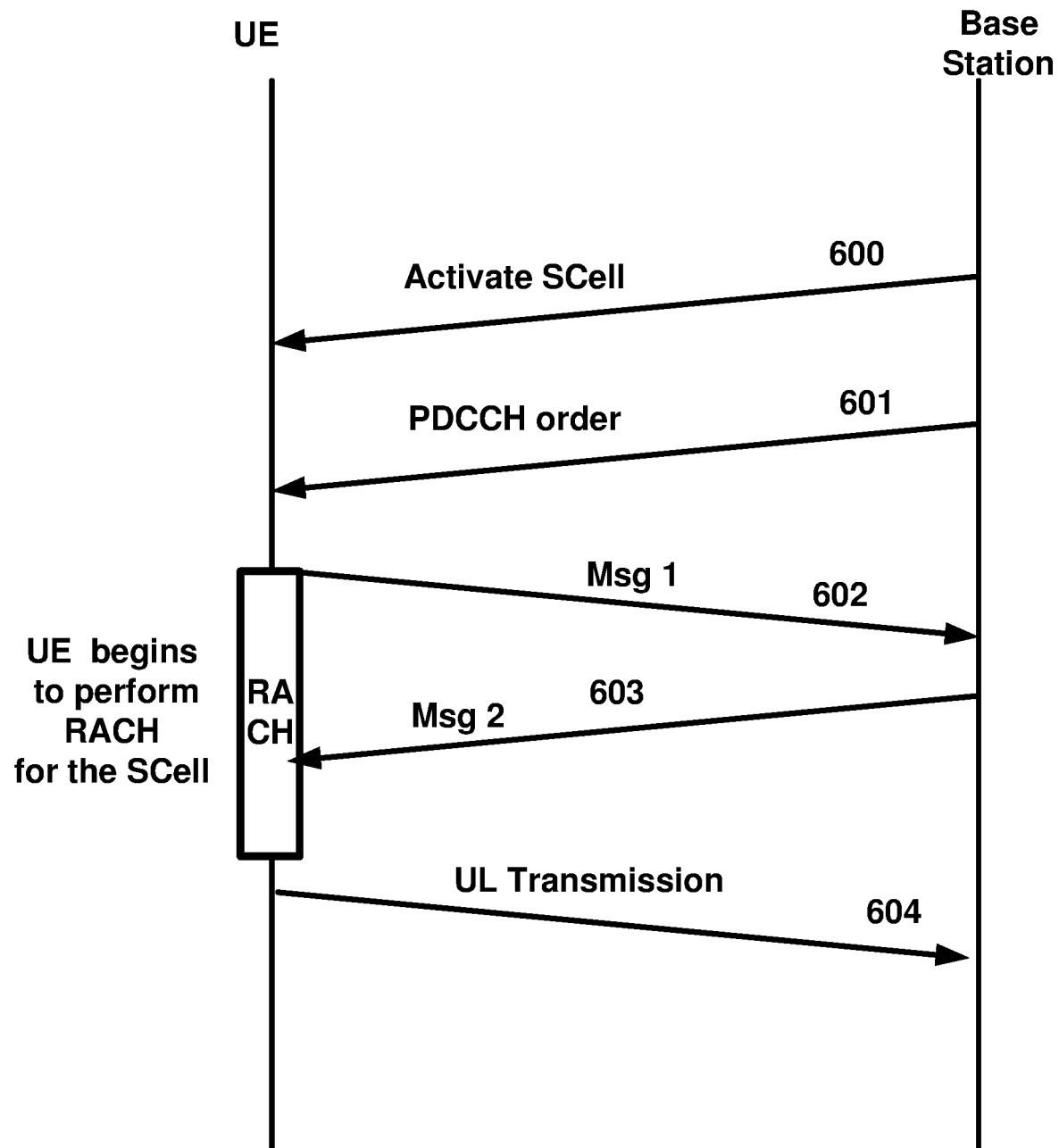
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to a sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

Tight Interworking

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC-_CONNECTED to be configured to utilize radio resources provided by two schedulers located in two base stations (e.g. (e) LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
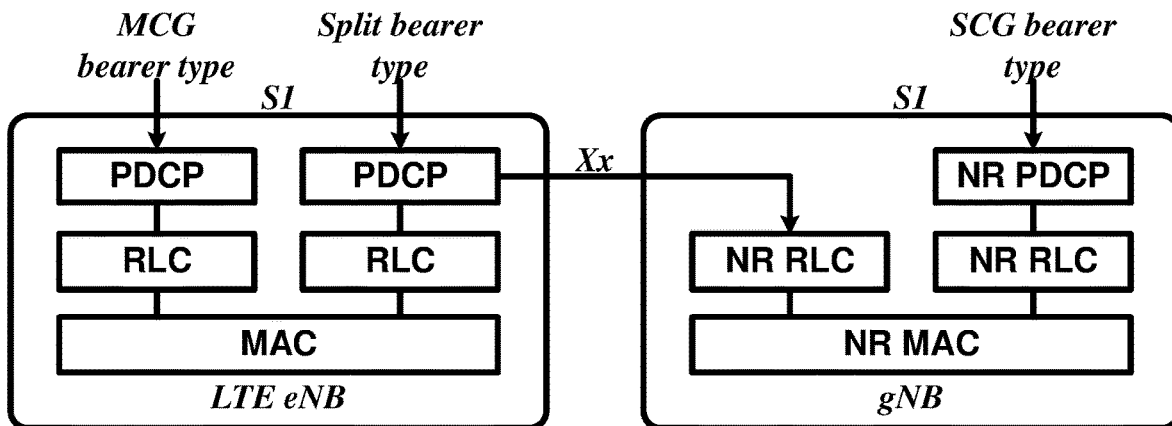
FIG. 12A, FIG. 12B, and FIG. 12C are example diagrams for radio protocol structures of tight interworking bearers as per an aspect of embodiments of the present disclosure.
Figure 12B:
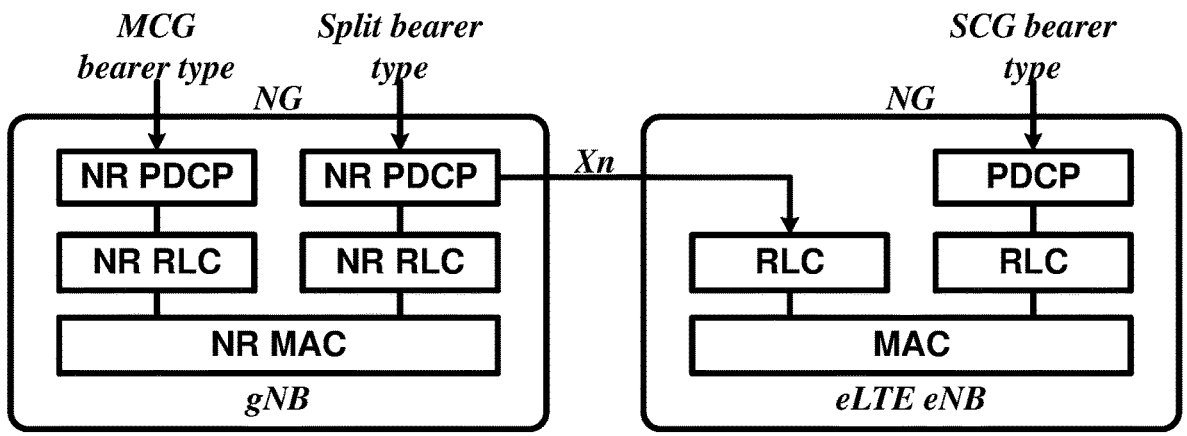
Figure 12C:
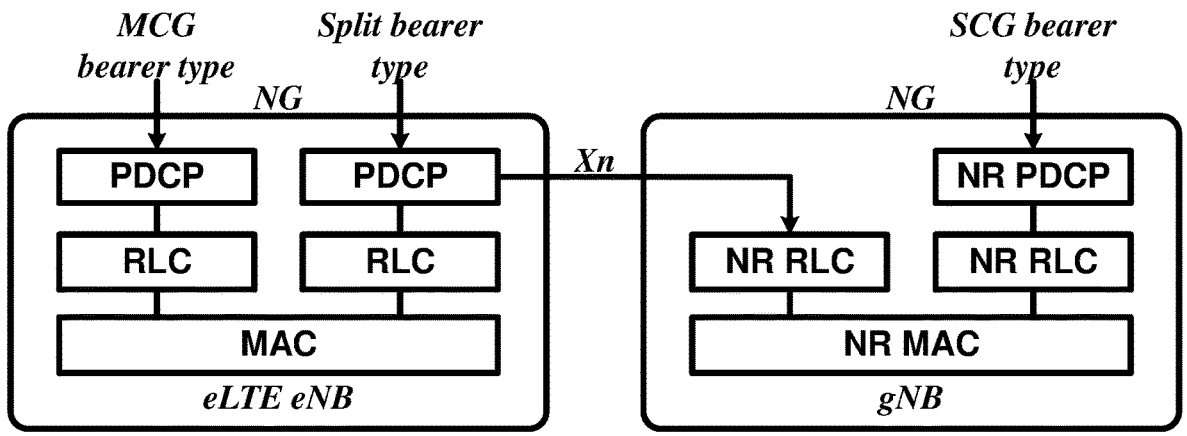

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Functional Split

Figure 13A:
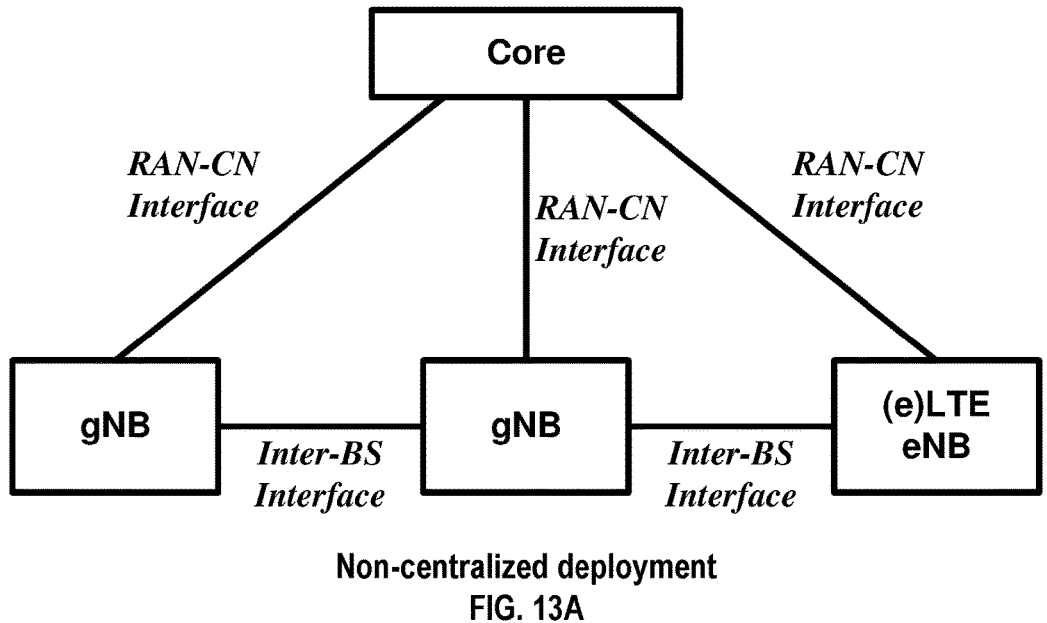
FIG. 13A and FIG. 13B are example diagrams for gNB deployment scenarios as per an aspect of embodiments of the present disclosure.
Figure 13B:
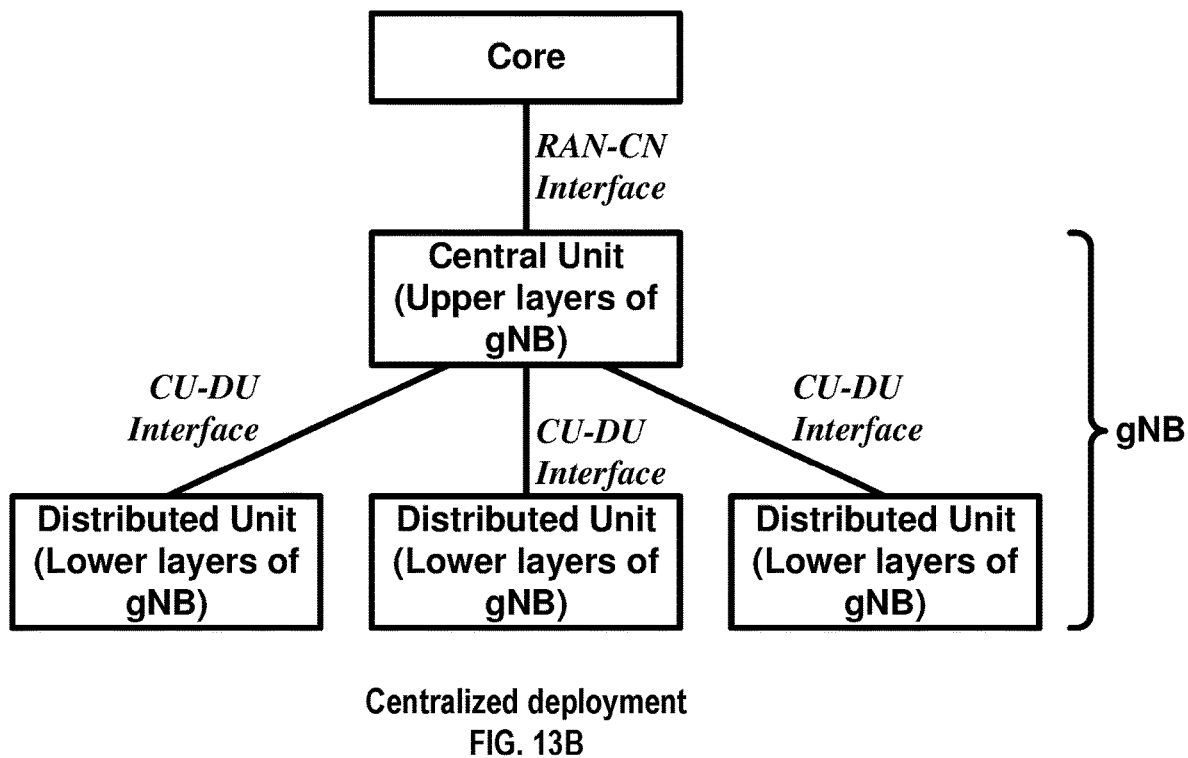

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
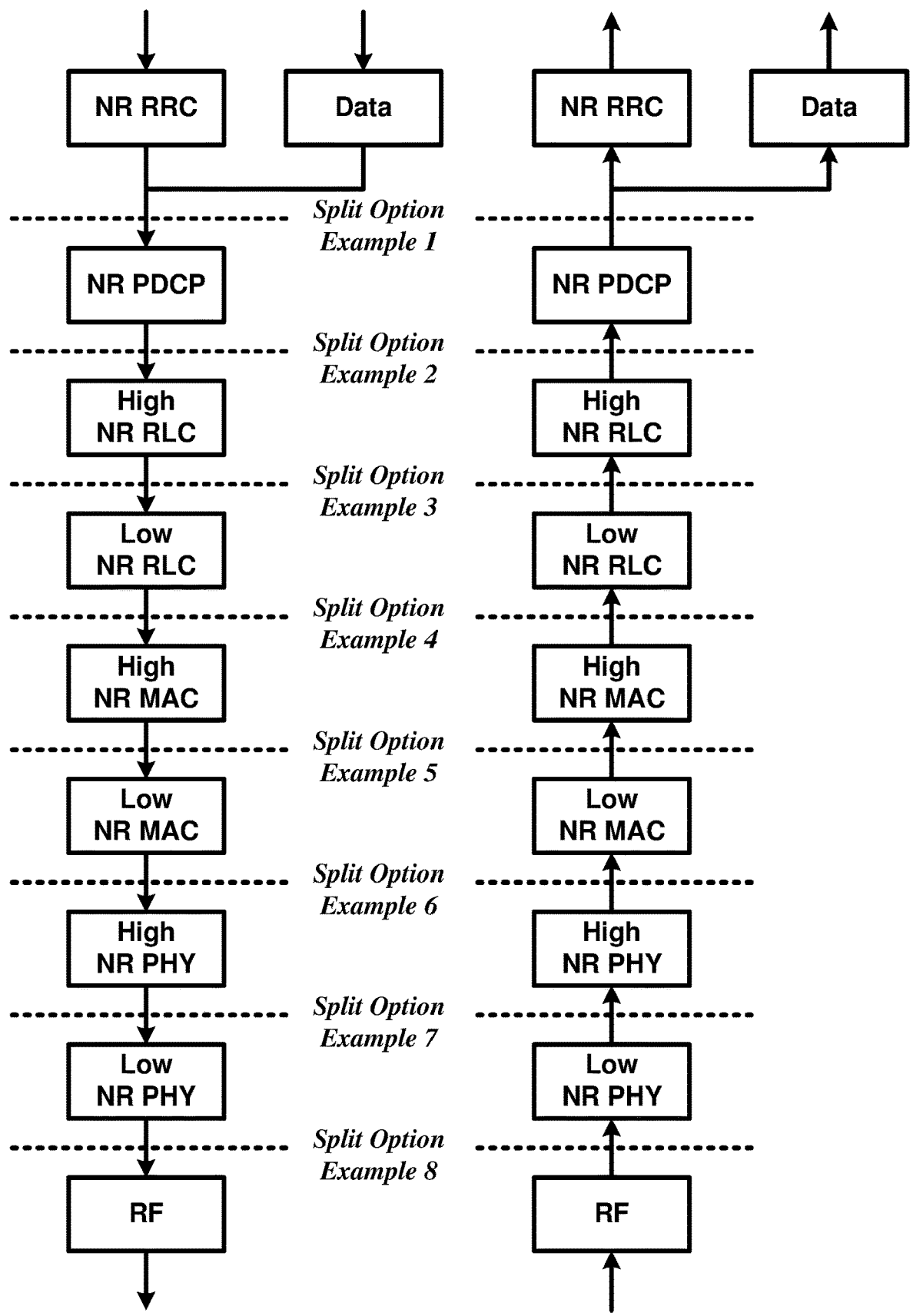
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

Network Slice

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

LAA

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

BWP

In an example embodiment, with operation in bandwidth parts (BWPs) of a serving cell, a UE may be configured by higher layers for the serving cell, a set of bandwidth parts (BWPs) for receptions by the UE (DL BWP set), or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing (SCS) for DL and/or UL BWP, a cyclic (CP) prefix for DL and/or UL BWP, a number of contiguous PRBs for DL and/or UL BWP, an offset of the first PRB for DL and/or UL in the number of contiguous PRBs relative to the first PRB of a reference location, or Q control resource sets if the BWP is a DL BWP.

In an example embodiment, for each serving cell, higher layer signaling may configure a UE with Q control resource sets. In an example, for control resource set q, $0 \leq q < Q$, the configuration may comprise at least one of following: a first OFDM symbol, a number of consecutive OFDM symbols, a set of resource blocks, a CCE-to-REG mapping, a REG bundle size, in case of interleaved CCE-to-REG mapping, or antenna port quasi-collocation.

In an example embodiment, a control resource set may comprise a set of CCEs numbered from 0 to $N_{CCE,q}-1$ where $N_{CCE_q}$ may be the number of CCEs in control resource set q.

In an example embodiment, the sets of PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example embodiment, in non-DRX mode operation, a UE may monitor one or more PDCCH candidate in control resource set q according to a periodicity of $W_{PDCCHq}$ symbols that may be configured by one or more higher layer parameters for control resource set q.

In an example embodiment, if a UE is configured with higher layer parameter, e.g., cif-InSchedulingCell, the carrier indicator field value may correspond to cif-InSchedulingCell.

In an example embodiment, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example embodiment, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example embodiment, a UE may receive PDCCH and PDSCH in a DL BWP according to a configured SCS and CP length for the DL BWP. A UE may transmit PUCCH and PUSCH in an UL BWP according to a configured SCS and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for TDD, a UE may expect that the center frequency for the DL BWP is same as the center frequency for the UL BWP.

In an example embodiment, a UE may not monitor PDCCH when the UE performs measurements over a bandwidth that is not within the DL BWP for the UE.

BWP Config—Initial Active BWP

In an example embodiment, for an initial active DL BWP, UE may identify the bandwidth and frequency of the initial active DL BWP in response to receiving the NR-PBCH.

In an example embodiment, a bandwidth of an initial active DL BWP may be confined within the UE minimum bandwidth for the given frequency band. For example, for flexible for DL information scheduling, the bandwidth may be indicated in PBCH, and/or some bandwidth candidates may be predefined. For example, x bits may be employed for indication.

In an example embodiment, a frequency location of initial active DL BWP may be derived from the bandwidth and SS block, e.g. center frequency of the initial active DL BWP. For example, a SS block may have a frequency offset, as the edge of SS block PRB and data PRB boundary may not be aligned. Predefining the frequency location of SS block and initial active DL BWP may reduce the PBCH payload size, additional bits are not needed for indication of frequency location of initial active DL BWP.

In an example, for the paired UL BWP, the bandwidth and frequency location may be informed in RMSI.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

BWP Config—Default BWP

In an example embodiment, gNB and UE may have different understanding of the starting of the timer since the UE may miss scheduling grants. In an example, the UE may be triggered to switch to the default BWP, but gNB may schedules the UE in the previous active BWP. For example, in the case that the default BWP is nested within other BWPs, gNB may restrict the location of the CORESET of BWP2 to be within BWP1 (e.g., the narrow band BWP1 may be the default BWP). Then the UE may receive CORESET and switch back to BWP2 if it mistakenly switches to the default BWP.

In an example embodiment, for a case that the default BWP and the other BWPs are not overlapped in frequency domain, it may not solve a miss switching problem by restricting the location of the CORESET. For example, the gNB may maintain a timer for a UE. When the timer expires, e.g. there is no data scheduling for the UE for Y ms, or gNB has not received feedback from the UE for Y' ms, the UE may switch to the default BWP, and the gNB may send paging signal or re-schedule the UE in the default BWP.

In an example embodiment, gNB may not fix the default BWP to be the same as initial active BWP. Since the initial active DL BWP may be the SS block bandwidth which is common to UEs in the cell, the traffic load may be very heavy if many UEs fall back to such small bandwidth for data transmission. Configuring the UEs with different default BWPs may help to balance the load in the system bandwidth.

In an example embodiment, on a SCell, there may be no initial active BWP since the initial access is performed on the PCell. For example, the initially activated DL BWP and/or UL BWP when the SCell is activated may be configured or reconfigured by RRC signaling. In an example, the default BWP of the SCell may also be configured or reconfigured by RRC signaling. To strive for a unified design for both PCell and SCell, the default BWP may be configured or reconfigured by the RRC signaling, and the default BWP may be one of the configured BWPs of the UE.

In an example embodiment, gNB may configure UE-specific default DL BWP other than initial active BWP after RRC connection, e.g., for the purpose of load balancing. The default BWP may support other connected mode operations (besides operations supported by initial active BWP) for example fall back and connected mode paging. In this case, the default BWP may comprise common search space, at least the search space needed for monitoring the pre-emption indications. For example, for FDD, the default DL and UL BWPs may be independently configured to the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, gNB may configure UE with multiple BWPs. For example, the multiple BWPs may share at least one CORESET including default BWP. For example, CORESET for RMSI may be shared for all configured BWP. Without going back to another BWP or default BWP, the UE may receive control information via the common CORESET. To minimize the ambiguity of resource allocation, the common CORESET may schedule data within only default BWP. For example, frequency region of default BWP may belong to all the configured BWPs.

In an example embodiment, when the configured BWP is associated with a different numerology from default BWP, a semi-static pattern of BWP switching to default BWP may be performed. For example, to check RMSI at least periodically, switching to default BWP may be performed. This may be necessary particularly when BWPs use different numerologies.

In an example embodiment, in terms of reconfiguration of default BWP from initial BWP, it may be considered for RRC connected UEs. For RRC IDLE UEs, default BWP may be same as initial BWP (or, RRC IDLE UE may fallback to initial BWP regardless of default BWP). If a UE performs measurement based on SS block, reconfiguration of default BWP outside of initial BWP may become very inefficient due to frequent measurement gap. In this sense, if default BWP is reconfigured to outside of initial BWP, the following conditions may be satisfied: a UE is in CONNECTED mode, and a UE is not configured with SS block based measurement for both serving cell and neighbor cells.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on PCell may be an initial active DL BWP for transmission of RMSI, comprising RMSI CORESET with CSS. The RMSI CORESET may comprise USS. The initial active/default BWP may remain active BWP for the user also after UE becomes RRC connected.

BWP Config—Association Between UL BWP and DL BWP

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, making an association between DL BWP and UL BWP may allow that one activation/deactivation command may switch both DL and UL BWPs at once. Otherwise, separate BWP switching commands may be necessary.

In an example embodiment, a DL BWP and a UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and a UL BWP to a UE for activation in a FDD system. In an example, gNB may indicate a DL BWP and a UL BWP with the same center frequency to a UE for activation in a TDD system. Since the activation/deactivation of the BWP of the UE is instructed by gNB, no paring or association of the DL BWP and UL BWP may be mandatory even for TDD system.

In an example embodiment, the association between DL carrier and UL carrier within a serving cell may be done by carrier association. For example, for TDD system, UE may not be expected to retune the center frequency of channel BW between DL and UL. To achieve it, an association between DL BWP and UL BWP may be needed. For example, a way to associate them may be to group DL BWP configurations with same center frequency as one set of DL BWPs and group UL BWP configurations with same center frequency as one set of UL BWPs. The set of DL BWPs may be associated with the set of UL BWPs sharing the same center frequency.

For an FDD serving cell, there may be no association between DL BWP and UL BWP if the association between DL carrier and UL carrier within a serving cell may be done by carrier association.

BWP Config—Number of BWPs

In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWPs may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, at least 2 DL and 2 UL BWP may be supported by a UE for a BWP adaption. For example, the total number of BWP supported by a UE may be given by 2≤Number of DL/UL BWP≤floor (Network maximum BW/UE minimum DL/UL BW). For example, a maximum number of configured BWPs may be 4 for DL and UL respectively. For example, a maximum number of configured BWPs for UL may be 2.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, a required maximum number of configured BWPs (may be not comprising the initial BWP) may depend on the flexibility needed for a BWP functionality. For example, in the minimal case of supporting bandlimited devices, it may be sufficient to be able to configure one DL BWP and one UL BWP (or a single DL/UL BWP pair in case of unpaired spectrum). For example, to support bandwidth adaptation, there may be a need to configure (at least) two DL BWPs and a single uplink BWP for paired spectrum (or two DL/UL BWP pairs for unpaired spectrum). For example, to support dynamic load-balancing between different parts of the spectrum, there may be a need to configure one or more DL (UL) BWPs that jointly cover different parts of the downlink (uplink) carrier. In an example, for dynamic load balancing, it may be sufficient with two BWPs. In addition to the two BWPs, two additional BWPs may be needed for bandwidth adaptation. For example, a Maximum number of configured BWPs may be four DL BWPs and two UL BWPs for a paired spectrum. For example, a Maximum number of configured BWPs may be four DL/UL BWP pairs for an unpaired spectrum.

BWP Configuration—Coreset

In an example embodiment, UE may monitor for RMSI and broadcast OSI which may be transmitted by the gNB within the common search space (CSS) on the PCell. In an example, RACH response and paging control monitoring on the PCell may be transmitted within the CSS. In an example, when a UE is allowed to be on an active BWP configured with UE-specific search space (USSS or USS), the UE may not monitor the common search space.

In an example, for a PCell, at least one of configured DL bandwidth parts may comprise at least one CORESET with a CSS type. For example, to monitor RMSI and broadcast OSI, UE may periodically switch to the BWP containing the CSS. In an example, the UE may periodically switch to the BWP containing the CSS for RACH response and paging control monitoring on the PCell.

In an example, if BWP switching to monitor the CSS happens frequently, it may result in increasing overhead. In an example, the overhead due to the CSS monitoring may depends on overlapping in frequency between any two BWPs. In an example, in a nested BWP configuration where one BWP is a subset of another BWP, the same CORESET configuration may be employed across the BWPs. In this case, unless reconfigured otherwise, a default BWP may be the one containing the CSS, and another BWP may contain the CSS. In an example, the BWPs may be partially overlapping. If the overlapping region is sufficient, a CSS may be across a first BWP and a second BWP. In an example, two non-overlapping BWP configurations may exist.

In an example embodiment, there may be one or more benefits of configuring the same CORESET containing the CSS across BWPs. For example, RMSI and broadcast OSI monitoring may be handled without necessitating BWP switching. In an example, RACH response and paging control monitoring on the PCell may also be handled without switching. For example, if CORESET configuration is the same across BWPs, robustness for BWP switching may improve, because even if gNB and UE are out-of-sync as to which BWP is currently active, the DL control channel may work. In an example, one or more constraints on BWP configuration may not be too much, considering that BWP may be for power saving, even the nested configuration may be very versatile for different applications.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, for pre-emption indication and other group-based commands on a serving cell, gNB may transmit the information on GCSS. UE may monitor the GCSS for the information.

In an example embodiment, NR may configure a CORESET without using a BWP. For example, NR support to configure a CORESET based on a BWP to reduce signaling overhead. In an example, a first CORESET for a UE during an initial access may be configured based on its default BWP. In an example, a CORESET for monitoring PDCCH for RAR and paging may be configured based on a DL BWP. In an example, the CORESET for monitoring group common (GC)-PDCCH for SFI may be configured based on a DL BWP. In an example, the CORESET for monitoring GC-DCI for pre-emption indication may be configured based on a DL BWP. In an example, the BWP index may be indicated in the CORESET configuration. In an example, the default BWP index may not be indicated in the CORESET configuration.

In an example embodiment, the contention-based random access (CBRA) RACH procedure may be supported via an initial active DL and UL BWPs since the UE identity is unknown to the gNB. In an example, the contention-free random access (CFRA) RACH procedure may be supported via the USS configured in an active DL BWP for the UE. For example, in this case, an additional CSS for RACH purpose may not need to be configured per BWP. For example, idle mode paging may be supported via an initial active DL BWP and the connected mode paging may be supported via a default BWP. No additional configurations for the BWP for paging purposes may not be needed for paging. For the case of pre-emption, a configured BWP (on a serving cell) may have the CSS configured for monitoring the pre-emption indications.

In an example embodiment, for a configured DL BWP, a group-common search space may be associated with at least one CORESET configured for the same DL BWP. For example, depending on the monitoring periodicity of different group-common control information types, it may not be practical for the UE to autonomously switch to a default BWP where a group-common search space is available to monitor for such DCI. In this case, if there is at least one CORESET configured on a DL BWP, it may be possible to configure a group-common search space in the same CORESET.

BWP Config—Other

In an example embodiment, a center frequency of the activated DL BWP may not be changed. In an example, the center frequency of the activated DL BWP may be changed. For example, For TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example embodiment, at least one of configured DL BWPs comprises one CORESET with common search space (CSS) at least in primary component carrier. The CSS may be needed at least for RACH response (msg2) and preemption indication.

In an example, for the case of no periodic gap for RACH response monitoring on PCell, one of configured DL BWPs may comprise one CORESET with the CSS type for RMSI & OSI. For PCell, a configured DL BWP may comprise one CORESET with the CSS type for RACH response & paging control for system information update. For a serving cell, a configured DL BWP may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, a CSS may be configured on a non-initial BWP for RAR and paging.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

Explicit Activation/Deactivation Via DCI w/o Scheduling

In an example embodiment, a DCI may explicitly indicate activation/deactivation of BWP.

For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, support for a single scheduling DCI to trigger active BWP switching may be motivated by dynamic BWP adaptation for UE power saving during active state (which may comprise ON duration and when inactivity timer is running when C-DRX is configured). For example, with a C-DRX enabled, a UE may consume significant amount of power monitoring PDCCH without decoding any grant. To reduce the power consumption during PDCCH monitoring, two BWPs may be configured: a narrower BWP for PDCCH monitoring, and a wider BWP for scheduled data. In such a case, the UE may switch back-and-forth between the narrower BWP and the wider BWP, depending on the burstiness of the traffic. For example, the UE may be revisiting a BWP that it has dwelled on previously. For this case, combining a BWP switching indication and a scheduling grant may result in low latency and reduced signaling overhead for BWP switching.

In an example embodiment, a SCell activation and deactivation may trigger the corresponding action for its configured BWP. In an example, a SCell activation and deactivation may not trigger the corresponding action for its configured BWP.

In an example embodiment, a dedicated BWP activation/deactivation DCI may impact a DCI format. For example, a scheduling DCI with a dummy grant may be employed. the dummy grant may be constructed by invalidating one or some of the fields, for example, the resource allocation field. In an example, it may be feasible to leverage a fallback scheduling DCI format (which contains a smaller payload) to improve the robustness for BWP DCI signaling, without incurring extra work on introducing a new DCI format.

Explicit Activation/Deactivation Via DCI w/Scheduling

In an example embodiment, a DCI with data assignment may comprise an indication to activate/deactivate BWP along with a data assignment. For example, a UE may receive a combined data allocation and BWP activation/deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP, and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORESETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission.

Timer-Based Activation/Deactivation

In an example embodiment, a timer-based activation/deactivation BWP may be supported. For example, a timer for activation/deactivation of DL BWP may reduce signaling overhead and may enable UE power savings. The activation/deactivation of a DL BWP may be based on an inactivity timer (referred to as a BWP inactive (or inactivity) timer). For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate the default BWP and may deactivate the active BWP.

For example, a BWP inactive timer may be beneficial for power saving for a UE switching to a default BWP with smaller BW and fallback for a UE missing DCI based activation/deactivation signaling to switch from one BWP to another BWP.

In an example embodiment, triggering conditions of the BWP inactive timer may follow the ones for the DRX timer in LTE. For example, an On-duration of the BWP inactive timer may be configured, and the timer may start when a UE-specific PDCCH is successfully decoded indicating a new transmission during the On-duration. The timer may restart when a UE-specific PDCCH is successfully decoded indicating a new transmission. The timer may stop once the UE is scheduled to switch to the default DL BWP.

In an example embodiment, the BWP inactive timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactive timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a DL BWP inactive timer may be defined separately from a UL BWP inactive timer. For example, there may be some ways to set the timer, e.g., independent timer for DL BWP and UL BWP, or a joint timer for DL and UL BWP. In an example, for the separate timers, assuming both DL BWP and UL BWP are activated, if there is DL data and UL timer expires, UL BWP may not be deactivated since PUCCH configuration may be affected. For example, for the uplink, if there is UL feedback signal related to DL transmission, the timer may be reset (Or, UL timer may not be set if there is DL data). On the other hand, if there is UL data and the DL timer expires, there may be no issue if the DL BWP is deactivated since UL grant is transmitted in the default DL BWP.

In an example embodiment, a BWP inactivity-timer may enable the fallback to default BWP on PCell and SCell.

In an example embodiment, a timer-based activation/deactivation of BWP may be similar to a UE DRX timer. For example, there may not be a separate inactivity timer for BWP activation/deactivation for the UE DRX timer. For example, one of the UE DRX inactivity timer may trigger BWP activation/deactivation.

For example, there may be a separate inactivity timer for BWP activation/deactivation for the UE DRX timer. For example, the DRX timers may be defined in a MAC layer, and the BWP timer may be defined in a physical layer. In an example, If the same DRX inactivity timer is employed for BWP activation/deactivation, UE may stay in a wider BWP for as long as the inactivity timer is running, which may be a long time. For example, the DRX inactivity timer may be set to a large value of 100~200 milliseconds for C-DRX cycle of 320 milliseconds, larger than the ON duration (10 milliseconds). This may imply that power saving due to narrower BWP may not be achievable. To realize potential of UE power saving promised by BWP switching, a new timer may be defined, and it may be configured to be smaller than the DRX inactivity timer. From the point of view of DRX operation, BWP switching may allow UE to operate at different power levels during the active state, effectively providing some more intermediate operating points between the ON and OFF states.

Guard Period/Measurement Gap

In an example embodiment, with a DCI explicit activation/deactivation of BWP, a UE and a gNB may not be synchronized with respect to which BWP is activated/deactivated. The gNB scheduler may not have CSI information related to a target BWP for channel-sensitive scheduling. The gNB may be limited to conservative scheduling for one or more first several scheduling occasions. The gNB may rely on periodic or aperiodic CSI-RS and associated CQI report to perform channel-sensitive scheduling. Relying on periodic or aperiodic CSI-RS and associated CQI report may delay channel-sensitive scheduling and/or lead to signaling overhead (e.g. in the case where the gNB may request aperiodic CQI). To mitigate a delay in acquiring synchronization and channel state information, a UE may transmit an acknowledgement upon receiving an activation/deactivation of BWP. For example, a CSI report based on the provided CSI-RS resource may be transmitted after activation of a BWP and is employed as acknowledgment of activation/deactivation.

In an example embodiment, a gNB may provide a sounding reference signal for a target BWP after a UE tunes to a new bandwidth. In an example, the UE may report the CSI, which is employed as an acknowledgement by the gNB to confirm that the UE receive an explicit DCI command and activates/deactivates the appropriate BWPs. In an example, for the case of an explicit activation/deactivation via DCI with data assignment, a first data assignment may be carried out without a CSI for the target BWP In an example embodiment, a guard period may be defined to take RF retuning and the related operations into account. For example, a UE may neither transmit nor receive signals in the guard period. A gNB may need to know the length of the guard period. For example, the length of the guard period may be reported to the gNB as a UE capability. The length of the guard period may be closely related on the numerologies of the BWPs and the length of the slot. For example, the length of the guard period for RF retuning may be reported as a UE capability. In an example, the UE may report the absolute time in μs. in an example, the UE may report the guard period in symbols.

In an example embodiment, after the gNB knows the length of the guard period by UE reporting, the gNB may want to keep the time domain position of guard period aligned between the gNB and the UE. For example, the guard period for RF retuning may be predefined for time pattern triggered BWP switching. In an example, for the BWP switching triggered by DCI and timer, the guard period for DCI and timer based BWP switching may be an implementation issue. In an example, for BWP switching following some time pattern, the position of the guard period may be defined. For example, if the UE is configured to switch periodically to a default BWP for CSS monitoring, the guard period may not affect the symbols carrying CSS.

In an example embodiment, a single DCI may switch the UE's active BWP form one to another (of the same link direction) within a given serving cell. A separate field may be employed in the scheduling DCI to indicate the index of the BWP for activation, such that UE may determine the current DL/UL BWP according to a detected DL/UL grant without requiring any other control information. In case the BWP change does not happen during a certain time duration, the multiple scheduling DCIs transmitted in this duration may comprise the indication to the same BWP. During the transit time when potential ambiguity may happen, gNB may send scheduling grants in the current BWP or together in the other BWPs containing the same target BWP index, such that UE may obtain the target BWP index by detecting the scheduling DCI in either one of the BWPs. The duplicated scheduling DCI may be transmitted K times. When UE receive one of the K times transmissions, UE may switch to the target BWP and start to receive or transmit (UL) in the target BWP according to the BWP indication field.

In an example embodiment, switching between BWPs may not introduce large time gaps when UE may not be able to receive due to re-tuning, neither after detecting short inactivity (Case 1) or when data activity is reactivated (Case 2). For example, in Case 2, long breaks of several slots may severely impact the TCP ramp up as UE may not be able to transmit and receive during those slots, impacting obtained RTT and data rate. Case 1 may be seen less problematic at first glance but similarly long break in reception may make UE out of reach from network point of view reducing network interest to utilize short inactivity timer.

In an example, if BWP switching takes significant time, and UE requires new reference symbols to update AGC, channel estimation etc., the system may have less possibilities/motivation to utilize active BWP adaption in the UE. This may be achieved by preferring configuration where BWP center frequency remains the same when switching between BWPs.

In an example embodiment, a frequency location of UE RF bandwidth may be indicated by gNB. For example, considering the UE RF bandwidth capability, the RF bandwidth of the UE may be usually smaller than the carrier bandwidth. The supported RF bandwidth for a UE is usually a set of discrete values (e.g., 10 MHz, 20 MHz, 50 MHz and so on), for energy saving purpose, the UE RF bandwidth may be determined as the minimum available bandwidth supporting the BWP bandwidth. But the granularity of BWP bandwidth is PRB level, which is decoupled with UE RF bandwidth and more flexible. As a result, in most cases the UE RF bandwidth is larger than the BWP bandwidth. The UE may receive the signal outside the carrier bandwidth, especially if the BWP is configured near the edge of the carrier bandwidth. And the inter-system interference or the interference from the adjacent cell outside the carrier bandwidth may impact the receiving performance of the BWP. Thus, to keep the UE RF bandwidth in the carrier bandwidth, it is necessary to indicate the frequency location of the UE RF bandwidth by gNB.

In an example embodiment, in terms of measurement gap configuration, the gap duration may be determined based on the measurement duration and necessary retuning gap. For example, different retuning gap may be needed depending on the cases. For example, if a UE does not need to switch its center, the retuning may be small such as 20 us. For the case that the network may not know whether the UE needs to switch its center or not to perform measurement, a UE may indicate the necessary retuning gap for a measurement configuration.

In an example embodiment, the necessary gap may depend on the current active BWP which may be dynamically switched via switching mechanism. In this case, UEs may dynamically indicate the necessary gap.

In an example embodiment, the measurement gap may be implicitly created, wherein the network may configure a certain gap (which may comprise the smallest retuning latency, for example, the network may assume small retuning gap is necessary if both measurement bandwidth and active BWP may be included within UE maximum RF capability assuming center frequency of current active BWP is not changed). In this case, for example, if a UE needs more gap than the configured, the UE may skip receiving or transmitting.

In an example embodiment, different measurement gap and retuning latency may be assumed for RRM and CSI respectively. For CSI measurement, if periodic CSI measurement outside of active BWP is configured, a UE may need to perform its measurement periodically per measurement configuration. For RRM, it may be up to UE implementation where to perform the measurement as long as it satisfies the measurement requirements. In this case, for example, the worst-case retuning latency for a measurement may be employed. In an example, as the retuning latency may be different between intra-band and inter-band retuning, separate measurement gap configuration between intra-band and inter-band measurement may be considered.

In an example embodiment, for multiple DCI formats with the same DCI size of a same RNTI, a respective DCI format may comprise an explicit identifier to distinguish them. For example, a same DCI size may come from a few (but not a large number of) zero-padding bits at least in UE-specific search space.

In an example embodiment, when there is a BWP switching, a DCI in the current BWP may need to indicate resource allocation in the next BWP that the UE is expected to switch. For example, the resource allocation may be based on the UE-specific PRB indexing, which may be per BWP. A range of the PRB indices may change as the BWP changes. In an example, the DCI to be transmitted in current BWP may be based on the PRB indexing for the current BWP. The DCI may need to indicate the RA in the new BWP, which may arouse a conflict. To resolve the conflict without significantly increasing UEs blind detection overhead, the DCI size and bit fields may not change per BWP for a given DCI type.

In an example embodiment, as the range of the PRB indices may change as the BWP changes, one or more employed bits among the total bit field for RA may be dependent on the employed BWP. For example, UE may employ the indicated BWP ID that the resource allocation is intended to identify the resource allocation bit field.

In an example embodiment, a DCI size of the BWP may consider two cases. One case may be a normal DCI detection without BWP retuning, and the other case may be a DCI detection during the BWP retuning.

For example, in some cases, a DCI format may be independent of the BW of the active DL/UL BWP (which may be called as fallback DCI). In an example, at least one of DCI formats for DL may be configured to have the same size to a UE for one or more configured DL BWPs of a serving cell. In an example, at least one of the DCI formats for UL may be configured to have the same size to a UE for one or more configured UL BWPs of a serving cell. In an example embodiment, a BWP-dependent DCI format may be monitored at the same time (which may be called as normal DCI) for both active DL BWP and active UL BWP. For example, UE may be configured to monitor both DCI formats at the same time. During the BWP activation/deactivation, gNB may assign the fallback DCI format to avoid ambiguity during the transition period.

In an example embodiment, if a UE is configured with multiple DL or UL BWPs in a serving cell, an inactive DL/UL BWP may be activated by a DCI scheduling a DL assignment or UL grant respectively in this BWP. As the UE is monitoring the PDCCH on the currently active DL BWP, the DCI may comprise an indication to a target BWP that the UE may switch to for PDSCH reception or UL transmission. A BWP indication may be inserted in the UE-specific DCI format for this purpose. The bit width of this field may depend on either the maximum possible or presently configured number of DL/UL BWPs. Similar to CIF, it may be simpler to set the BWP indication field to a fixed size based on the maximum number of configured BWPs.

In an example, a DCI format size may match the BW of the BWP in which the PDCCH is received. To avoid an increase in the number of blind decodes, the UE may identify the RA field based on the scheduled BWP. For example, for a transition from a small BWP to a larger BWP, the UE may identify the RA field as being the LSBs of the required RA field for scheduling the larger BWP.

In an example embodiment, a same DCI size for scheduling different BWPs may be defied by keeping a same size of resource allocation field for one or more configured BWPs. For example, gNB may not be aware of whether UE switches BWPs if gNB does not receive at least one response from the UE (e.g., gNB may be aware of if UE switches BWPs based on a reception of ACK/NACK from the UE). In an example, to avoid such a mismatch between gNB and UE, NR may define fallback mechanism. For example, if there is no response from the UE, gNB may transmit the scheduling DCI for previous BWPs and that for newly activated BWP since the UE may receive the DCI on either BWP. When the gNB receives a response from the UE, the gNB may confirm that the active BWP switching is completed. In an example, if a same DCI size for scheduling different BWPs is considered and COREST configuration is also the same for different BWPs, gNB may not transmit multiple DCIs.

In an example embodiment, DCI format(s) may be configured user-specifically per cell, e.g., not per BWP. For example, after the UE syncs to the new BWP, the UE may start to monitor pre-configured search-space on the CORESET. If the DCI formats may be configured per cell to keep the number of DCI formats, the corresponding header size in DCI may be small.

In an example embodiment, a size of DCI format in different BWPs may vary and may change at least due to different size of RA bitmap on different BWPs. For example, the size of DCI format configured in a cell for a UE may be dependent on BWP it schedules.

In an example embodiment, the monitored DCI format size on a search-space of a CORESET may be configurable with the sufficiently fine granularity (the granularity may be predefined). For example, the monitored DCI format size with sufficient granularity may be beneficial when a gNB may have the possibility to set freely the monitoring DCI format size on a search-spaces of a CORESET, such that it may accommodate the largest actual DCI format size variant among one or more BWPs configured in a serving cell.

In an example embodiment, for a UE-specific serving cell, one or more DL BWPs and one or more UL BWPs may be configured by dedicated RRC for a UE. For the case of PCell, this may be done as part of the RRC connection establishment procedure. For the SCell, this may be done via RRC configuration which may indicate the SCell parameters.

In an example embodiment, when a UE receives SCell activation command, there may be a default DL and/or UL BWP which may be activated since there may be at least one DL and/or UL BWP which may be monitored by the UE depending on the properties of the SCell (DL only or UL only or both). This BWP which may be activated upon receiving SCell activation command, may be informed to the UE via the a RRC configuration which configured the BWP on this serving cell.

For example, for SCell, RRC signaling for SCell configuration/reconfiguration may be employed to indicate which DL BWP and/or which UL BWP may be activated when the SCell activation command is received by the UE. The indicated BWP may be the initially active DL/UL BWP on the SCell. Therefore, SCell activation command may activate DL and/or UL BWP.

In an example embodiment, for a SCell, RRC signaling for the SCell configuration/reconfiguration may be employed for indicating a default DL BWP on the SCell which may be employed for fall back purposes. For example, the default DL BWP may be same or different from the initially activated DL/UL BWP which is indicated to UE as part of the SCell configuration. In an example, a default UL BWP may be configured to UE for the case of transmitting PUCCH for SR (as an example), in case the PUCCH resources are not configured in every BWP for the sake of SR.

In an example, a SCell may be for DL only. For the SCell for DL only, UE may keep monitoring an initial DL BWP (initial active or default) until UE receives SCell deactivation command.

In an example, a SCell may be for UL only. For the SCell for UL only, when UE receives a grant, UE may transmit on the indicated UL BWP. In an example, the UE may not maintain an active UL BWP if UE does not receive a grant. In an example, not mainlining the active UL BWP due to no grant receive may not deactivate the SCell.

In an example, a SCell may be for UL and DL. For the SCell for UL and DL, a UE may keep monitoring an initial DL BWP (initial active or default) until UE receives SCell deactivation command and. The UL BWP may be employed when there is a relevant grant or an SR transmission.

In an example, a BWP deactivation may not result in a SCell deactivation. For example, when the UE receives the SCell deactivation command, the active DL and/or UL BWPs may be considered deactivated.

In an example embodiment, if the SCell has its associated UL and/or a UE is expected to perform RACH procedure on SCell during activation, activation of UL BWP may be needed. For example, at SCell activation, DL only (only active DL BWP) or DL/UL (both DL/UL active BWP) may be configured. Regarding SUL band as a SCell, a UE may select default UL BWP based on measurement or the network configures which one in its activation.

In an example embodiment, one or more BWPs are semi-statically configured via UE-specific RRC signaling. In a CA system, if a UE maintains RRC connection with the primary component carrier (CC), the BWP in secondary CC may be configured via RRC signaling in the primary CC.

In an example embodiment, one or more BWPs may be semi-statically configured to a UE via RRC signaling in PCell. A DCI transmitted in SCell may indicate a BWP among the one or more configured BWP, and grant detailed resource based on the indicated BWP.

In an example embodiment, for a cross-CC scheduling, a DCI transmitted in PCell may indicate a BWP among the one or more configured BWPs, and grants detailed resource based on the indicated BWP.

In an example embodiment, when a SCell is activated, a DL BWP may be initially activated for configuring CORESET for monitoring the first PDCCH in SCell. The DL BWP may serve as a default DL BWP in the SCell. In an example, since the UE performs initial access via a SS block in PCell, the default DL BWP in SCell may not be derived from SS block for initial access. The default DL BWP in SCell may be configured by RRC signaling in the PCell.

In an example embodiment, when an SCell is activated, an indication indicating which DL BWP and/or which UL BWP are active may be in RRC signaling for SCell configuration/reconfiguration. For example, the RRC signaling for SCell configuration/reconfiguration may be employed for indicating which DL BWP and/or which UL BWP are initially activated when the SCell is activated.

In an example embodiment, when an SCell is activated, an indication indicating which DL BWP and/or which UL BWP are active may be in SCell activation signaling. For example, SCell activation signaling may be employed for indicating which DL BWP and/or which UL BWP are initially activated when the SCell is activated.

In an example embodiment, for PCells and pSCells, an initial default bandwidth parts for DL and UL (e.g., for RMSI reception and PRACH transmission) may be valid until at least one bandwidth part is configured for the DL and UL via RRC UE-specific signaling, respectively, at what time the initial default DL/UL bandwidth parts may become invalid and new default DL/UL bandwidth parts may take effect. In an example, for an SCell, the SCell configuration may comprise default DL/UL bandwidth parts In an example embodiment, an initial BWP on PCell may be defined by MIB. In an example, an initial BWP and default BWP may be separately configurable for the SCell. For an SCell if the SCell is activated, an initial BWP may be the widest configured BWP of the SCell. For example, after the traffic burst is served, and an inactivity timer expires, a UE may retune to default BWP which may be the narrow BWP, for power savings, keeping the SCell active and may be ready to be opened briskly when additional data burst arrives.

In an example embodiment, a BWP on SCell may be activated by means of cross-cell scheduling DCI, if cross-cell scheduling is configured to a UE. In this case, the gNB may activate a BWP on the SCell by indicating CIF and BWPI in the scheduling DCI.

In an example embodiment, UE and/or gNB may perform synchronization tracking within an active DL BWP without SS block. For example, TRS along with DL BWP configuration may be configured. For example, a DL BWP with SS block or TRS may be configured as a reference for synchronization tracking, which may be similar to the design of CSS monitoring when the BWP does not comprise a common CORESET.

In an example embodiment, SS-block based RRM measurements may be decoupled with BWP framework. For example, measurement configurations for each RRM and CSI feedback may be independently configured from bandwidth part configurations. CSI and SRS measurements/transmissions may be performed within the BWP framework.

In an example embodiment, for a MCS assignment of the first one or more DL data packets after active DL BWP switching, the network may assign robust MCS to a UE for the first one or more DL data packets based on RRM measurement reporting. In an example, for a MCS assignment of the first one or more DL data packets after active DL BWP switching, the network may signal to a UE by active DL BWP switching DCI to trigger aperiodic CSI measurement/reporting to speed up link adaptation convergence. For a UE, periodic CSI measurement outside the active BWP in a serving cell may not be supported. For a UE, RRM measurement outside active BWP in a serving cell may be supported. For a UE, RRM measurement outside configured BWPs in a serving cell may be supported.

In an example embodiment, the RRM measurements may be performed on a SSB and/or CSI-RS. The RRM/RLM measurements may be independent of BWPs.

In an example embodiment, UE may not be configured with aperiodic CSI reports for non-active DL BWPs. For example, the CSI measurement may be obtained after the BW opening and the wide-band CQI of the previous BWP may be employed as starting point for the other BWP on the NW carrier.

In an example embodiment, UE may perform CSI measurements on the BWP before scheduling. For example, before scheduling on a new BWP, the gNB may intend to find the channel quality on the potential new BWPs before scheduling the user on that BWP. In this case, the UE may switch to a different BWP and measure channel quality on the BWP and then transmit the CSI report. There may be no scheduling needed for this case.

BWP in MAC Process

In an example, a plurality of scheduling request (SR) configurations may be configured for a bandwidth part (BWP) of a cell for a wireless device. In an example, a wireless device may use SR resources configured by a SR resource in the plurality of SR configurations in a BWP to indicate to the base station the numerology/TTI/service type of a logical channel (LCH) or logical channel group (LCG) that triggered the SR. In an example, the maximum number of SR configurations may be the maximum number of logical channels/logical channel groups.

In an example, there may be at most one active DL BWP and at most one active UL BWP at a given time for a serving cell. A BWP of a cell may be configured with a specific numerology/TTI. In an example, a logical channel and/or logical channel group may trigger SR transmission. When the UE operates in one active BWP, the corresponding SR may remain triggered in response to BWP switching.

In an example, the logical channel and/or logical channel group to SR configuration mapping may be (re)configured in response to switching of the active BWP. In an example, when the active BWP is switched, the RRC dedicated signaling may (re-)configure the logical channel and/or logical channel group to SR configuration mapping on the new active BWP.

In an example, mapping between the logical channel and/or logical channel group to SR configuration may be configured when BWP is configured. RRC may pre-configure mapping between logical channel and/or logical channel group to SR configurations for all the configured BWPs. In response to the switching of the active BWP, the wireless device may employ the RRC configured mapping relationship for the new BWP. In an example, when BWP is configured, RRC may configure the mapping between logical channel and SR configurations for the BWP.

In an example, sr-ProhibitTimer and SR_COUNTER corresponding to a SR configuration may continue and the value of the sr-ProhibitTimer and the value of the SR_COUNTER may be their values before the BWP switching.

In an example, a plurality of logical channel/logical channel group to SR-configuration mappings may be configured in a serving cell. A logical channel/logical channel group may be configured to be mapped to at most one SR configuration per BWP. In an example, a logical channel/logical channel group configured to be mapped onto multiple SR configurations in a serving cell may have one SR configuration active at a time, e.g., that of the active BWP. In an example, a plurality of logical channel/logical channel group to SR-configuration mappings may be supported in carrier aggregation (CA). A logical channel/logical channel group may be configured to be mapped to one (or more) SR configuration(s) in each of both PCell and PUCCH-SCell. In an example, in CA, a logical channel/logical channel group configured to be mapped to one (or more) SR configuration(s) in each of both PCell and PUCCH-SCell may have two active SR configurations (one on PCell and one on PUCCH-SCell) at a time. In an example, The SR resource which comes first may be used.

In an example, a base station may configure one SR resource per BWP for the same logical channel/logical channel group. If a SR for one logical channel/logical channel group is pending, it may be possible for UE to transmit SR with the SR configuration in another BWP after BWP switching. In an example, the sr-ProhibitTimer and SR_COUNTER for the SR corresponding to the logical channel/logical channel group may continue in response to BWP switching. In an example, when a SR for one logical channel/logical channel group is pending, the UE may transmit the SR in another SR configuration corresponding to the logical channel/logical channel group in another BWP after BWP switching.

In an example, if multiple SRs for logical channels/logical channel groups mapped to different SR configurations are triggered, the UE may transmit one SR corresponding to the highest priority logical channel/logical channel group. In an example, the UE may transmit multiple SRs with different SR configurations. In an example, SRs triggered at the same time (e.g., in the same NR-UNIT) by different logical channels/logical channel groups mapped to different SR configurations may be merged into a single SR corresponding to the SR triggered by the highest priority logical channel/logical channel group.

In an example, when an SR of a first SR configuration is triggered by a first logical channel/logical channel group while an SR procedure triggered by a lower priority logical channel/logical channel group is on-going on another SR configuration, the later SR may be allowed to trigger another SR procedure on its own SR configuration, independently of the other on-going SR procedure. In an example, a UE may be allowed to send triggered SRs for logical channels/logical channel groups mapped to different SR configurations independently. In an example, UE may be allowed to send triggered SRs for LCHs corresponding to different SR configurations independently.

In an example, dsr-TransMax may be independently configured per SR configuration. In an example, SR_COUNTER may be maintained for each SR configuration independently. In an example, a common SR_COUNTER may be maintained for all the SR configurations per BWP.

In an example, PUCCH resources may be configured per BWP. The PUCCH resources in the currently active BWP may be used for UCI transmission. In an example, PUCCH resource may be configured per BWP. In an example, it may be necessary to use PUCCH resources in a BWP not currently active for UCI transmission. In an example, PUCCH resources may be configured in a default BWP and BWP switching may be necessary for PUCCH transmission. In an example, a UE may be allowed to send SR1 in BWP1, even though BWP1 is no longer active. In an example, the network may reconfigure (e.g., pre-configure) the SR resources so that both SR1 and SR2 may be supported in the active BWP. In an example, an anchor BWP may be used for SR configuration. In an example, the UE may send SR2 as "fallback".

In an example, a logical channel/logical channel group mapped to a SR configuration in an active BWP may also be mapped to the SR configuration in another BWP to imply same or different information (e.g., numerology/TTI and priority).

In an example, a MAC entity can be configured with a plurality of SR configurations within the same BWP. In an example, the plurality of the SR configurations may be on the same BWP, on different BWPs, or on different carriers. In an example, the numerology of the SR transmission may not be the same as the numerology that the logical channel/logical channel group that triggered the SR is mapped to.

In an example, for a LCH mapped to multiple SR configurations, the PUCCH resources for transmission of the SR may be on different BWPs or different carriers. In an example, if multiple SRs are triggered, the selection of which configured SR configuration within the active BWP to transmit one SR may be up to UE implementation.

In an example, a single BWP can support multiple SR configurations. In an example, multiple sr-ProhibitTimers (e.g., each for one SR configuration) may be running at the same time. In an example, drs-TransMax may be independently configured per SR configuration. In an example, SR_COUNTER may be maintained for each SR configuration independently.

In an example, a single logical channel/logical channel group may be mapped to zero or one SR configuration. In an example, PUCCH resource configuration may be associated with a UL BWP. In an example, in CA, one logical channel may be mapped to none or one SR configuration per BWP.

In an example, a BWP may consist of a group of contiguous PRBs in the frequency domain. The parameters for each BWP configuration may include numerology, frequency location, bandwidth size (e.g., in terms of PRBs), CORESET (e.g., required for each BWP configuration in case of single active DL bandwidth part for a given time instant). In an example, one or multiple BWPs may be configured for each component carrier when the UE is in RRC connected mode.

In an example, when a new BWP is activated, the configured downlink assignment may be initialized (if not active) or re-initialized (if already active) using PDCCH.

In an example, for uplink SPS, the UE may have to initialize or re-initialize the configured uplink grant when switching from one BWP to anther BWP. When a new BWP is activated, the configured uplink grant may be initialized (if not active) or re-initialized (if already active) using PDCCH.

In an example, for type 1 uplink data transmission without grant, there may be no L1 signaling to initialize or re-initialize the configured grant. The UE may not assume the type 1 configured uplink grant is active when the BWP is switched even if it's already active in the previous BWP. The type 1 configured uplink grant may be re-configured using RRC dedicated signaling when the BWP is switched. In an example, when a new BWP is activated, the type 1 configured uplink grant may be re-configured using dedicated RRC signaling.

In an example, if SPS is configured on the resources of a BWP and that BWP is subsequently deactivated, the SPS grants or assignments may not continue. In an example, when a BWP is deactivated, all configured downlink assignments and configured uplink grants using resources of this BWP may be cleared.

In an example, the MAC entity may clear the configured downlink assignment or/and uplink grants upon receiving activation/deactivation of BWP.

In an example, the unit of drx-RetransmissionTimer and drx-ULRetransmissionTimer may be OFDM symbol corresponding to the numerology of the active BWP.

In an example, if a UE is monitoring an active DL BWP for a long time without activity, the UE may move to default BWP for power saving. In an example, a BWP inactivity timer may be introduced to switch active BWP to default BWP after a certain inactive time.

In an example, autonomous switching to DL default BWP may consider both DL BWP inactivity timer and/or DRX timers (e.g., HARQ RTT and DRX retransmission timers). In an example, DL BWP inactivity timer may be configured per MAC entity. In an example, a UE may be configured to monitor PDCCH in a default BWP at least when UE uses long DRX cycle.

In an example, PHR may not be triggered due to the switching of BWP. In an example, the support of multiple numerologies/BWPs may not impact PHR triggers. In an example, PHR may be triggered upon BWP activation. In an example, a prohibit timer may start upon PHR triggering due to BWP switching. PHR may not be triggered due to BWP switching while the prohibit timer is running. In an example, PHR may be reported per activated/deactivated BWP.

In an example, PDCP duplication may be in an activated state while the UE receives the BWP deactivation command. In an example, when the BWP which the PDCP duplication is operated on is deactivated, the PDCP duplication may not be deactivated, but the PDCP entity may stop sending the data to the deactivated RLC buffer.

In an example, RRC signaling may configure one BWP to be activated when the SCell is activated. Activation/deactivation MAC CE may be used to activate both the SCell and the configured BWP. In an example, one HARQ entity can serve different BWP within one carrier.

In an example, for a UE-specific serving cell, one or more DL BWPs and one or more UL BWPs may be configured by dedicated RRC for a UE. In an example, a single scheduling DCI may switch the UE's active BWP from one to another. In an example, an active DL BWP may be deactivated by means of timer for a UE to switch its active DL bandwidth part to a default DL bandwidth part.

In an example, narrower BWP may be used for DL control monitoring and wider BWP may be used for scheduled data. In an example, small data may be allowed in narrower BWP without triggering BWP switching.

Example SS Burst Transmission

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping to access a cell.

In a single beam scenario, a gNB may configure time-repetition transmission within one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of the above-mentioned signals and physical channels in multiple beams. A UE may identify at least Orthogonal Frequency Division Multiplexing (OFDM) symbol index, slot index in a radio frame and radio frame number from an SS block.

Figure 15:
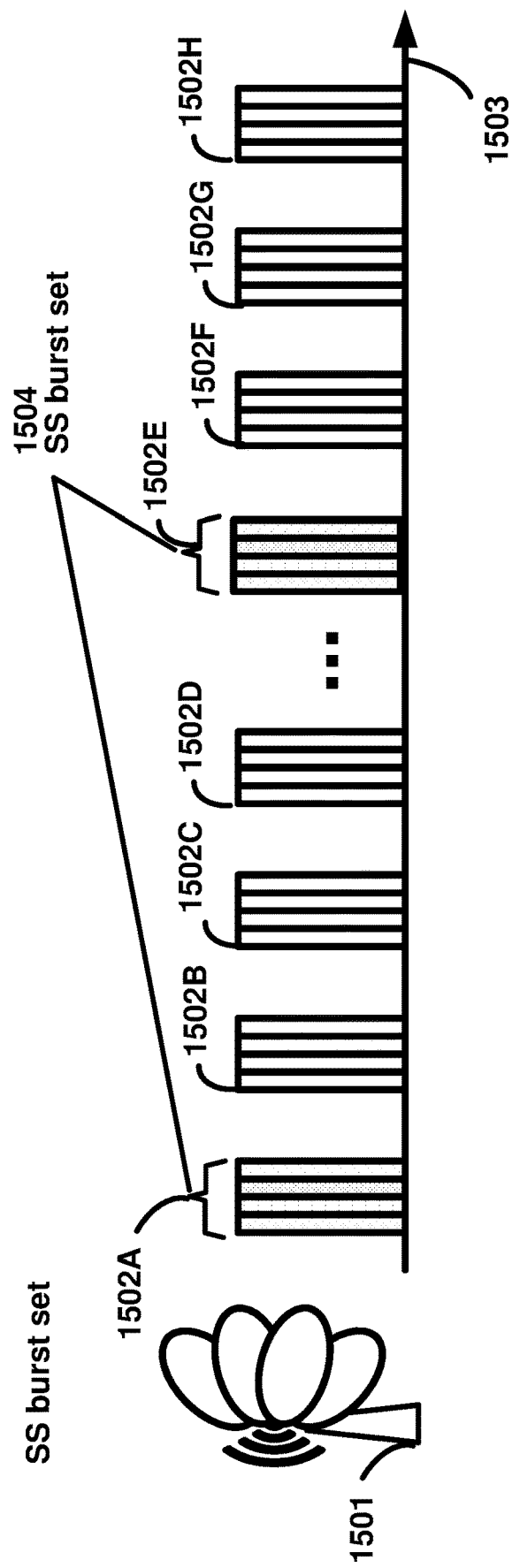
FIG. 15 is an example diagram for synchronization signal block transmissions as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. If multiple SS bursts are transmitted with multiple beams, the SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Example Random Access Procedure in a Single-Beam System

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figure 16B:
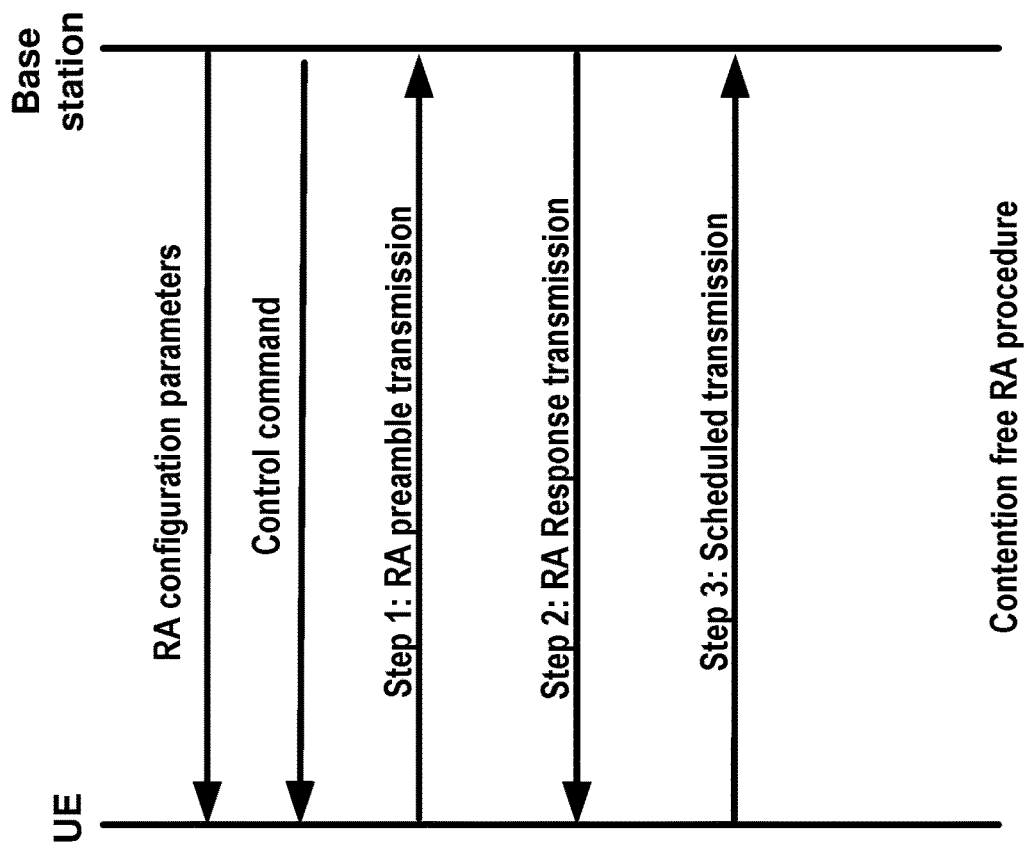
FIG. 16A and FIG. 16B are example diagrams of random-access procedures as per an aspect of an embodiment of the present disclosure.
Figure 16A:
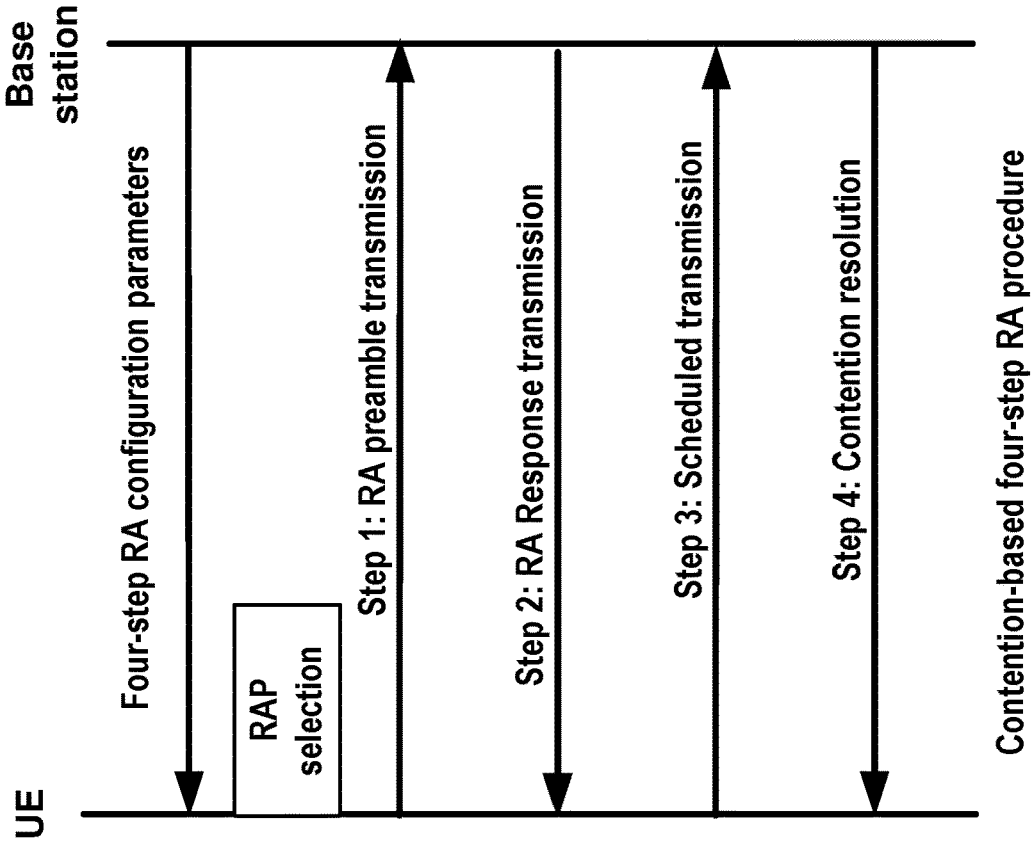

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16A and FIG. 16B. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-RadioNetwork Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is the index of the first subframe of the specified PRACH ($0 \le t\_id < 10$), and f_id is the index of the specified PRACH within that subframe, in ascending order of frequency domain ($0 \le f\_id < 6$). In an example, different types of UEs, e.g. NB-IoT, BL-UE, or UE-EC may employ different formulas for RA-RNTI calculations.

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs.

Figure 17:
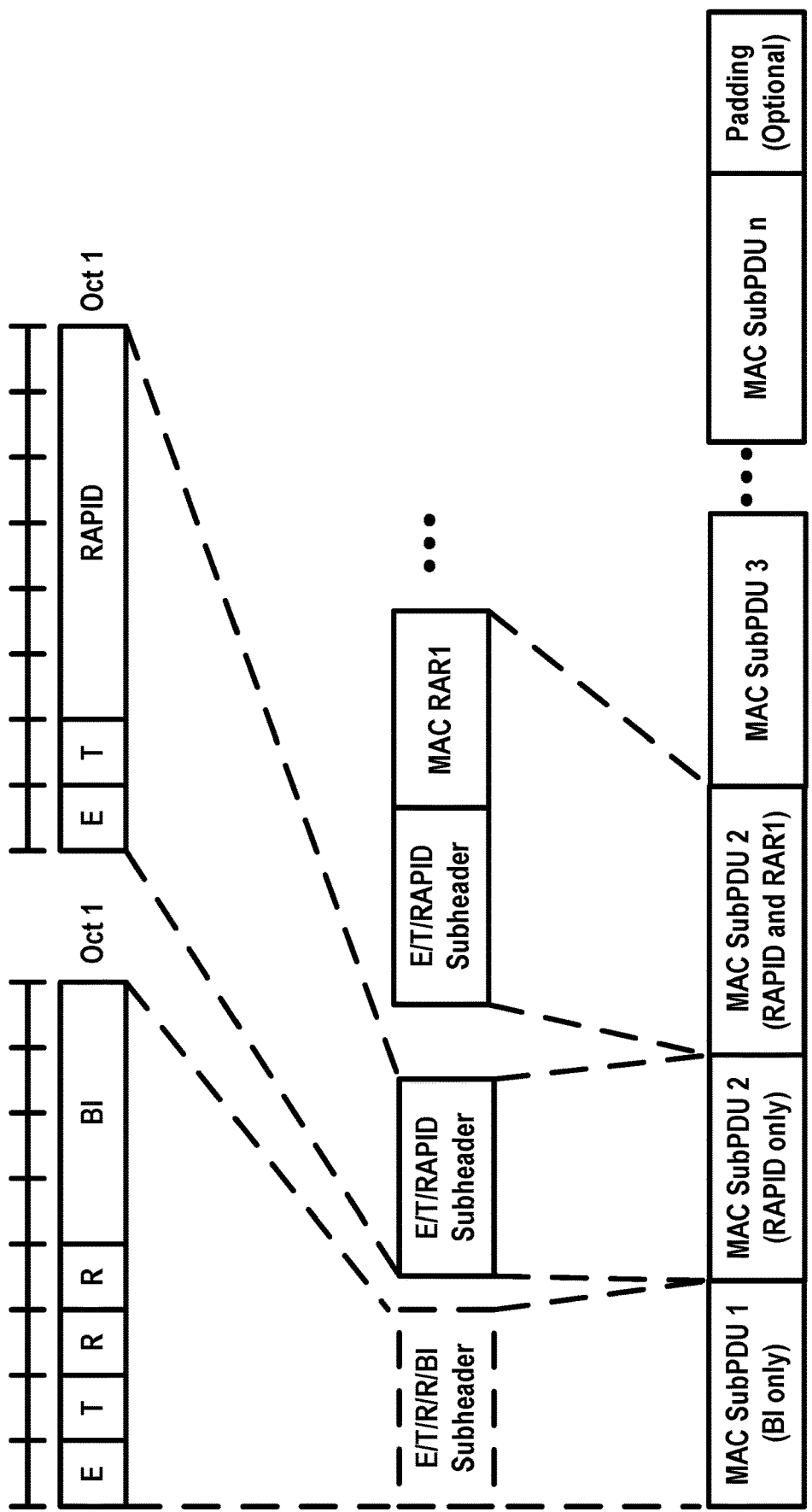
FIG. 17 is an example diagram of a MAC PDU comprising a RAR as per an aspect of an embodiment of the present disclosure.

FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR.

Figure 18A:
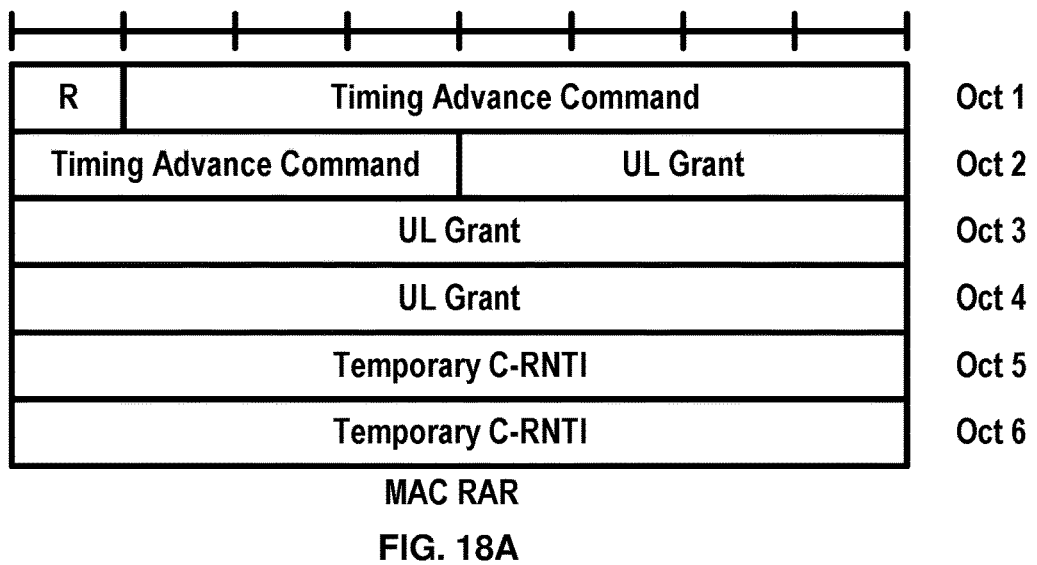
FIG. 18A, FIG. 18B and FIG. 18C are example diagrams of RAR MAC CEs as per an aspect of an embodiment of the present disclosure.
Figure 18B:
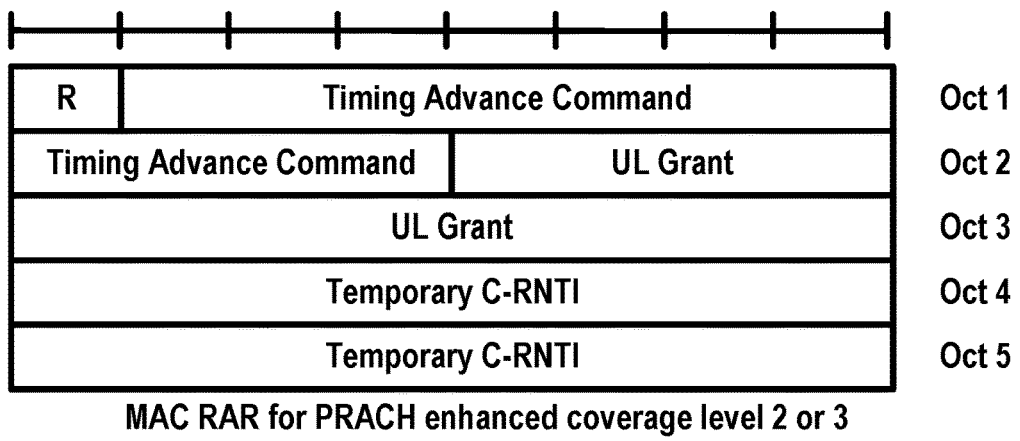
Figure 18C:
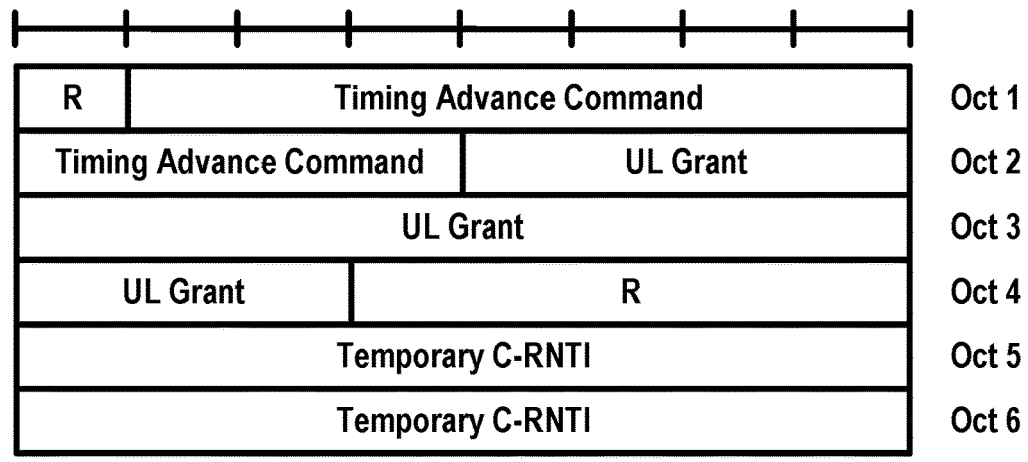

FIG. 18A, FIG. 18B, and FIG. 18C illustrate contents of a MAC RAR. Specifically, FIG. 18A shows the contents of a MAC RAR of a normal UE, FIG. 18B shows the contents of a MAC RAR of a MTC UE, and FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step, and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The fourth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Example Random Access Procedure in a Multi-Beam System

Figure 19:
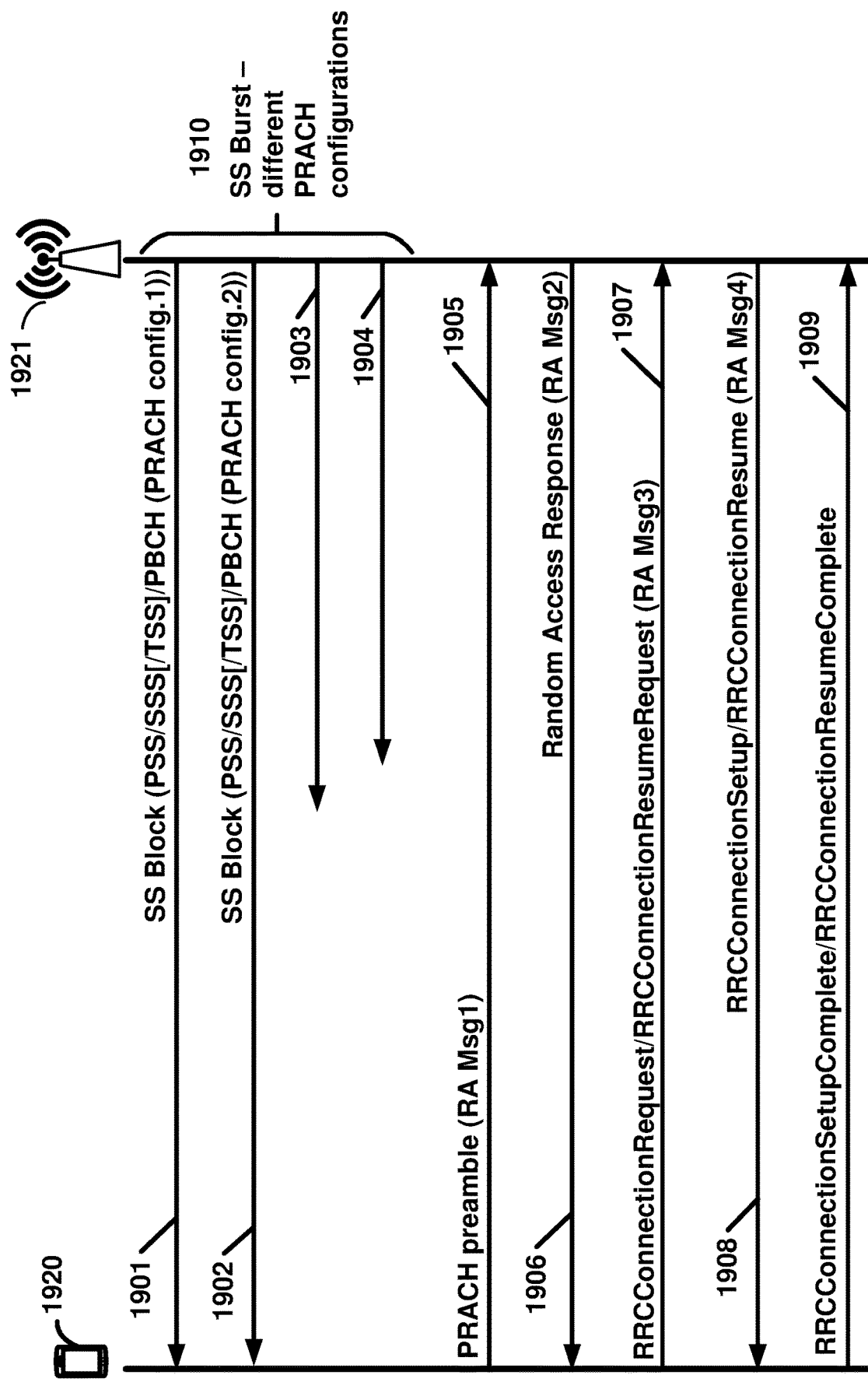
FIG. 19 is an example diagram for random access procedure when configured with multiple beams as per an aspect of an embodiment of the present disclosure.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1920 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, e.g., after or in response to receiving one or more SS blocks or SS bursts. The preamble may comprise a PRACH preamble, and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, e.g., after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1921 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, e.g., after or in response to receiving the RAR. The base station 1921 may send to the wireless device 1920 an RRCConnectionSetup and/or RRCConnectionResume message, which may be referred to as RA Msg4, at step 1908, e.g., after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, e.g., after or in response to receiving the RRCConnectionSetup and/or RRCConnectionResume. An RRC connection may be established between the wireless device 1920 and the base station 1921, and the random access procedure may end, e.g., after or in response to receiving the RRCConnectionSetupComplete and/or RRCConnectionResumeComplete message.

Example of Channel State Information Reference Signal Transmission and Reception A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 20:
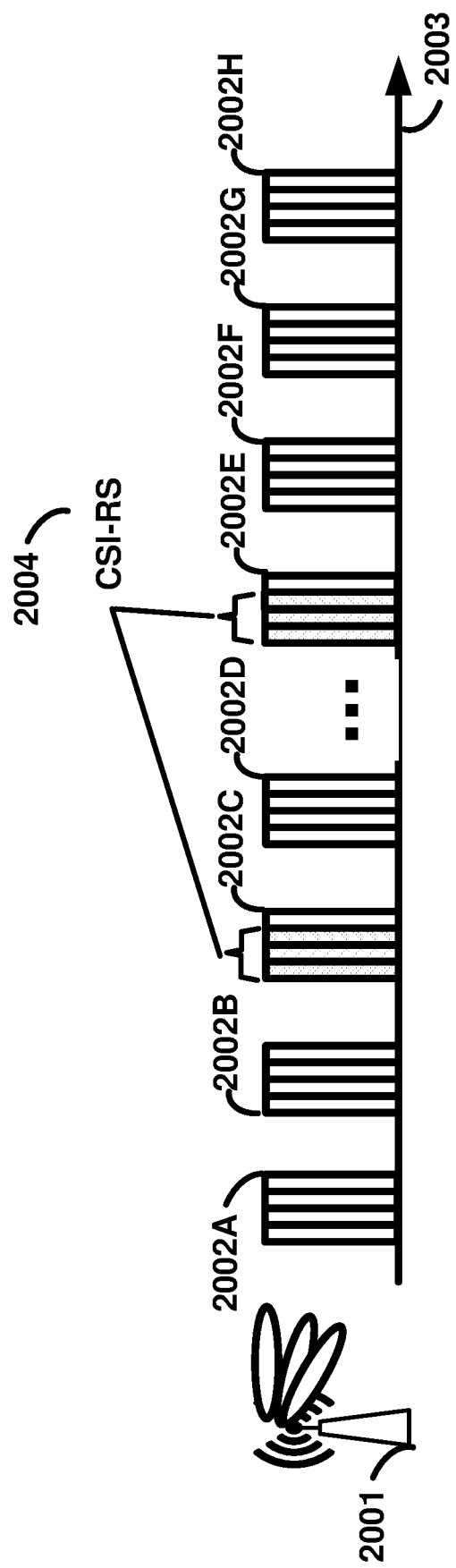
FIG. 20 is an example of channel state information reference signal transmissions when configured with multiple beams as per an aspect of an embodiment of the present disclosure.

FIG. 20 shows an example of transmitting CSI-RSs periodically for a beam. A base station 2001 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
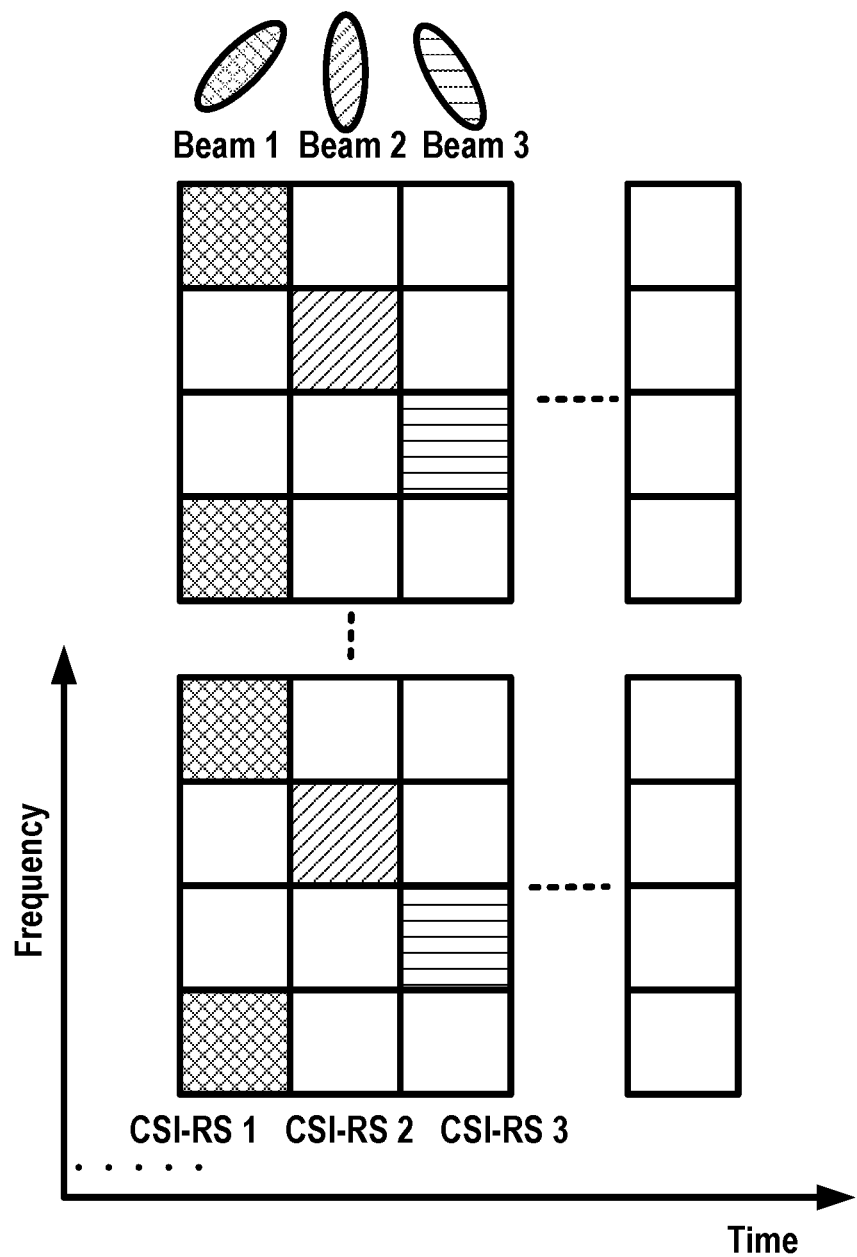
FIG. 21 is an example of channel state information reference signal transmissions when configured with multiple beams as per an aspect of an embodiment of the present disclosure.

FIG. 21 shows an example of a CSI-RS that may be mapped in time and frequency domains. Each square shown in FIG. 21 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RSsubframe configuration (e.g., subframe location, offset, and periodicity in a radio frame), CSI-RS power parameter, CSI-RSsequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 21 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in a RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 23A:
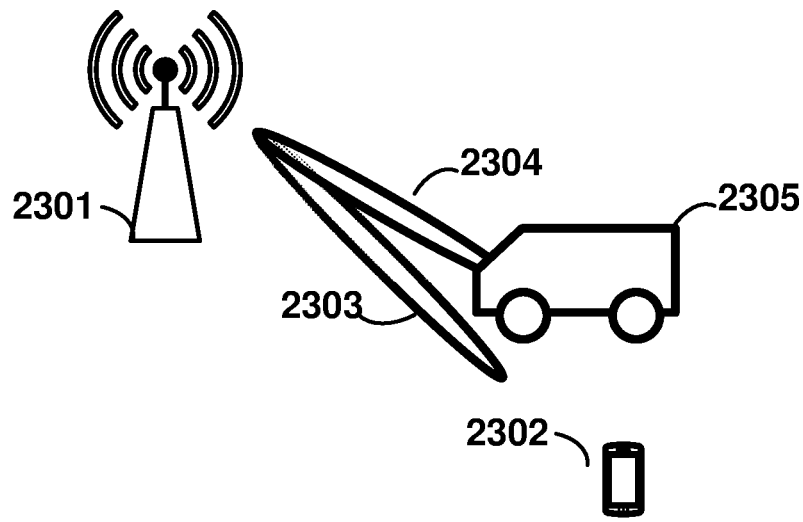
FIG. 23A is an example diagram for downlink beam failure scenario in a transmission receiving point (TRP) as per an aspect of an embodiment of the present disclosure.
Figure 23B:
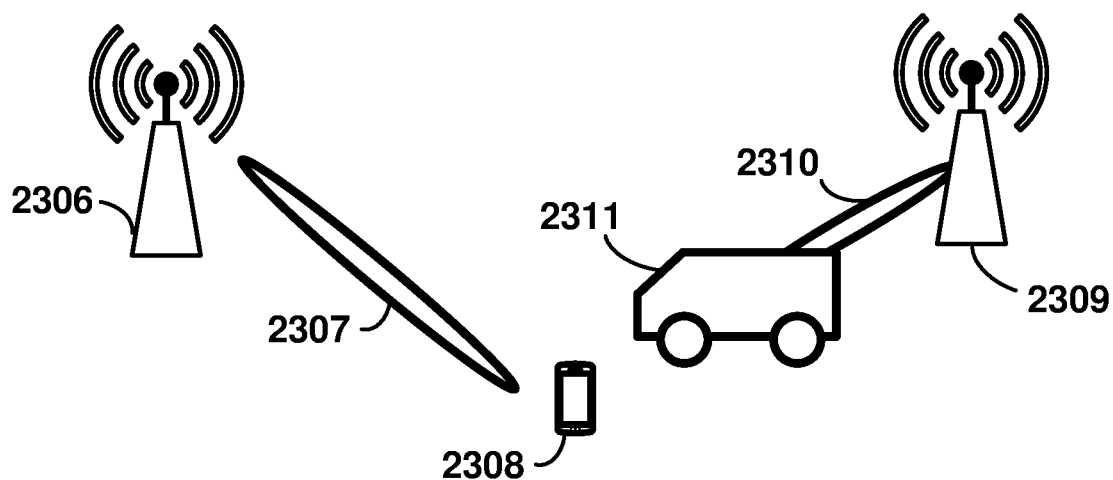
FIG. 23B is an example diagram for downlink beam failure scenario in multiple TRPs as per an aspect of an embodiment of the present disclosure.

A base station and/or a wireless device may perform a downlink L1/L2 beam management procedure. One or more downlink L1/L2 beam management procedures may be performed within one or multiple transmission and receiving points (TRPs), such as shown in FIG. 23A and FIG. 23B, respectively.

Figure 22:
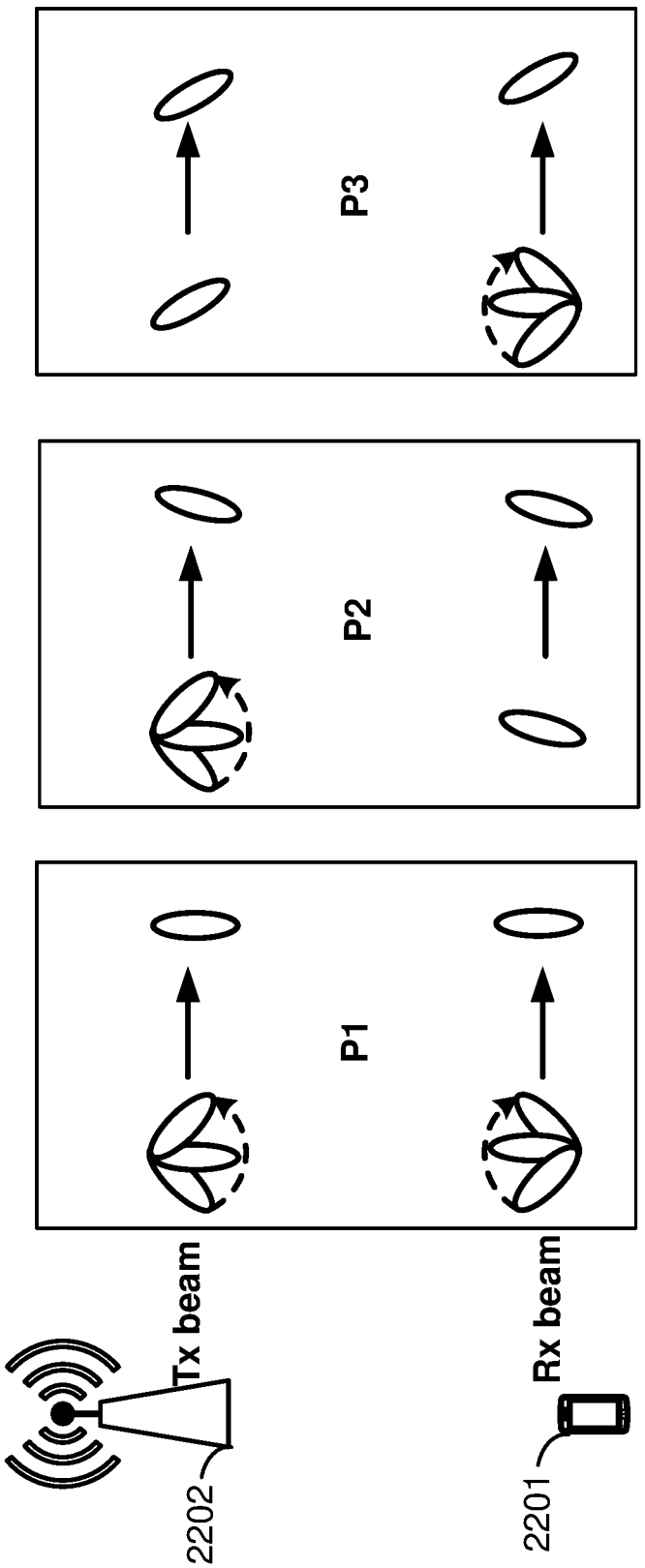
FIG. 22 is an example of various beam management procedures as per an aspect of an embodiment of the present disclosure.

FIG. 22 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 2201, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 2201 uses beamforming.

A wireless device 2201 (e.g., a UE) and/or a base station 2202 (e.g., a gNB) may trigger a beam failure recovery mechanism. The wireless device 2201 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2201 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2202 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2201, and the channel characteristics from a transmission via a control channel to the wireless device, are similar or the same under a configured criterion.

FIG. 23A shows an example of a beam failure event involving a single TRP. A single TRP such as at a base station 2301 may transmit, to a wireless device 2302, a first beam 2303 and a second beam 2304. A beam failure event may occur if, e.g., a serving beam, such as the second beam 2304, is blocked by a moving vehicle 2305 or other obstruction (e.g., building, tree, land, or any object) and configured beams (e.g., the first beam 2303 and/or the second beam 2304), including the serving beam, are received from the single TRP. The wireless device 2302 may trigger a mechanism to recover from beam failure when a beam failure occurs.

FIG. 23B shows an example of a beam failure event involving multiple TRPs. Multiple TRPs, such as at a first base station 2306 and at a second base station 2309, may transmit, to a wireless device 2308, a first beam 2307 (e.g., from the first base station 2306) and a second beam 2310 (e.g., from the second base station 2309). A beam failure event may occur when, e.g., a serving beam, such as the second beam 2310, is blocked by a moving vehicle 2311 or other obstruction (e.g., building, tree, land, or any object) and configured beams (e.g., the first beam 2307 and/or the second beam 2310) are received from multiple TRPs. The wireless device 2008 may trigger a mechanism to recover from beam failure when a beam failure occurs.

A UE may perform downlink beam management using a UE-specific configured CSI-RS. In a beam management procedure, a UE may monitor a channel quality of a beam pair link. The beam pair link may comprise a transmitting beam from a gNB and a receiving beam by the UE. When multiple CSI-RSs associated with multiple beams are configured, a UE may monitor multiple beam pair links between the gNB and the UE.

A UE may transmit one or more beam management reports to a gNB. In a beam management report, the UE may indicate some beam pair quality parameters, comprising at least, one or more beam identifications; RSRP; PMI/CQI/RI of a subset of configured beams.

A gNB and/or a UE may perform a downlink L1/L2 beam management procedure. One or more of the following downlink L1/L2 beam management procedures may be performed within one or multiple Transmission and Receiving Point (TRPs). In an example, a P-1 procedure may be used to enable UE measurement on different TRP Tx beams to support selection of TRP Tx beams/UE Rx beam(s). For beamforming at TRP, it typically includes a intra/inter-TRP Tx beam sweep from a set of different beams. For beamforming at UE, it typically includes a UE Rx beam sweep from a set of different beams. In an example, a P-2 procedure may be used to enable UE measurement on different TRP Tx beams to possibly change inter/intra-TRP Tx beam(s). P-2 may be performed on a possibly smaller set of beams for beam refinement than in P-1. P-2 may be a special case of P-1. In an example, a P-3 procedure may be used to enable UE measurement on the same TRP Tx beam to change UE Rx beam in the case UE uses beamforming.

Based on a UE's beam management report, a gNB may transmit to a UE a signal indicating that one or more beam pair links are the one or more serving beams. The gNB may transmit PDCCH and PDSCH for the UE using the one or more serving beams.

In an example, a UE or a gNB may trigger a beam failure recovery mechanism. A UE may trigger a beam failure recovery (BFR) request transmission (e.g. when a beam failure event occurs) when quality of beam pair link(s) of an associated control channel falls below a threshold (e.g. in comparison with a threshold, and/or time-out of an associated timer).

A UE may measure quality of beam pair link using one or more reference signals (RS). One or more SS blocks, or one or more CSI-RS resources, each associated with a CSI-RS Resource Index (CRI), or one or more DM-RSs of PBCH, may be used as RS for measuring quality of a beam pair link. Quality of beam pair link may be defined as a RSRP value, or a Reference Signal Received Quality (RSRQ) value, and/or a CSI value measured on RS resources. A gNB may indicate whether an RS resource, used for measuring beam pair link quality, is QCLed (Quasi-Co-Located) with DM-RSs (demodulation reference signal) of a control channel. The RS resource and the DM-RSs of the control channel may be called QCLed when the channel characteristics from a transmission on an RS to a UE, and that from a transmission on a control channel to the UE, are similar or same under a configured criterion.

A UE may be configured to monitor PDCCH on M beam pair links simultaneously, where M≥1 and the maximum value of M may depend at least on UE capability. This process may increase robustness against beam pair link blocking. A gNB may transmit one or more messages configured to cause a UE to monitor PDCCH on different beam pair link(s) in different PDCCH OFDM symbols.

A gNB may transmit higher layer signaling or MAC CE comprising parameters related to UE Rx beam setting for monitoring PDCCH on multiple beam pair links. A gNB may transmit indication of spatial QCL assumption between an DL RS antenna port(s) (for example, cell-specific CSI-RS, or UE-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a gNB may indicate spatial QCL parameters between DL RS antenna port(s) and DM-RS antenna port(s) of DL data channel. A gNB may transmit DCI (downlink grants) comprising information indicating the RS antenna port(s). The information may indicate the RS antenna port(s) which is QCL-ed with DM-RS antenna port(s). Different set of DM-RS antenna port(s) for the DL data channel may be indicated as QCL with different set of RS antenna port(s).

When gNB transmits a signal indicating a spatial QCL parameters between CSI-RS and DM-RS for PDCCH, a UE may use CSI-RSs QCLed with DM-RS for PDCCH to monitor beam pair link quality. If beam failure event occurs, the UE may transmit beam failure recovery request by configuration.

When a UE transmits a beam failure recovery request on an uplink physical channel or signal, a gNB may detect that there is a beam failure event for the UE by monitoring the uplink physical channel or signal. The gNB may initiate a beam recovery mechanism to recover the beam pair link for transmitting PDCCH between the gNB and the UE. A beam recovery mechanism may be a L1 scheme, or a higher layer scheme.

A gNB may transmit one or more messages comprising configuration parameters of an uplink physical channel or signal for transmitting beam failure recovery request. The uplink physical channel or signal may be based one of: on a non-contention based PRACH (so called BFR-PRACH), which uses a resource orthogonal to resources of other PRACH transmissions; a PUCCH (so called BFR-PUCCH); and/or a contention-based PRACH resource. Combinations of these candidate signal/channels may be configured by the gNB.

A gNB may respond a confirmation message to a UE after receiving one or multiple BFR request. The confirmation message may include the CRI associated with the candidate beam the UE indicates in the one or multiple BFR request. The confirmation message may be a L1 control information.

Example SCell Activation/Deactivation

LTE-Advanced introduced Carrier Aggregation (CA) in Release-10. In Release-10 CA, the Primary Cell (PCell) is always activated. In addition to the PCell, an eNB may transmit one or more RRC message comprising configuration parameters for one or more secondary cells. In 3GPP LTE/LTE-A specification, there are many RRC messages used for Scell configuration/reconfiguration. For example, the eNB may transmit a RRCconnectionReconfiguration message for parameters configuration of one or more secondary cells for a UE, wherein the parameters may comprise at least: cell ID, antenna configuration, CSI-RS configuration, SRS configuration, PRACH configuration, etc.

The one or more SCells configured in the RRC message can be activated or deactivated by at least one MAC Control Element (MAC CE). The SCell activation/deactivation processes were introduced to achieve battery power savings. When an SCell is deactivated, the UE may stop receiving downlink signals and stop transmission on the SCell. In LTE-A specification, the default state of an SCell is deactivated when the SCell has been configured/added. Additional activation procedure employing MAC CE Activation Command may be needed to activate the SCell. SCells may be deactivated either by an activation/deactivation MAC CE or by the sCellDeactivationTimer. The UE and eNB maintain one sCellDeactivationTimer per SCell with a common value across SCells. eNB maintains the activation/deactivation status of an SCell for a UE. The same initial timer value may apply to each instance of the sCellDeactivationTimer and it is configured by RRC. sCellDeactivationTimer is included in Mac-MainConfig dedicated parameter in an RRC message. The configured SCells may be initially deactivated upon addition and after a handover.

Various implementation of the Activation/Deactivation MAC control element may be possible. In an example embodiment, the Activation/Deactivation MAC control element is identified by a MAC PDU subheader with a pre-assigned LCID. It may have a fixed size and consists of a single octet containing seven C-fields and one R-field. The Activation/Deactivation MAC control element is defined where, a Ci field indicates the activation/deactivation status of the SCell with SCellIndex i, if there is an SCell configured with SCellIndex i, otherwise the MAC entity may ignore the Ci field. The Ci field is set to "1" to indicate that the SCell with SCellIndex i may be activated. The Ci field is set to "0" to indicate that the SCell with SCellIndex i may be deactivated. And a R bit in the MAC CE is a Reserved bit which may be set to "0".

Other embodiments may be implemented. For example, when UE is configured with more than 5 or 7 carriers, the format may include more than one byte including a longer bitmap.

Various deactivation timer management processes may be implemented. In an example embodiment, if PDCCH on the activated SCell indicates an uplink grant or downlink assignment; or if PDCCH on the Serving Cell scheduling the activated SCell indicates an uplink grant or a downlink assignment for the activated SCell: the UE may restart the sCellDeactivationTimer associated with the SCell.

In the current LTE-Advanced transceiver operation, the MAC entity may for each TTI and for each configured SCell perform certain functions related to activation/deactivation of SCell(s). If the MAC entity receives an Activation/Deactivation MAC control element in this TTI activating the SCell, the MAC entity may in the TTI according to the timing defined in LTE_A specification: activate the SCell; start or restart the sCellDeactivationTimer associated with the SCell; and trigger PHR (power headroom). If the MAC entity receives an Activation/Deactivation MAC control element in this TTI deactivating the SCell; or if the sCellDeactivationTimer associated with the activated SCell expires in this TTI: in the TTI according to the timing defined in LTE_A specification: deactivate the SCell; stop the sCellDeactivationTimer associated with the SCell; and/or flush all HARQ buffers associated with the SCell.

In the current LTE-Advanced transceiver operation, when a UE activates the SCell, the UE may apply normal SCell operation including: SRS transmissions on the SCell; CQI/PMI/RI/PTI reporting for the SCell; PDCCH monitoring on the SCell; and/or PDCCH monitoring for the SCell.

If the SCell is deactivated, a UE may perform the following actions: not transmit SRS on the SCell; not report CQI/PMI/RI/PTI for the SCell; not transmit on UL-SCH on the SCell; not transmit on RACH on the SCell; not monitor the PDCCH on the SCell; not monitor the PDCCH for the SCell. When SCell is deactivated, the ongoing Random Access procedure on the SCell, if any, is aborted.

When a UE receives a MAC activation command for a secondary cell in subframe n, the corresponding actions in the MAC layer shall be applied no later than the minimum requirement defined in 3GPP TS 36.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133, except for the actions related to CSI reporting which shall be applied in subframe n+8.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the Scell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n. It is important to define the timing of these actions for both UE and eNB. For example, sCellDeactivationTimer is maintained in both eNB and UE and it is important that both UE and eNB stop, start and/or restart this timer in the same TTI.

In a NR system, when a UE receives a MAC activation commend for an SCell in subframe (or slot) n, the UE may start or restart the sCellDeactivationTimer associated with the SCell in the same subframe (or slot). The UE may start reporting CQI/PMI/RI/PTI for the SCell at subframe n+m, where m is a value configured by a RRC message, or a predefined value.

Example Downlink Control Information (DCI)

In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

The different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCI may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the information in the DCI formats used for downlink scheduling can be organized into different groups, with the field present varying between the DCI formats, including at least one of: resource information, consisting of: carrier indicator (0 or 3bits), RB allocation; HARQ process number; MCS, NDI, and RV (for the first TB); MCS, NDI and RV (for the second TB); MIMO related information, comprising at least one of: PMI, precoding information, transport block swap flag, power offset between PDSCH and reference signal, reference-signal scrambling sequence, number of layers, and/or antenna ports for the transmission; PDSCH resource-element mapping and QCI; Downlink assignment index (DAI); TPC for PUCCH; SRS request (1bit), triggering one-shot SRS transmission; ACK/NACK offset; DCI format 0/1A indication, used to differentiate between DCI format 1A and 0, as the two formats have the same message size; and padding if necessary.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); Phase rotation of the uplink DMRS; precoding information; CSI request, requesting an aperiodic CSI report; SRS request (2 bit), used to trigger aperiodic SRS transmission using one of up to three preconfigured settings; Uplink index/DAI; TPC for PUSCH; DCI format 0/1A indication; and padding if necessary.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol (e.g., CORESET_StartSymbol); a number of consecutive OFDM symbols (e.g, CORESET_NumSymbol); a set of resource blocks (e.g., CORESET_RBSet); a CCE-to-REG mapping (e.g, CORESET_mapping); and a REG bundle size, in case of interleaved CCE-to-REG mapping (e.g, CORESET_REG_bundle).

With configured control resource sets, a UE may monitor PDCCH for detecting DCI on a subset of control resource sets, to reduce the power consumption.

Example of BWP in SCell Option

In an example, a gNB may transmit one or more message comprising configuration parameters of one or more active bandwidth parts (BWP). The one or more active BWPs may have different numerologies. A gNB may transmit one or more control information for cross-BWP scheduling to a UE. One BWP may overlap with another BWP in frequency domain.

A gNB may transmit one or more messages comprising configuration parameters of one or more DL and/or UL BWPs for a cell, with at least one BWP as the active DL or UL BWP, and zero or one BWP as the default DL or UL BWP.

For a PCell, the active DL BWP may be the DL BWP on which the UE may monitor one or more PDCCH, and/or receive PDSCH. The active UL BWP is the UL BWP on which the UE may transmit uplink signal.

For a SCell, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE.

Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting on or receiving from an active BWP, the UE may switch the BWP to the default BWP, which may reduce power consumption.

Switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP.

A gNB may transmit one or more messages comprising a BWP inactive timer to a UE. The UE may start the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example, a UE may receive RRC message comprising parameters of a secondary cell (SCell) and one or more BWP configuration associated with the SCell. Among the one or more BWPs, at least one BWP may be configured as the first active BWP (e.g., BWP 1 in the figure), one BWP as the default BWP (e.g., BWP 0 in the figure). The UE may receive a MAC CE to activate the Scell at the $n^{th}$ subframe. The UE may start the sCellDeactivationTimer at the $n^{th}$ subframe, and start reporting CSI for the SCell, or for the initial active BWP of the SCell at the $(n+8)^{th}$ subframe. The UE may start the BWP inactive timer and restart the sCellDeactivationTimer when receiving a DCI indicating switching BWP from BWP 1 to BWP 2, at the $(n+8+k)^{th}$ subframe. When receiving a PDCCH indicating DL scheduling on BWP 2, for example, at the $(n+8+k+m)^{th}$ subframe, the UE may restart the BWP inactive timer and sCellDeactivationTimer. The UE may switch back to the default BWP (0) when the BWP inactive timer expires, at the $(n+8+k+m+l)^{th}$ subframe. The UE may deactivate the SCell when the sCellDeactivationTimer expires at the $(n+8+k+m+l+o)^{th}$ subframe.

In an example, BWP inactive timer may be used to reduce UE's power consumption when configured with multiple cells with each cell having wide bandwidth. The UE may transmit on or receive from a narrow-bandwidth BWP on the PCell or SCell when there is no activity on an active BWP. The UE may deactivate the SCell triggered by sCellDeactivationTimer expiring when there is no activity on the SCell.

Example of SP CSI Report Mechanism

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or SP CSI-RS.

In an example, a CSI-RS resource set may comprise at least one of: one CSI-RS type (e.g., periodic, aperiodic, semi-persistent); one or more CSI-RS resources comprising at least one of: CSI-RS resource configuration identity; number of CSI-RS ports; CSI RS configuration (symbol and RE locations in a subframe); CSI RSsubframe configuration (subframe location, offset and periodicity in radio frame); CSI-RS power parameter; CSI-RS sequence parameter; CDM type parameter; frequency density; transmission comb; and/or QCL parameters.

In an example, one or more CSI-RS resources may be transmitted periodically, or using aperiodic transmission, or using a semi-persistent transmission.

In a periodic transmission, the configured CSI-RS resource may be transmitted using a configured periodicity in time domain.

In an aperiodic transmission, the configured CSI-RS resource may be transmitted in a dedicated time slot or subframe.

In a semi-persistent transmission, one or more configured CSI-RS resources may be transmitted when triggered by a CSI activation MAC CE or DCI. The transmission of the one or more configured CSI-RS resources may be stopped when triggered by a CSI deactivation MAC CE or DCI. The transmission of the one or more configured CSI-RS resources may be stopped when the transmission duration (if configured) expires.

In an example, a CSI reporting setting may comprise at least one of: one report configuration identifier; one report type; one or more reported CSI parameter(s); one or more CSI Type (I or II); one or more codebook configuration parameters; a report quantity indicator indicating CSI-related or L1-RSRP-related quantities to report; one or more parameters indicating time-domain behavior; frequency granularity for CQI and PMI; and/or measurement restriction configurations. The report type may indicate a time domain behavior of the report (aperiodic, semi-persistent, or periodic). The one of the one or more CSI reporting settings may further comprise at least one of: one periodicity parameter; one duration parameter; and/or one offset (e.g., in unit of slots), if the report type is a periodic or semi-persistent report. The periodicity parameter may indicate the periodicity of a CSI report. The duration parameter may indicate the duration of CSI report transmission. The offset parameter may indicate value of timing offset of CSI report from a reference time.

In an example, a CSI measurement setting may comprise one or more links comprising one or more link parameters. The one or more link parameters may comprise at least one of: one CSI reporting setting indication; CSI-RS resource setting indication; and/or one or more measurement parameters.

In an example, a gNB may trigger a CSI reporting by transmitting a RRC message, or a MAC CE, or a DCI. In an example, a UE may transmit one or more SP CSI report on a PUCCH, with a transmission periodicity, triggered by receiving a MAC CE activating a SP CSI reporting. In an example, a UE may transmit one or more SP CSI report on a PUSCH, triggered by receiving a DCI activating a SP CSI reporting.

In an example, in response to transmitting a MAC CE or DCI for triggering a SP CSI reporting at subframe n, a gNB may start transmitting one or more SP CSI-RS at subframe n+k. The value "k" may be zero, or an integer greater than zero, configured by a RRC message. The value "k" may be predefined as a fixed value.

For example, a UE may transmit SP CSI report at subframe n+k+m, n+k+m+l, n+k+m+2*l, n+k+m+3*l, etc., with a periodicity of l subframes. The UE may stop transmitting SP CSI reporting in response to receiving a MAC CE or DCI for deactivating SP CSI reporting.

Full Beam Failure Recovery Mechanism

A UE may be configured to monitor NR-PDCCH on one or more beam pair links (BPLs), where the number of the one or more BPL may be determined at least based on UE capability. This process may increase robustness against BPL blocking. A gNB may transmit one or more messages indicating a UE to monitor NR-PDCCH on different BPLs in different NR-PDCCH OFDM symbols.

A gNB may transmit higher layer signaling or MAC CE comprising parameters indicating UE Rx beam setting for monitoring NR-PDCCH on multiple BPLs. The gNB may transmit an indication of spatial QCL assumption between an DL RS antenna port(s) (for example, cell-specific CSI-RS, or UE-specific CSI-RS, or SS block, or PBCH with or without DM-RSs of PBCH), and DL RS antenna port(s) for demodulation of DL control channel. Signaling for a beam indication for a NR-PDCCH may be MAC CE signaling, or RRC signaling, or DCI signaling, or a combination thereof.

For reception of unicast DL data channel, a gNB may transmit at least one MAC CE, RRC message, or a DCI indicating spatial QCL parameters between DL RS antenna port(s) and DM-RS antenna port(s) of DL data channel. The gNB may transmit DCI (downlink grants) comprising one or more parameters indicating the RS antenna port(s). The one or more parameters may indicate the RS antenna port(s) which is QCL-ed with DM-RS antenna port(s). Different set of DM-RS antenna port(s) for the DL data channel may be indicated as QCL with different set of RS antenna port(s).

A UE may measure quality of one or more BPLs using one or more reference signals (RSs). One or more SS blocks, one or more CSI-RSs, or one or more DM-RSs may be used to measure quality of a BPL. A gNB may configure a UE with one or more RS resources, used for measuring BPL quality, QCLed (Quasi-Co-Located) with DM-RSs (demodulation reference signal) of a control channel. The one or more RS resources and the DM-RSs of the control channel may be semi-statistically QCLed by the gNB.

In an example, a UE may detect a beam failure when the quality of all BPLs associated with one or more serving control channels falls below a threshold (e.g. in comparison with a threshold, and/or time-out of an associated timer), wherein the threshold may be semi-statistically configured by the gNB and/or may be predefined. The quality of BPL may be defined as hypothetical PDCCH BLER. A UE may be configured with single or multiple BPLs to monitor the UE-specific PDCCH. In the case of a single BPL PDCCH, a beam failure may be detected if the quality of beam associated with the single BPL PDCCH falls below the threshold. In the case of multiple BPL PDCCH, a beam failure may be detected if the quality of the beams associated with the multiple BPL PDCCH falls below the threshold. The UE may measure the hypothetical BLER of CSI-RS resource or SS block that is configured as the spatial QCL reference for each UE-specific PDCCH and compare the BLER of CSI-RS resource or SS block with the corresponding hypothetical BLER threshold. If the BLER is higher than the threshold, the UE may detect a beam failure of the PDCCH.

FIG. 23A is an example of a beam failure that may occur when a serving beam is blocked by an obstacle and configured beams comprising the serving beam are received from a single TRP. FIG. 23B is an example of a beam failure that may occur when a serving beam is blocked by an obstacle and configured beams comprising the serving beam are received from multiple TRPs.

Figure 24:
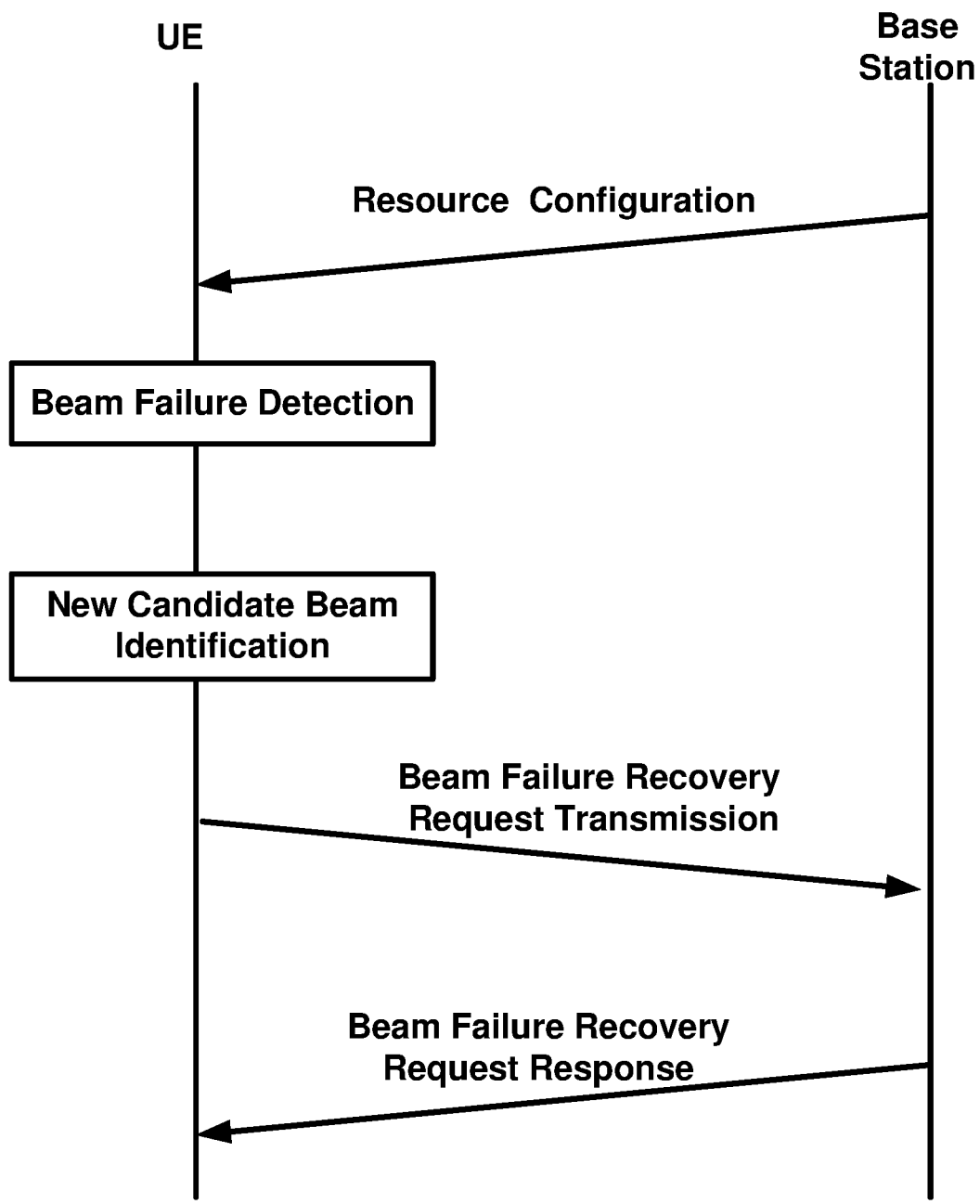
FIG. 24 is an example of downlink beam failure recovery mechanism as per an aspect of an embodiment of the present disclosure.

FIG. 24 shows an example of a downlink beam failure recovery procedure comprising at least one of: beam failure detection; new candidate beam identification; beam failure recovery request transmission; and beam failure recovery request response.

In an example, in response to a beam failure detection, a UE may identify at least one candidate beam to transmit a beam failure recovery request to the network. The UE may select a RS (e.g., the RS may be associated with a SSB or CSI-RS) as the at least one candidate beam if the RSRP of the RS is higher than a threshold. In an example, a UE may transmit a beam failure recovery (BFR) request when the measurement quality of all serving beams associated with control channels falls below a first threshold and the UE identifies a candidate beam, wherein the RSRP of the candidate beam is higher than a second threshold.

In an example, a UE may transmit a beam failure recovery (BFR) request via BFR-PUCCH and/or BFR-PRACH, wherein the BFR-PRACH may be one or more radio resources FDMed/CDMed with PRACH. In an example, in response to a gNB receiving the beam failure recovery request, the gNB may transmit one or more DCIs to indicate a successful reception of the beam failure recovery request. The one or more DCIs may comprise one or more fields indicating at least one of UL grant, TPC command, one or more beam indices. The gNB may semi-statistically configure a UE with one or more parameters indicating the resource configurations of BFR-PUCCH and/or BFR-PRACH. Contention-based PRACH may serve as supplement to contention-free RACH procedure. In an example, if a UE is not configured with any resources for beam failure recovery, the UE may fall back to contention-based PRACH to re-establish connection on the serving cell. For the scenarios without beam correspondence, the UL active beam may be still good enough whereas DL active beams have poor qualities. In these cases, the UE may transmit the beam failure recovery request through BFR-PUCCH. For the PUCCH-based beam failure request transmission, message carried by PUCCH may explicitly indicate the new identified beam.

BFR-PRACH may use a resource orthogonal to resources of other PRACH transmissions (for example initial access). There may be a direct association between the CSI-RS or SS block resources and dedicated BFR-PRACH resources. These associations may be indicated by RRC parameters from a serving gNB. With a mapping between BFR-PRACH resource (preamble sequence and/or time-frequency resources) and corresponding new beam index in the RRC parameter list, the information about identifying UE or new gNB TX beam may be carried by the beam failure recovery request implicitly by the BFR-PRACH resource.

Figure 25:
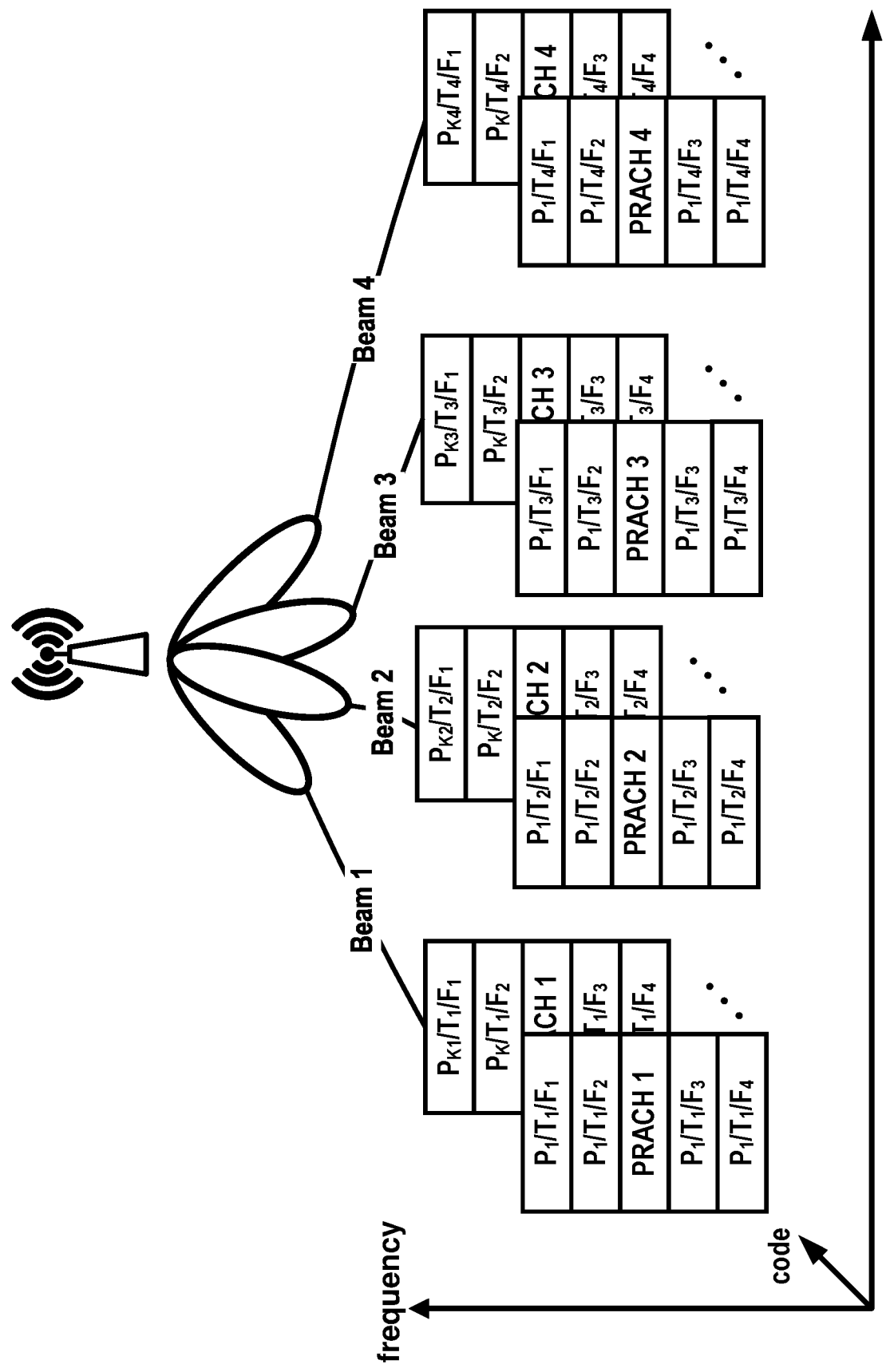
FIG. 25 is an example of downlink beam failure recovery mechanism as per an aspect of an embodiment of the present disclosure.

FIG. 25 illustrates an example of BFR-PRACH opportunities to transmit a beam failure recovery request in time, frequency and code domain, corresponding to different beam indexes associated with the CSI-RS or SS blocks. Herein each BFR-PRACH opportunity is an opportunity in time, frequency and sequence domain for a UE to send a preamble sequence to trigger beam failure recovery. In an example, the RACH resources in the n-th BFR-PRACH time opportunity, $T_n$, n=1, . . . 4, spanning different frequency indexes $F_k$, k=1, . . . 4, and different cyclic shifts, $P_l$, l= 1, . . . Kn, hold a beam correspondence relationship with Beam n. One BFR-PRACH resource may differentiate from another BFR-PRACH resource in the choice of either PRACH time opportunity, frequency index, cyclic shift or a combination of them. A BFR-PRACH resource may be either FDM-ed (using e.g. different frequencies) or CDMed (using e.g. different cyclic shifts) with existing PRACH resources such as initial access.

In an example, in response to the identification of a new candidate beam by a UE by measuring multiple CSI-RSs or SS blocks or both CSI-RSs and SS blocks, the UE may trigger beam failure recovery mechanism and select a dedicated BFR-PRACH resource associated with the identified new beam to transmit a UE-specific preamble. For example, if the UE detects the Beam 2 in FIG. 25 as a new identified beam, the UE may transmit a BFR-PRACH preamble on a RACH resource FDMed and/or CDMed with the second normal PRACH resource, "PRACH 2", e.g., on the $P_1/T_2/F_4$ or $P_{K2}/T_2/F_2$ resource. A gNB may monitor all BFR-PRACH resources for potential beam failure recovery request transmissions. In response to receiving a valid UE-specific preamble in a specific BFR-PRACH resource, the gNB may infer a UE identity for a UE associated with the preamble and the desired beam index for the UE. For example, if a UE-specific preamble is received on a BFR-PRACH during $T_2$ in FIG. 25, the gNB may interpret Beam 2 as the desired beam index from the UE.

In an example, after a UE transmits beam failure recovery request to a gNB, the UE expects to receive the gNB's response. The previous active beams associated with the failed control channels may suffer from poor quality. It may be not suitable to monitor gNB response on those failed beams. In an example, a UE may report a new candidate beam with a good RSRP level in the beam failure recovery request. The UE may monitor the gNB response on a RRC configured dedicated CORESET associated with the new identified beam. The dedicated CORESET is addressed to C-RNTI (UE-specific) and is spatial QCL-ed with DL RS of the UE-identified candidate beam reported in the beam failure recovery request transmission. The dedicated CORESET may not be used by the network for control channel transmission before beam failure occurs. In an example, if the UE detects a valid UE-specific DCI in that dedicated CORESET, the UE may declare the beam failure recovery request is received by the gNB correctly and the UE may stop the beam failure recovery request transmission. The time window to monitor the gNB response may be determined by a fixed time offset, e.g., 4 slots and may be RRC configurable starting from a fixed time offset.

In an example, a UE may not receive a gNB response due to a couple of reasons. For example, the gNB may fail to receive a beam failure recovery request transmission due to incorrect beam selection as a new beam candidate, or a lack of enough UE transmission power. In these cases, the UE beam failure recovery transmission may not reach to the gNB so that the gNB may not be aware of the failed serving beam(s). Another reason may be the incorrect downlink beam for the control channel transmission so that the gNB response may not reach to the UE. Therefore, for robust operation, the retransmission mechanism of beam recovery request may be supported. Specifically, if the UE does not receive response within the response time window, it may send an indicator to high layer and MAC layer may trigger the retransmission of the beam failure recovery request, which may be carried in the next available channel (PUCCH or non-contention based PRACH). To avoid excessive retransmissions, a maximum retransmission number N for the beam recovery request may be configured by the network or may be limited by the number of dedicated uplink beam failure recovery resources. If the number of the beam failure recovery request retransmissions reaches to the maximum number or the timer expires, the UE may declare beam failure recovery mechanism as unsuccessful and may stop retransmitting. Specifically, the UE may refine from beam recovery procedure, send an indication to higher layers and may wait for RLF declaration of higher layers.

Figure 26:
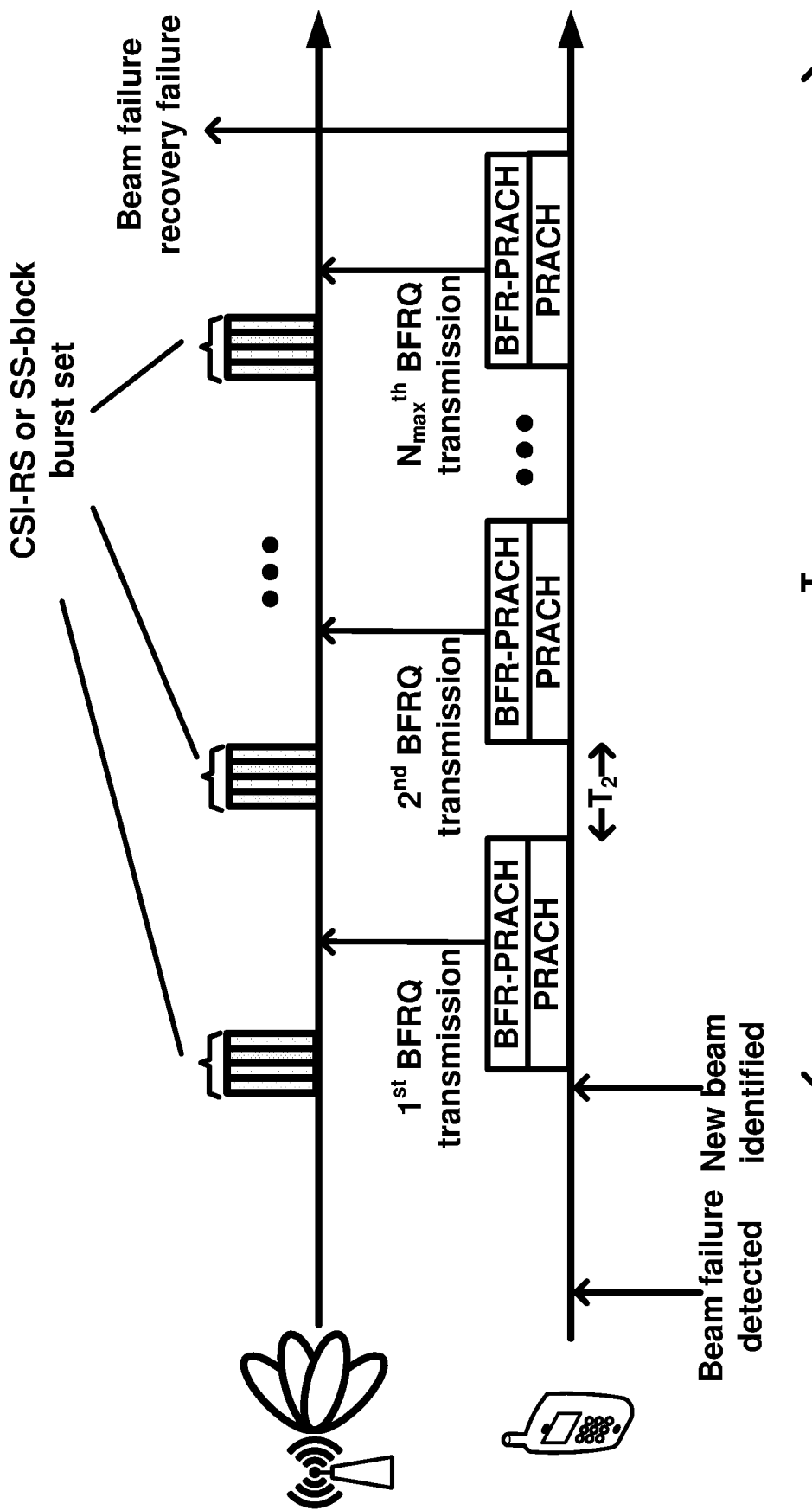
FIG. 26 is an example of downlink beam failure recovery mechanism as per an aspect of an embodiment of the present disclosure.

FIG. 26 shows an example where, a UE may be configured with one or more parameters comprising a maximal number of transmission $N_{max}$, a timer $T_1$ for stopping a beam failure recovery procedure and a timer $T_2$. If the UE fails to receive the gNB beam recovery response within $T_2$ after the transmission of a beam recovery request (BFRQ), the UE may re-transmit the beam recovery request. If the number of transmitting beam recovery request is $N_{max}$ or the timer $T_1$ expires, the UE may stop the beam failure recovery procedure and send an indication of beam failure recovery failure to higher layers. $T_1$ may start in response to the beam failure detection or new candidate beam identification or the first beam failure recovery transmission.

Partial Beam Failure Mechanism

In an example embodiment, a UE may detect a full beam failure when all configured multi-beam serving control channels fail. In an example, the UE may detect a partial beam failure when the UE may not detect a beam failure on the all configured multi-beam. For example, the partial beam failure may be a case that the UE detects a beam failure on one or more serving beams but at least one serving beam has a RSRP higher than a threshold or has a BLER lower than a threshold, which may be different from the threshold for RSRP. When a UE detects the partial beam failure, the UE may start a partial beam failure recovery procedure.

In an example, a partial beam failure is detected by a UE by monitoring and measuring at least one of BLER of a CSI-RS and/or a SS block. In response to detecting the partial beam failure, a partial beam failure recovery procedure may be initiated by the UE. In an example, a gNB may transmit one or more messages comprising parameters of one or more physical layer resources for full and/or partial beam failure recovery procedure, wherein, the one or more physical layer resources and/or configuration parameters may comprise at least one of: DL RS resources to monitor the quality of PDCCH; DL RS resources to identify candidate new beams for the PDCCH; one or more UL channels to report any full and/or partial beam failure; and/or one or more DL channels to response to the UE on beam recovery.

In an example, the one or more physical layer resources and/or the configuration parameters may be common for full beam failure recovery and partial beam failure recovery procedures. The one or more physical layer resources and/or the configuration parameters employed to transmit a full beam failure recovery request and a partial beam failure recovery request may be different.

In an example, with a partial beam failure recovery procedure initiated by a UE, the one or more UL resources for the reporting may be semi-statistically and/or dynamically configured by a gNB. The failed beam information may be transmitted to a gNB via explicit signaling or implicit signaling. For example, the explicit signaling may be transmitted via PUCCH and/or PUSCH and may comprise at least one field indicating a failed beam index and/or a RS ID related to the failed beam, e.g., control data and/or UL-SCH data transmitted via PUSCH or PUCCH may have a field indicating the index and/or ID; the implicit signaling may indicate a failed beam index and/or a RS ID related to the failed beam by transmitting one or more preambles via one or more BFR-PRACHs, wherein the one or more preambles and/or the one or more BFR-PRACHs may be associated with the failed beam index or related RS ID. For example, the gNB may semi-statistically and/or dynamically configure the UE with one or more associations between at least one of beam index (and/or at least one RS ID) and at least one preamble (and/or at least one BFR-PRACH).

In an example, a UE may transmit the partial beam failure recovery request via the PUCCH. For example, at least one serving beam configured for PUCCH transmission may not be failed among a plurality of serving beams configured for the PUCH transmission. In an example, the UE may transmit a partial beam failure recovery request via the at least one serving beam.

In an example, the PUCCH may be scheduled periodically. For example, the PUCCH may not be available when the UE detects the partial beam failure. For example, the PUCCH may be scheduled per one or more beams. The UE may wait until the PUCCH associated with one or more beams, the UE detects a failure, is available. This may cause a latency problem.

In another example, the UE may report the failed beam index(es) and/or a RS ID related to the failed beam(s) on PUCCH. In an example, in response to receiving the partial beam failure recovery request, the gNB may need to differentiate the regular PUCCH reporting and partial beam failure recovery request transmission. This may require the introduction of a new format and/or may occupy additional PUCCH resources. This may cause a high overhead.

In an example, when a UE detects a full beam failure, the UE may transmit at least one preamble via at least one BFR-PRACH, wherein the at least one preamble and/or at least one BFR-PRACH are associated with at least one of candidate beams that the UE identify as a new serving beam. The UE may not employ a first preamble and/or a first BFR-PRACH associated with one or more serving beams.

Figure 27:
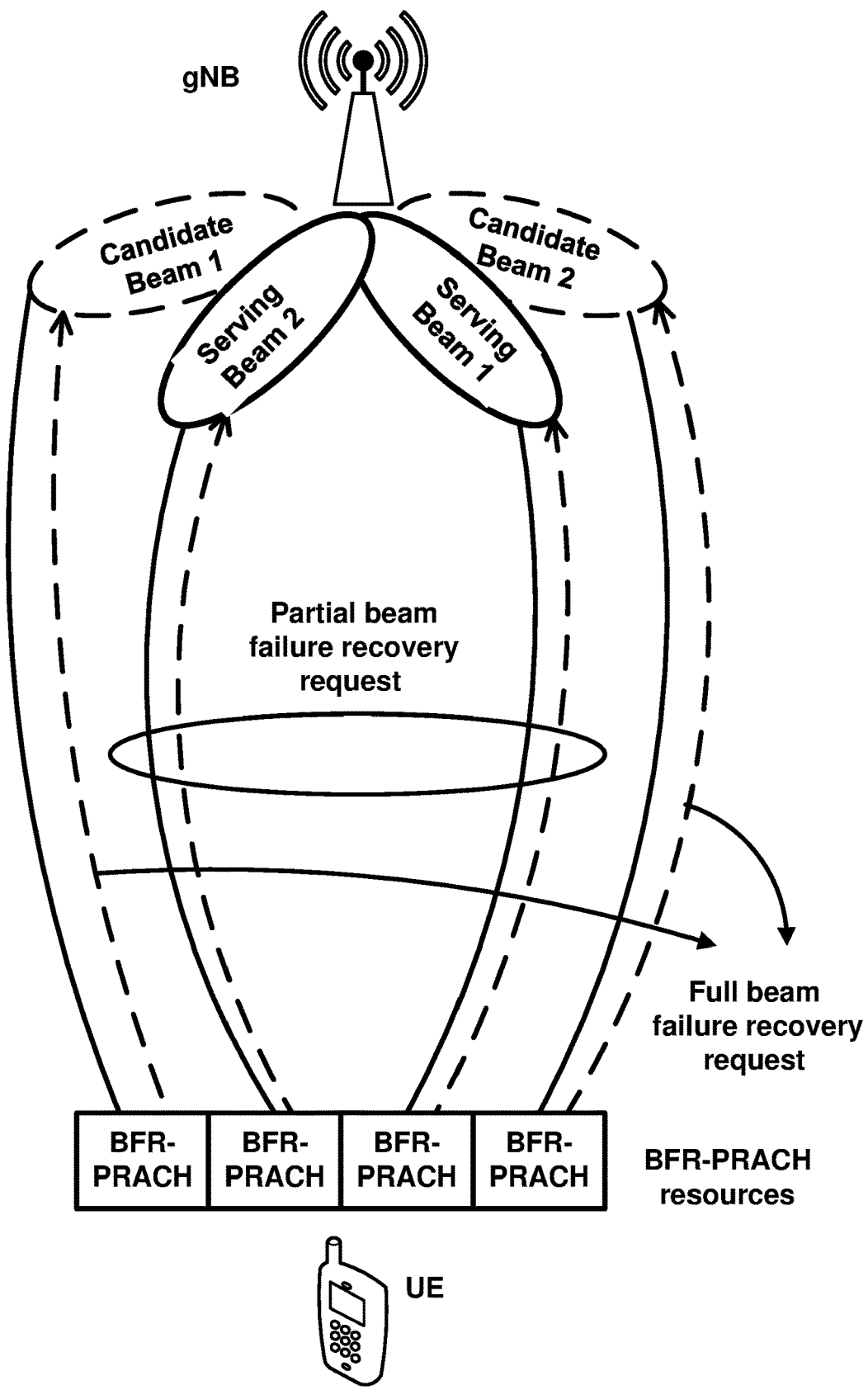
FIG. 27 is an example of full and partial beam failure recovery request transmissions as per an aspect of an embodiment of the present disclosure.

In an example embodiment, the UE may employ the first preamble and/or the first BFR-PRACH to transmit a partial beam failure recovery request. For example, a gNB may know which beams are configured for PUCCH transmissions (e.g., serving beam for PUCCH transmissions). For example, the gNB may detect a full beam failure recovery request in response to receiving the request via the at least one preamble and/or at least one BFR-PRACH. For example, the gNB may detect a partial beam failure recovery request in response to receiving the request via the first one preamble and/or first one BFR-PRACH. FIG. 27 illustrates an example for full and partial beam failure recovery request transmissions via BFR-PRACH resources associated with the at least one of candidate beams and one or more serving beams, respectively.

In an example, the partial beam failure recovery request transmitted by a preamble via BFR-PRACH resource may be beneficial. For example, the PUCCH assigned for the partial beam failure recovery request may not be available and/or may not be scheduled frequently. For example, when the UE detects the partial beam failure, BFR-PRACH may be scheduled before PUCCH. In this case, the UE may transmit the partial beam failure recovery request via BFR-PRACH, which may reduce a latency. For example, the UE may selectively choose one of PUCCH and BFR-PRACH. For example, if a transmission occasion of PUCCH is available earlier than a transmission occasion of BFR-PRACH, the UE may transmit the partial beam failure recovery request via PUCCH. For example, if a transmission occasion of BFR-PRACH is available earlier than a transmission occasion of PUCCH, the UE may transmit the partial beam failure recovery request via BFR-PRACH.

In an example embodiment, a gNB may not expect to receive a full beam failure recovery request via one or more BFR-PRACH resources allocated to the one or more serving beams. The BFR-PRACH resources corresponding to the one or more serving beams may not be utilized. For example, the gNB semi-statistically may configure the UE with dedicated one or more BFR-PRACH resources and/or dedicated one or more preambles for the full beam failure recover request procedure. If some of those resources are not utilized, it may be a waste of radio resources. Using the BFR-PRACH and preamble for the partial beam failure recovery procedure may increase a DL and/or UL resource utilization. In an example, if a gNB receives, from a UE, a dedicated PRACH preamble via the BFR-PRACH resource associated with the one or more serving beams, it may indicate a partial beam failure recovery request. In an example, if the gNB receives a dedicated PRACH preamble on the non-serving beam, it may indicate a full beam failure recovery request.

In an example, a partial beam failure recovery request via BFR-PRACH may indicate a failure of at least one of one or more serving beams. In response to receiving the partial beam failure recovery request, a gNB may initiate the partial beam failure recovery procedure (e.g., one of P1, P2, P3, U1, U2, and/or U3 with SS block and/or CSI-RS) on the at least one of one or more serving beams. For example, the gNB may transmit one or more aperiodic CSI-RS for UE to identify at least one new candidate beam. The gNB may not reconfigure a TCI state when the full and/or partial beam failure recovery procedure is complete. The gNB may reconfigure a TCI state when the full and/or partial beam failure recovery procedure is complete.

Transmitting BFRQ with a Stored Timing-Advance Value

In an example, a gNB may transmit one or more messages comprising at least one of the following: first parameters indicating configuration of one or more reference signals (CSI-RS and/or SS blocks), second parameters indicating one or more RACH resources for beam failure recovery request; or third parameters indicating one or more associations between at least one of the one or more reference signals and at least one of the one or more RACH resources. The UE may detect a beam failure based on measuring at least one of the one or more reference signals associated with the downlink serving control channels with BLER higher than a first threshold. The UE may identify at least one candidate beam different from at least one of the one or more reference signals based on a second threshold. In response to the beam failure detection, the UE may determine a first timing-advance (TA) value for uplink transmission timing. The UE may transmit a first preamble via a first RACH resource based on the uplink transmission timing.

In an example, the UE may receive a MAC CE comprising a TAC field and a TAG ID. The UE may update a TA value associated with the TAG ID based on the TAC field. For example, the first TA value may be the TA value in response to the first RACH resource being associated with the TRP associated with the at least one of the one or more reference signals. In an example, the first TA value may be zero in response to the first RACH resource being associated with a second transmission point different from a transmission point associated with the at least one of the one or more reference signals. In an example, the first TA value may be zero in response to the first RACH resource being associated with a second receiving panel different from a receiving panel associated with the at least one of the one or more reference signals. In an example, the first TA value may be zero if a TAT expires. In an example, the first TA value may be adjusted based on the TAC if the TAT is running. For example, the TA value may be the timing offset between uplink and downlink radio frames (subframes, slots, and/or mini-slots). For example, the beam failure detection may comprise measuring at least downlink control channels with signal strength lower than the first threshold and identifying at least one candidate beam associated with at least one of the one or more reference signals based on a second threshold. For example, the one or more parameters may comprise the first and second thresholds.

Figure 28:
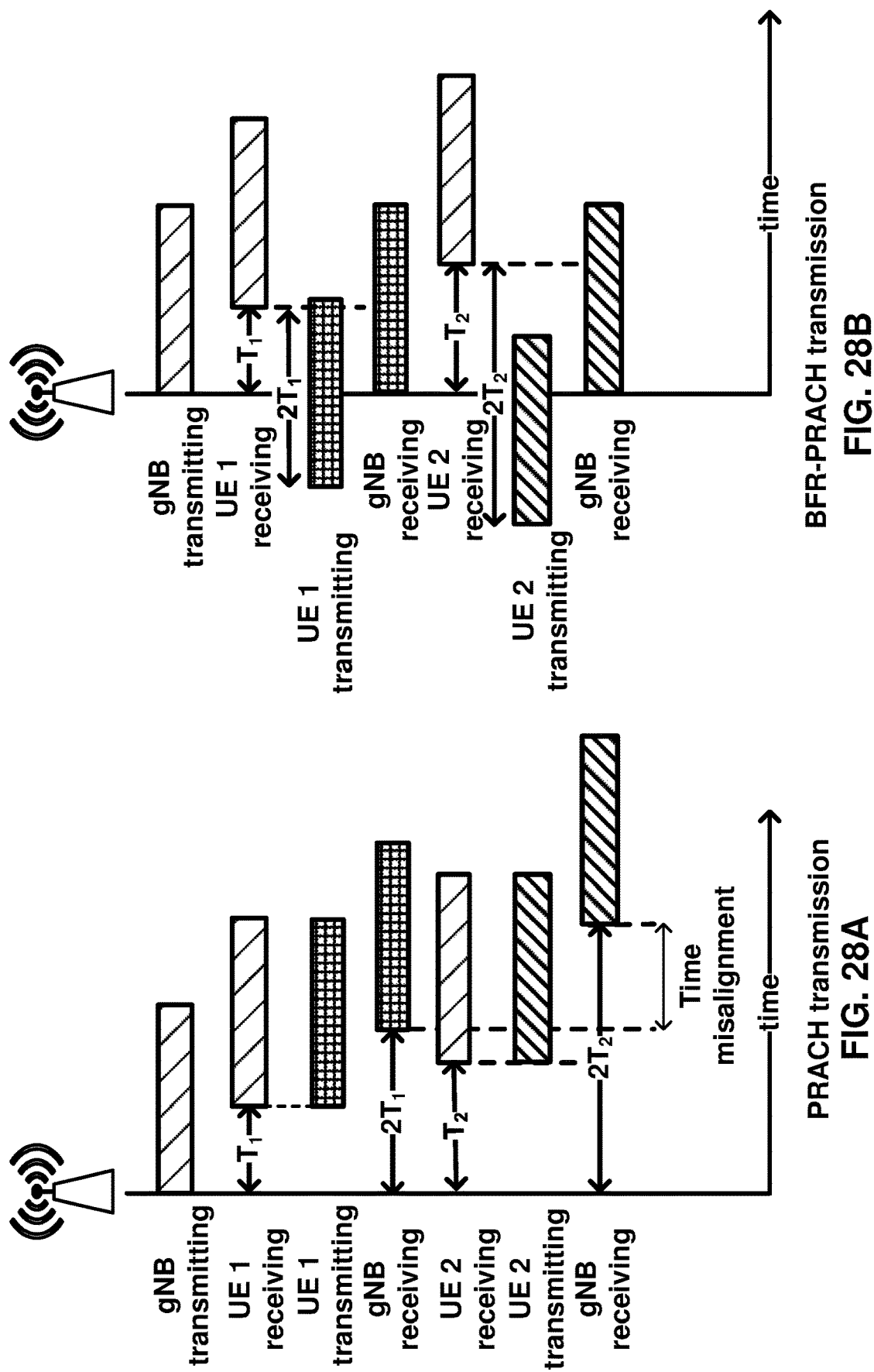
FIG. 28A and FIG. 28B are examples of PRACH and BFR-PRACH transmissions as per an aspect of embodiments of the present disclosure.

FIG. 28A and FIG. 28B are examples of PRACH and BFR-PRACH transmissions. In an example, in FIG. 28A, a start of one or more PRACH preamble transmission by one or more UEs may be aligned with the start of the corresponding uplink subframe (slot, and/or mini-slot) assuming a TA value is zero. To detect the preamble transmissions, the gNB may need to employ a sliding window for the time misalignment among the one or more PRACH preambles transmitted by the one or more UEs. In an example, in FIG. 28B, the one or more UEs UE may have a valid TA value, TA (e.g., UE may be in RRC_CONNECTED mode) when transmitting the beam failure recovery request via BFR-PRACH. The gNB may not need a sliding window to detect the one or more preambles. The gNB may have less decoding complexity when the valid TA value is applied at the UEs for BFR-PRACH transmission.

FIG. 29 shows an example where a UE may be in the coverage of one or more TRPs. In an example, when the UE is configured to be served by TRP 1 and one or more serving beams associated with one or more serving control channels of the TRP 1 fails, the UE may identify, based on a second threshold, at least one candidate beam that may belong to the TRP 2. In response to the beam failure detection, the UE may determine a first timing-advance (TA) value for uplink transmission timing and may transmit a first preamble via a first RACH resource based on the uplink transmission timing. In an example, in FIG. 29, a second TA value for the serving BPL 1 associated with the TRP 1 and the first TA value for the serving BPL 2 associated with the TRP 2 may be different or may be the same. For example, the UE may employ the first TA value to adjust the uplink transmission timing if the first TA value is valid (e.g., when a TAT associated with the first TA is running). For example, the UE may select a third TA value independent of the first TA value to adjust the uplink transmission timing if the first TA value is invalid (e.g. when the TAT expires). For example, the third TA value may be zero. For example, the third TA value may be predefined. For example, the third TA value may be semi-statistically configured by a gNB. In an example, the first TA value may be zero in response to the first RACH resource associated with the TRP 2.

A UE and/or a gNB may be configured with one or more antenna panels to transmit and/or receive. FIG. 30 shows an example where a UE may be configured with one or more antenna panels. In an example, when the UE is configured to be served by antenna Panel 1 and one or more serving beams associated with one or more serving control channels of the antenna Panel 1 fails, the UE may identify, based on a second threshold, at least one candidate beam that may belong to the antenna Panel 2. In response to the beam failure detection, the UE may determine a first timing-advance (TA) value for uplink transmission timing and may transmit a first preamble via a first RACH resource based on the uplink transmission timing. In an example, in FIG. 30, a second TA value for the serving BPL 1 associated with the antenna Panel 1 and the first TA value for the serving BPL 2 associated with the antenna Panel 2 may be different or may be the same. For example, the UE may employ the first TA value to adjust the uplink transmission timing if the first TA value is valid (e.g., when a TAT associated with the first TA is running). For example, the UE may select a third TA value independent of the first TA value to adjust the uplink transmission timing if the first TA value is invalid (e.g. when the TAT expires). For example, the third TA value may be zero. For example, the third TA value may be predefined. For example, the third TA value may be semi-statistically configured by a gNB. In an example, the first TA value may be zero in response to the first RACH resource associated with the antenna Panel 2.

A UE may detect a beam failure based on measuring at least one of the one or more reference signals associated with the downlink serving control channels with BLER higher than a first threshold. In response to detecting the beam failure, the UE may identify at least one candidate beam different than at least one of the one or more reference signals based on a second threshold. In response to the candidate beam identification, the UE may determine a first timing-advance (TA) value for uplink transmission timing and may transmit a first preamble via a first RACH resource based on the uplink transmission timing. In an example, in Scenario 1 of FIG. 31, a TAT may expire before the first BFR-PRACH transmission. In another example, in Scenario 2 of FIG. 31, the TAT may expire during the beam failure recovery request (BFRQ) retransmissions.

Figure 31:
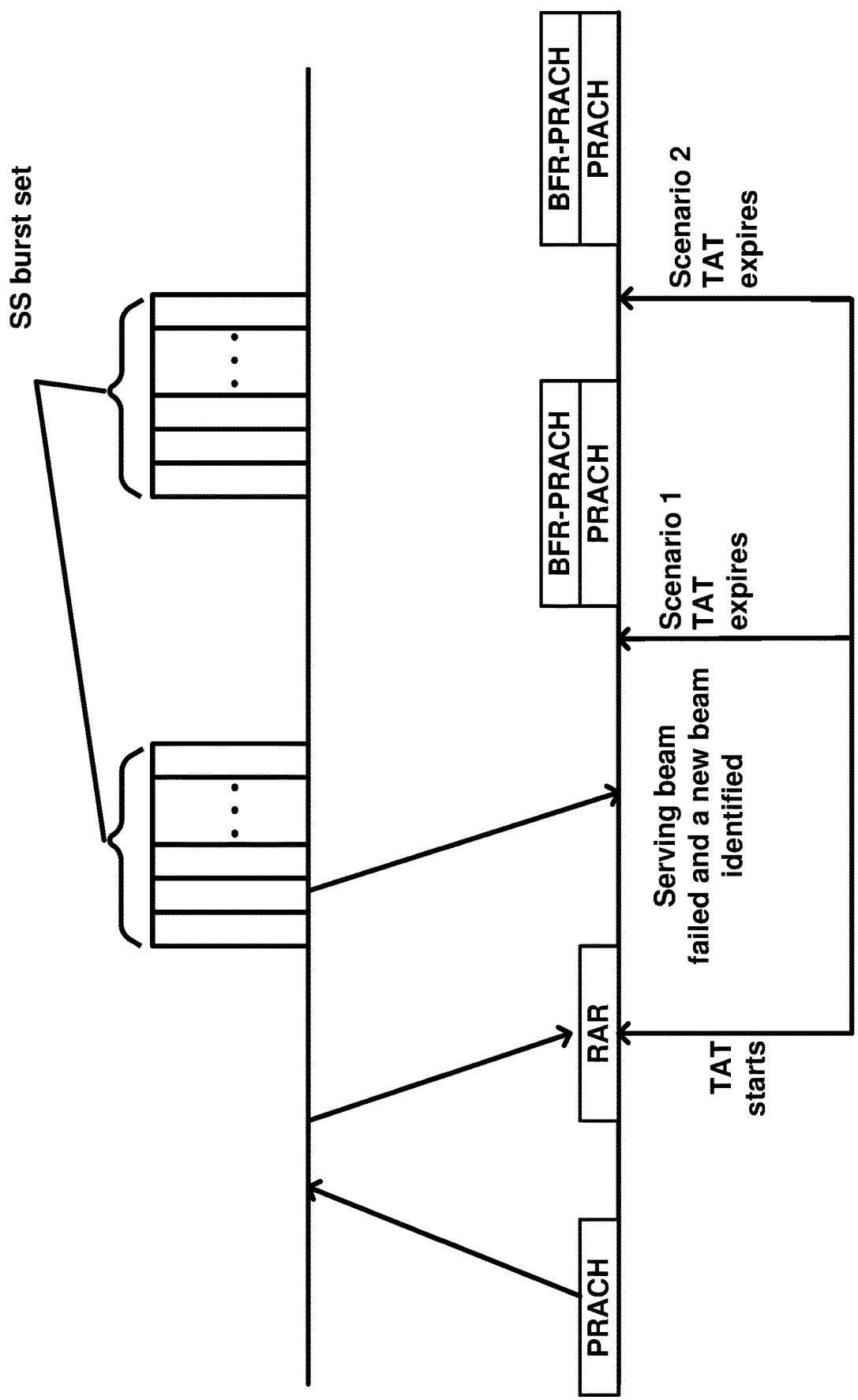
FIG. 31 is an example of a beam failure recovery procedure as per an aspect of an embodiment of the present disclosure.
Figure 32:
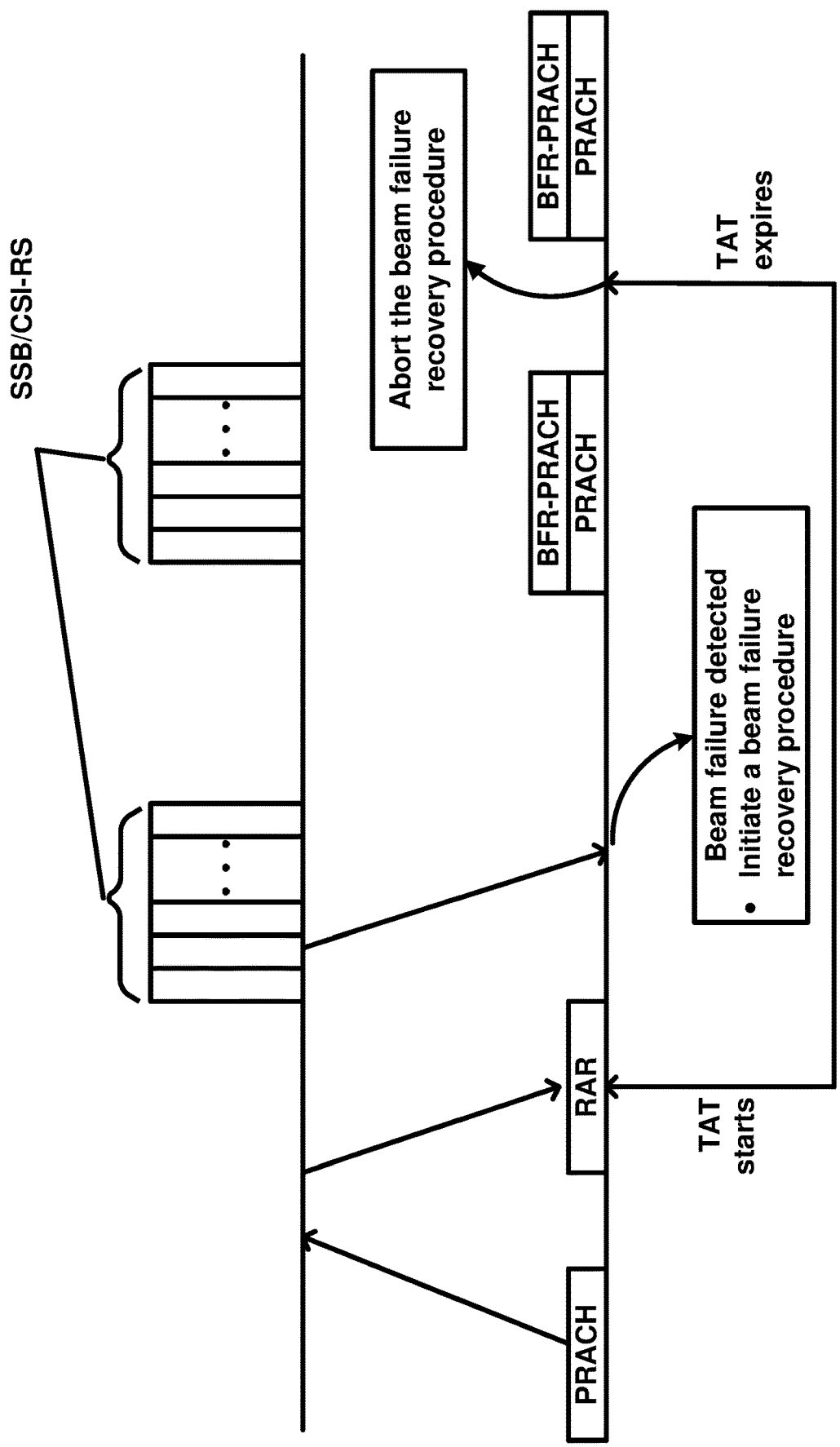
FIG. 32 is an example of a beam failure recovery procedure as per an aspect of an embodiment of the present disclosure.

In an example, the TAT may expire during a beam failure recovery procedure. For example, as shown in FIG. 31 and FIG. 32, the TAT may expire during the beam failure recovery procedure via BFR-PRACH, e.g., before an initial preamble transmission and/or during a retransmission of preamble and/or during the beam failure recovery procedure via BFR-PUCCH. In an example, a UE may continue to perform the beam failure recovery procedure with a third TA value in response to an expiry of a TAT. For example, the third TA value may be predefined, e.g., the third TA value may be zero. For example, the third TA value may be semi-statistically configured. In an example, when the TAT expires during the beam failure recovery procedure, the beam failure recovery procedure may be aborted (e.g., FIG. 32). In response to the beam failure recovery procedure being aborted, the UE may initiate a random-access procedure via PRACH resources. In an example, in response to the beam failure recovery procedure being aborted, it may be notified to a higher layer of a state of the beam failure recovery procedure.

In an example embodiment, when a TAT expires, a UE may stop uplink transmission for a cell associated with the TAT. For example, the UE may clear configured downlink assignment and uplink grants. For example, the UE may notify RRC to release PUCCH at least for the cell. The UE may wait until the TAT is updated based on a MAC CE and/or a DCI that a gNB may transmit. For example, the TAT may be transmitted when the UE initiates a random-access procedure, wherein the random-access procedure may take long (e.g., several milliseconds) depending on the periodicity of SS blocks/CSI-RS and/or transmission occasions of PRACH resources. For example, when the TAT expires, the UE may not transmit a preamble via PRACH to initiate the random-access procedure. For example, the UE may transmit a preamble via BFR-PRACH for a partial and/or full beam failure recovery procedure. For example, the UE may initiate the random-access procedure. In response to receiving a preamble via the random-access procedure, a gNB may initiate a beam management procedure (e.g., one of P1, P2, P3, U1, U2, and/or U3 with SS block and/or CSI-RS). This process may result in a long latency.

Figure 33:
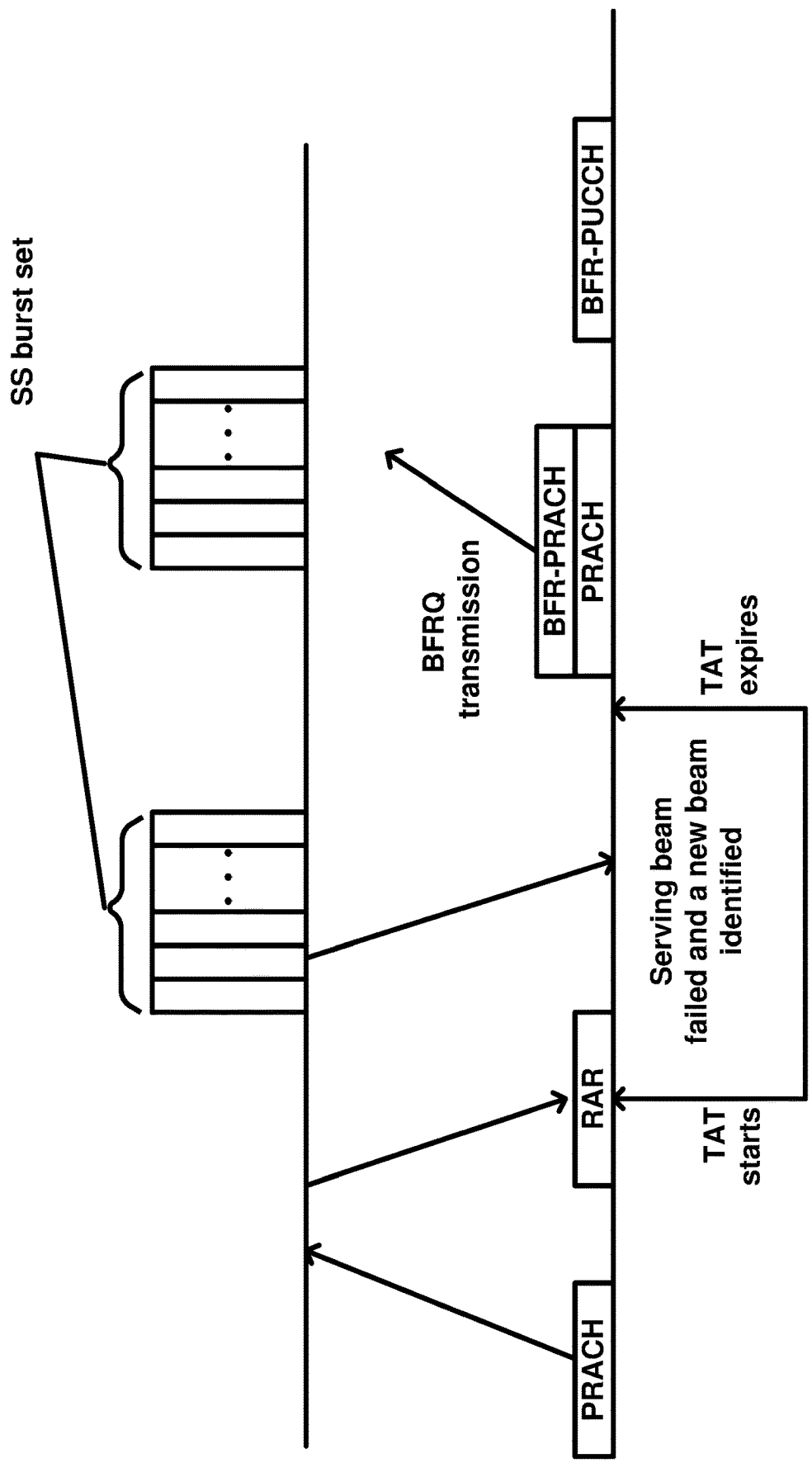
FIG. 33 is an example of a beam failure recovery procedure as per an aspect of an embodiment of the present disclosure.
Figure 34:
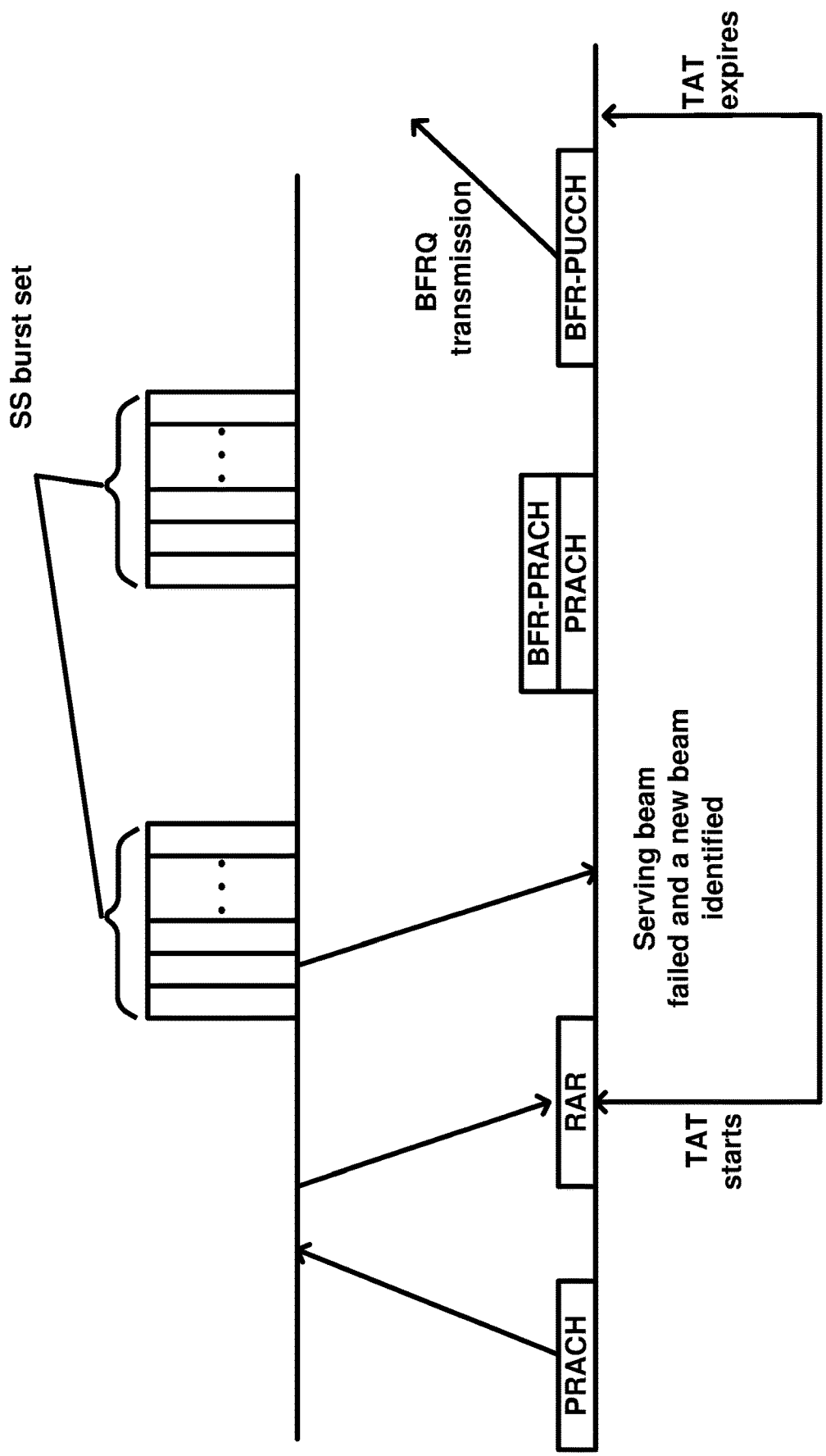
FIG. 34 is an example of a beam failure recovery procedure as per an aspect of an embodiment of the present disclosure.

In an example, the UE may select one of BFR-PUCCH and BFR-PRACH depending on whether a TAT expires. FIG. 33 and FIG. 34 are examples of a beam failure recovery request (BFRQ) transmission in response to a TAT expiry. For example, the BFRQ may be for a full beam failure recovery procedure. For example, the BFRQ may be for a partial beam failure recovery procedure. A UE may transmit the BFRQ via BFR-PUCCH and/or BFR-PRACH. In FIG. 33, in response to the expiry of the TAT, the BFR-PRACH resources may be selected to transmit BFRQ. In an example, in FIG. 34, when the TAT is running during the beam failure recovery procedure, the BFR-PUCCH resources may be selected to transmit BFRQ. For example, for BFRQ via BFR-PRACH, the gNB may identify whether the BFRQ is for the full and partial beam failure recovery procedure based on whether a preamble and/or BFR-PRACH resources are associated with one or more references signals corresponding to one or more serving beams. For example, if the preamble and/or BFR-PRACH resources are associated with the one or more serving beams, the BFRQ may be for the partial beam failure recovery procedure. For example, if the preamble and/or BFR-PRACH resources are not associated with the one or more serving beams, the BFRQ may be for the full beam failure recovery procedure. For example, for BFRQ via BFR-PUCCH, the gNB may identify whether the BFRQ is for the full and partial beam failure recovery procedure based on one or more beam (e.g., BPL, SS block, and/or CSI-RS configuration) indices in the BFRQ. For example, if the BFRQ indicates a failure of all serving beams, the gNB may identify the full beam failure recovery procedure.

A UE may detect a beam failure based on measuring at least one of the one or more reference signals associated with the downlink serving control channels with BLER higher than a first threshold. In response to detecting the beam failure, the UE may identify at least one candidate beam different than at least one of the one or more reference signals based on a second threshold. In an example embodiment, a UE may be configured with BFR-PRACH and/or BFR-PUCCH resources for the beam failure recovery request (BFRQ) transmission. The periodicities of BFR-PRACH and BFR-PUCCH may be different. In an example, a UE may be configured with BFR-PRACH resources for the BFRQ transmission. In response to the candidate beam identification, the UE may wait for the next BFR-PRACH transmission occasion for the BFRQ transmission. When the BFR-PRACH has a long periodicity, the UE may need to wait long (e.g. several milliseconds) to transmit BFRQ via BFR-PRACH. In an example, a UE may be configured with BFR-PUCCH resources for the BFRQ transmission. In response to the candidate beam identification, the UE may wait for the next BFR-PUCCH transmission occasion for the BFRQ transmission. When the BFR-PUCCH may have a long periodicity, the UE may need to wait long (e.g. several milliseconds) to transmit BFRQ via BFR-PUCCH. In an example, a UE may be configured with BFR-PUCCH and BFR-PUCCH resources for the BFRQ transmission. In response to the candidate beam identification, the UE may transmit the BFRQ via the first available uplink opportunity, e.g., BFR-PRACH and/or BFR-PUCCH. The UE may recover from the beam failure faster.

In another example, the UE may select one of BFR-PUCCH and BFR-PRACH depending on a transmission occasion. For example, if a transmission occasion of BFR-PUCCH is available earlier than a transmission occasion of BFR-PRACH, the UE may transmit the BFRQ via BFR-PUCCH. For example, if a transmission occasion of BFR-PRACH is available earlier than a transmission occasion of BFR-PUCCH, the UE may transmit the BFRQ via BFR-PRACH. For example, for BFRQ via BFR-PRACH, the gNB may identify whether the BFRQ is for the full and partial beam failure recovery procedure based on whether a preamble and/or BFR-PRACH resources are associated with one or more references signals corresponding to one or more serving beams. For example, if the preamble and/or BFR-PRACH resources are associated with the one or more serving beams, the BFRQ may be for the partial beam failure recovery procedure. For example, if the preamble and/or BFR-PRACH resources are not associated with the one or more serving beams, the BFRQ may be for the full beam failure recovery procedure. For example, for BFRQ via BFR-PUCCH, the gNB may identify whether the BFRQ is for the full and partial beam failure recovery procedure based on one or more beam (e.g., BPL, SS block, and/or CSI-RS configuration) indices in the BFRQ. For example, if the BFRQ indicates a failure of all serving beams, the gNB may identify the full beam failure recovery procedure.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 35:
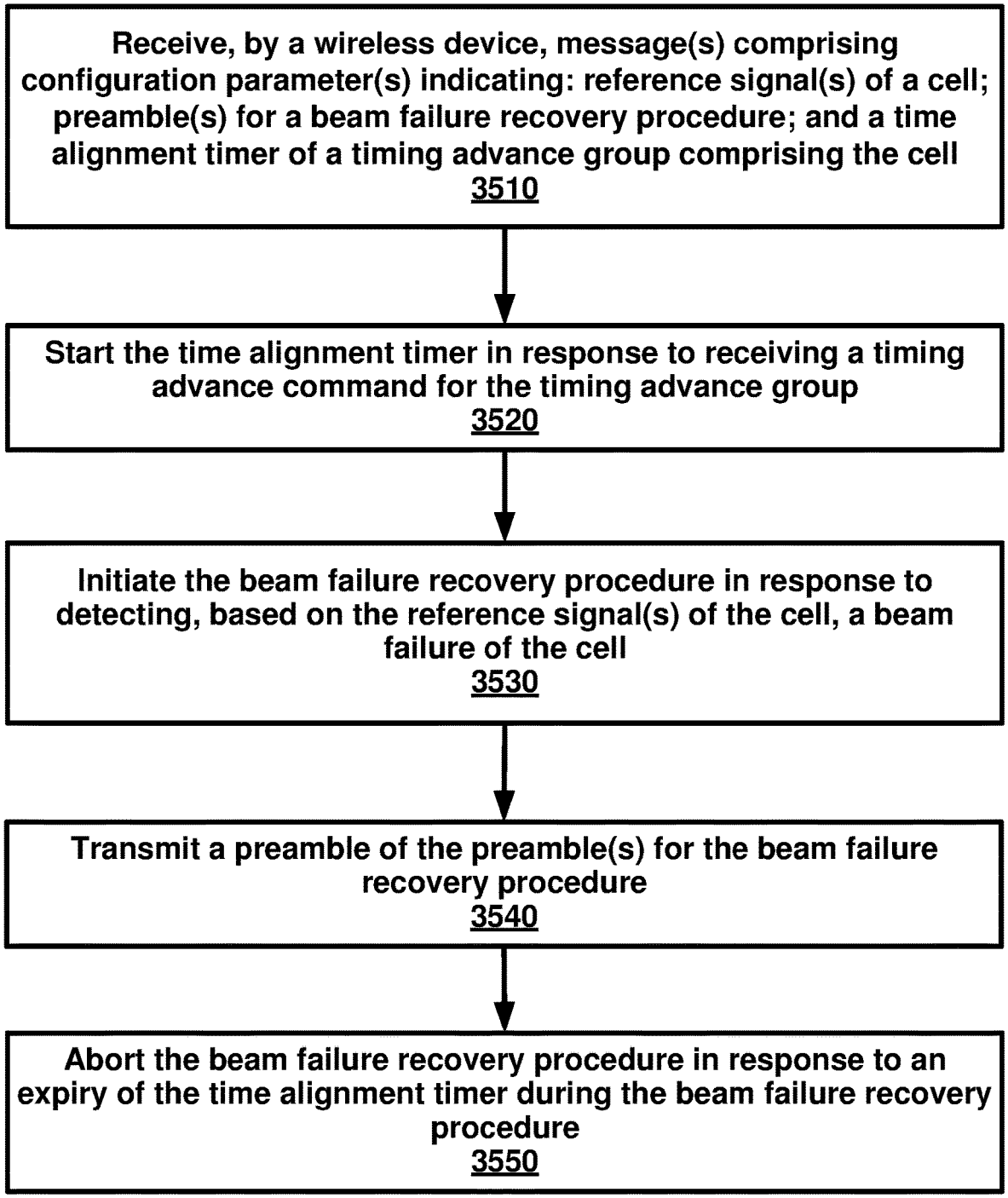
FIG. 35 is a flow diagram of an aspect of an embodiment of the present disclosure.

FIG. 35 is a flow diagram of an aspect of an embodiment of the present disclosure. At 3510, a wireless device may receive one or more messages. The one or more messages may comprise one or more configuration parameters. The one or more configuration parameters may indicate one or more reference signals of a cell. The one or more configuration parameters may indicate one or more preambles for a beam failure recovery procedure. The one or more configuration parameters may indicate a time alignment timer of a timing advance group comprising the cell. At 3520, the time alignment timer may start in response to receiving a timing advance command for the timing advance group. At 3530, the beam failure recovery procedure may be initiated in response to detecting a beam failure of the cell. The beam failure of the cell may be detected based on the one or more reference signals of the cell. At 3540, a preamble of the one or more preambles may be transmitted for the beam failure recovery procedure. At 3550, the beam failure recovery procedure may be aborted in response to an expiry of the time alignment timer during the beam failure recovery procedure.

According to an example embodiment, the aborting of the beam failure recovery procedure may comprise stopping the transmitting of the preamble for the beam failure recovery procedure. According to an example embodiment, the one or more configuration parameters may indicate one or more second reference signals of the cell. According to an example embodiment, the one or more configuration parameters may indicate one or more beam failure recovery request resources on the cell. The one or more beam failure recovery request resources may comprise the one or more preambles. According to an example embodiment, the one or more second reference signals of the cell may comprise one or more second channel state information reference signals. According to an example embodiment, the one or more second reference signals of the cell may comprise one or more second synchronization signal blocks. According to an example embodiment, the one or more configuration parameters may indicate an association between each of the one or more second reference signals of the cell. According to an example embodiment, the one or more configuration parameters may indicate each of the one or more beam failure recovery request resources.

According to an example embodiment, the one or more reference signals of the cell may comprise one or more first channel state information reference signals. According to an example embodiment, the one or more reference signals of the cell may comprise one or more first synchronization signal blocks.

According to an example embodiment, the detecting of the beam failure may comprise assessing the one or more reference signals of the cell with a radio quality lower than a first threshold. According to an example embodiment, the first threshold may be based on a hypothetical block error rate.

According to an example embodiment, the initiation of the beam failure recovery procedure may comprise selecting a selected reference signal in one or more second reference signals of the cell. The selected reference signal may be associated with a beam failure recovery request resource of one or more beam failure recovery request resources. According to an example embodiment, the beam failure recovery request resource may comprise the preamble. According to an example embodiment, the beam failure recovery request resource may comprise at least one random access channel resource. According to an example embodiment, the at least one random access channel resource may comprise one or more time resources. According to an example embodiment, the at least one random access channel resource may comprise one or more frequency resources on the cell. According to an example embodiment, the selected reference signal may have a radio quality higher than a second threshold. According to an example embodiment, the second threshold may be based on layer-1 reference signal received power.

According to an example embodiment, the timing advance group may comprise one or more cells using a same timing reference. According to an example embodiment, the timing advance command may comprise a timing advance command medium access control control element. The timing advance command medium access control control element may comprise a timing advance group index. The timing advance group index may indicate the timing advance group. According to an example embodiment, the timing advance command may be received in a random-access response message for the cell of the timing advance group. According to an example embodiment, the aborting of the beam failure recovery procedure may comprise initiating a random-access procedure with a timing advance value being equal to zero. According to an example embodiment, the aborting of the beam failure recovery procedure may comprise an indication of the aborting of the beam failure recovery procedure to a higher layer of the wireless device.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, configuration parameters indicating a time alignment timer of a timing advance group comprising a cell;
starting the time alignment timer in response to receiving a timing advance command for the timing advance group;
transmitting an uplink signal for a beam failure recovery procedure for the cell based on a beam failure of the cell; and
stopping the transmission of the uplink signal for the beam failure recovery procedure based on an expiry of the time alignment timer during the beam failure recovery procedure.

2. The method of claim 1, wherein the configuration parameters further indicate one or more reference signals of the cell.

3. The method of claim 2, further comprising initiating the beam failure recovery procedure for the cell in response to detecting, based on the one or more reference signals of the cell, the beam failure of the cell.

4. The method of claim 2, wherein the configuration parameters further indicate one or more second reference signals of the cell and one or more beam failure recovery request resources on the cell, wherein the one or more beam failure recovery request resources comprise the uplink signal.

5. The method of claim 4, wherein the one or more second reference signals of the cell comprise one or more second channel state information reference signals.

6. The method of claim 4, wherein the one or more second reference signals of the cell comprise one or more second synchronization signal blocks.

7. The method of claim 4, wherein the configuration parameters further indicate an association between each of the one or more second reference signals of the cell and each of the one or more beam failure recovery request resources.

8. The method of claim 2, wherein the one or more reference signals of the cell comprise one or more first channel state information reference signals.

9. The method of claim 2, wherein the one or more reference signals of the cell comprise one or more first synchronization signal blocks.

10. A wireless device comprising:
one or more processors; and
memory storing instructions that, when executed by the one or more processors, cause the wireless device to:
receive configuration parameters indicating a time alignment timer of a timing advance group comprising a cell;
start the time alignment timer in response to receiving a timing advance command for the timing advance group;
transmit an uplink signal for a beam failure recovery procedure for the cell based on a beam failure of the cell; and
stop the transmission of the uplink signal for the beam failure recovery procedure based on an expiry of the time alignment timer during the beam failure recovery procedure.

11. The wireless device of claim 10, wherein the configuration parameters further indicate one or more reference signals of the cell.

12. The wireless device of claim 11, wherein the instructions, when executed by the one or more processors, further cause the wireless device to initiate the beam failure recovery procedure for the cell in response to detection, based on the one or more reference signals of the cell, of the beam failure of the cell.

13. The wireless device of claim 11, wherein the configuration parameters further indicate one or more second reference signals of the cell and one or more beam failure recovery request resources on the cell, wherein the one or more beam failure recovery request resources comprise the uplink signal.

14. The wireless device of claim 13, wherein the one or more second reference signals of the cell comprise one or more second channel state information reference signals.

15. The wireless device of claim 13, wherein the one or more second reference signals of the cell comprise one or more second synchronization signal blocks.

16. The wireless device of claim 13, wherein the configuration parameters further indicate an association between each of the one or more second reference signals of the cell and each of the one or more beam failure recovery request resources.

17. The wireless device of claim 11, wherein the one or more reference signals of the cell comprise one or more first channel state information reference signals.

18. A system comprising:
a base station comprising:
one or more first processors; and
first memory storing first instructions that, when executed by the one or more first processors, cause the base station to transmit configuration parameters indicating a time alignment timer of a timing advance group comprising a cell; and
a wireless device comprising:
one or more second processors; and
second memory storing instructions that, when executed by the one or more second processors, cause the wireless device to:
receive the configuration parameters;
start the time alignment timer in response to receiving a timing advance command for the timing advance group;
transmit an uplink signal for a beam failure recovery procedure for the cell based on a beam failure of the cell; and
stop the transmission of the uplink signal for the beam failure recovery procedure based on an expiry of the time alignment timer during the beam failure recovery procedure.

* * * * *

UNITED STATES PATENT AND TRADEMARK OFFICE
CERTIFICATE OF CORRECTION

PATENT NO. : 11,664,873 B2
APPLICATION NO. : 17/022415
DATED : May 30, 2023
INVENTOR(S) : Ali Cagatay Cirik et al.

It is certified that error appears in the above-identified patent and that said Letters Patent is hereby corrected as shown below:

In the Specification

In Column 7, Line 34, delete "nonoperational" and insert -- non-operational --.

In Column 11, Line 44, delete "RB s," and insert -- RBs, --.

In Column 28, Line 46, delete "BWP" and insert -- BWP. --.

In Column 33, Line 40, delete "parts" and insert -- parts. --.

Signed and Sealed this
First Day of October, 2024

Katherine Kelly Vidal
*Director of the United States Patent and Trademark Office*